United States Patent
Nakanelua et al.

(10) Patent No.: US 11,388,181 B2
(45) Date of Patent: Jul. 12, 2022

(54) CABLE ASSEMBLY DISTURBANCE DETECTION METHOD

(71) Applicant: CyberSecure IPS, LLC, Upper Marlboro, MD (US)

(72) Inventors: Bobby Nakanelua, Elizabethtown, KY (US); Stephen Sohn, Cummings, GA (US); Scott Rye, La Plata, MD (US)

(73) Assignee: CyberSecure IPS, LLC, Upper Marlboro, MD (US)

( * ) Notice: Subject to any disclaimer, the term of this patent is extended or adjusted under 35 U.S.C. 154(b) by 0 days.

(21) Appl. No.: 17/146,214

(22) Filed: Jan. 11, 2021

(65) Prior Publication Data

US 2021/0136093 A1    May 6, 2021

Related U.S. Application Data

(63) Continuation of application No. 16/860,789, filed on Apr. 28, 2020, now Pat. No. 10,893,062, which is a (Continued)

(51) Int. Cl.
*H04L 9/40* (2022.01)
*H04L 43/16* (2022.01)
(Continued)

(52) U.S. Cl.
CPC ........ *H04L 63/1416* (2013.01); *G08B 13/186* (2013.01); *H04L 41/22* (2013.01);
(Continued)

(58) Field of Classification Search
CPC ............. H04L 63/1416; H04L 63/1425; H04L 63/1408; H04L 63/1433; H04L 41/22;
(Continued)

(56) References Cited

U.S. PATENT DOCUMENTS 3,735,353 A    5/1973    Donovan et al.
3,942,859 A    3/1976    Korodi
(Continued)

OTHER PUBLICATIONS

Notice of Allowance issued in coresponding U.S. Appl. No. 16/860,789 dated Sep. 8, 2020 (10 pages).
(Continued)

*Primary Examiner* — Andrew Jordan
(74) *Attorney, Agent, or Firm* — Perkins Coie LLP

(57) ABSTRACT

In some embodiments, a cable assembly may include an outer jacket, a printer circuit board including light emitting diodes, and a cable configured to transmit information. In some embodiments, the outer jacket may include a channel opening and the printed circuit board may be configured to be positioned within the channel opening and between the cable and the outer jacket. In some embodiments, the cable assembly may include an inner jacket, an outer jacket, a printed circuit board including light emitting diodes, and a cable configured to transmit information. The inner jacket may include a channel opening, and the printer circuit board may be configured to be positioned within the channel opening and between the inner jacket and the outer jacket.

20 Claims, 34 Drawing Sheets

Related U.S. Application Data continuation of application No. 16/008,729, filed on Jun. 14, 2018, now Pat. No. 10,652,253, which is a continuation of application No. 15/246,635, filed on Aug. 25, 2016, now abandoned, which is a continuation of application No. 14/849,746, filed on Sep. 10, 2015, now Pat. No. 9,455,999, which is a continuation of application No. 14/217,259, filed on Mar. 17, 2014, now Pat. No. 9,160,758.

(60) Provisional application No. 62/554,912, filed on Sep. 6, 2017, provisional application No. 61/786,460, filed on Mar. 15, 2013.

(51) Int. Cl.
| | | |
|---|---|---|
| *H04L 43/0864* | (2022.01) | |
| *H04L 41/22* | (2022.01) | |
| *G08B 13/186* | (2006.01) | |
| *H04L 41/0213* | (2022.01) | |
| *H04L 67/12* | (2022.01) | |

(52) U.S. Cl.
CPC .......... *H04L 43/0864* (2013.01); *H04L 43/16* (2013.01); *H04L 63/1425* (2013.01); *H04L 41/0213* (2013.01); *H04L 63/1408* (2013.01); *H04L 63/1433* (2013.01); *H04L 67/12* (2013.01)

(58) Field of Classification Search
CPC . H04L 41/0213; H04L 43/0864; H04L 43/16; H04L 67/12; G08B 13/186
See application file for complete search history.

(56) References Cited

U.S. PATENT DOCUMENTS

| | | |
|---|---|---|
| 4,538,140 A | 8/1985 | Prestel |
| 4,673,935 A | 6/1987 | Spencer |
| 5,194,847 A | 3/1993 | Taylor et al. |
| 5,355,208 A | 10/1994 | Crawford |
| 5,680,104 A | 10/1997 | Siemon |
| 6,288,640 B1 | 9/2001 | Gagnon |
| 6,421,632 B1 | 7/2002 | LeCorney |
| 6,577,794 B1 | 6/2003 | Currie |
| 6,775,657 B1 | 8/2004 | Baker |
| 6,819,849 B1 | 11/2004 | Tangonan et al. |
| 6,974,239 B2 | 12/2005 | Currie |
| 6,980,108 B1 | 12/2005 | Gebbia et al. |
| 7,092,586 B2 | 8/2006 | Vokey et al. |
| 7,292,758 B2 | 11/2007 | Bayindir |
| 7,293,238 B1 | 11/2007 | Brook |
| 7,356,585 B1 | 4/2008 | Brook |
| 7,403,674 B2 | 7/2008 | Murphy et al. |
| 8,135,278 B2 | 3/2012 | Lee et al. |
| 8,165,723 B2 | 4/2012 | Nasle |
| 8,355,406 B1 | 1/2013 | Shimamoto |
| 8,670,111 B1 | 3/2014 | Brown |
| 8,909,013 B1 | 12/2014 | Jiang |
| 8,947,232 B2 | 2/2015 | Strong et al. |
| 9,160,758 B2 | 10/2015 | Sohn |
| 9,455,999 B2 | 9/2016 | Sohn |
| 9,628,502 B2 | 4/2017 | Clark |
| 10,379,309 B2 | 8/2019 | Bauco |
| 2002/0066034 A1 | 5/2002 | Schlossberg |
| 2006/0031446 A1 | 2/2006 | Hamedi |
| 2006/0103835 A1 | 5/2006 | Artsyukhovich |
| 2006/0153491 A1 | 7/2006 | Murphy |
| 2007/0071393 A1 | 3/2007 | Robertson |
| 2007/0253662 A1 | 11/2007 | Patel et al. |
| 2007/0280591 A1 | 12/2007 | Nelson |
| 2008/0025229 A1 | 1/2008 | Beliles |
| 2009/0031426 A1 | 1/2009 | Dal Lago et al. |
| 2009/0040046 A1 | 2/2009 | Browning, Jr. et al. |
| 2009/0208212 A1 | 8/2009 | Lee |
| 2010/0091676 A1 | 4/2010 | Moran et al. |
| 2010/0117830 A1 | 5/2010 | Strong et al. |
| 2010/0209047 A1 | 8/2010 | Cheung et al. |
| 2011/0241881 A1 | 10/2011 | Badinelli |
| 2013/0312092 A1 | 11/2013 | Parker |
| 2013/0322490 A1 | 12/2013 | Bell |
| 2013/0335219 A1 | 12/2013 | Malkowski |
| 2014/0056582 A1 | 2/2014 | Roberts |
| 2014/0091929 A1 | 4/2014 | Murphy et al. |
| 2014/0109182 A1 | 4/2014 | Smith |
| 2014/0167952 A1 | 6/2014 | Zhevelev |
| 2014/0283074 A1 | 9/2014 | Sohn |
| 2015/0358345 A1 | 12/2015 | Clark |
| 2015/0381640 A1 | 12/2015 | Sohn |
| 2016/0139353 A1 | 5/2016 | Bauco |
| 2016/0330225 A1 | 11/2016 | Kroyzer |
| 2016/0366163 A1 | 12/2016 | Sohn |
| 2017/0295031 A1 | 10/2017 | Bush |
| 2018/0302420 A1 | 10/2018 | Nakanelua |
| 2018/0324194 A1 | 11/2018 | Nakanelua |
| 2019/0373856 A1* | 12/2019 | Eidus ................... A01K 15/021 |
| 2021/0136093 A1* | 5/2021 | Nakanelua .......... H04L 63/1425 |

OTHER PUBLICATIONS

International Search Report and Written Opinion dated Aug. 28, 2014 for Appln. No. PCT/US14/30330.

Virgil, "An Evaluation of Fiber Optic Intrusion Detection Systems in Interior Applications," Mar. 1994, pp. 1-46.

Mahmoud, "Nuisance Alarm Suppression Techniques for Fibre-Optic Intrusion Detection Systems," Third Asia Pacific Optical Sensors Conference, 2012, pp. 1-8.

NSTISS, "Protective Distribution Systems," Dec. 13, 1996, pp. 1-13.

Accu-tech Guardian, retrieved from https://web.archive.org/web/20121115040632/http://www.accu-tech.com/protected-distribution-system/, Nov. 15, 2012, pp. 1-4.

Alcon-Tech iSPY Fiber Optic Intrusion Detection System Data Sheet, retrieved from http://www.alcon-tech.com/pdf/iSPY.pdf, Jun. 2006, pp. 1-5.

Allwood, Fibre Optic Acoustic Sensing for Intrusion Detection Systems, Edith Cowan University, Research Online, ECU Publications 2011, pp. 1-7.

International Preliminary Report on Patentability dated Sep. 15, 2015 for Appln. No. PCT/US2014/030330.

* cited by examiner

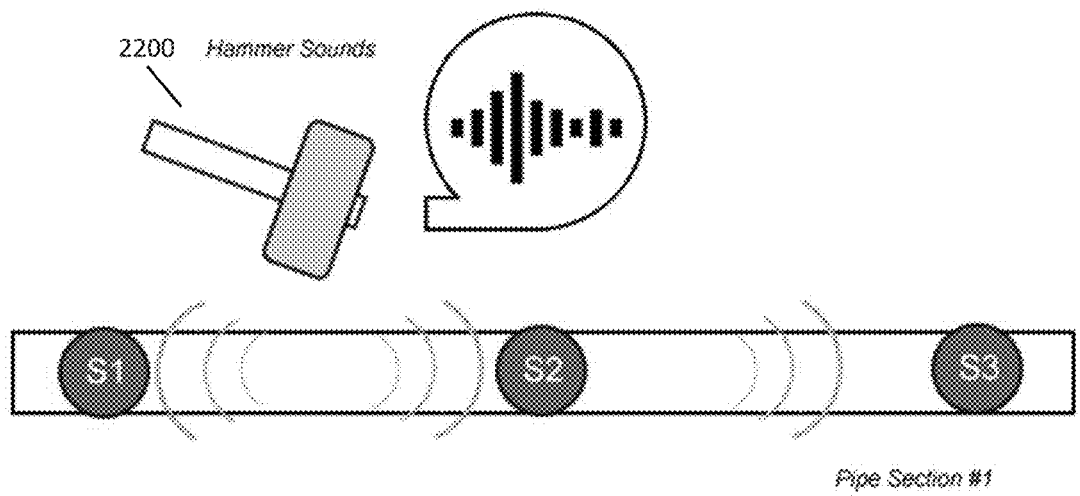
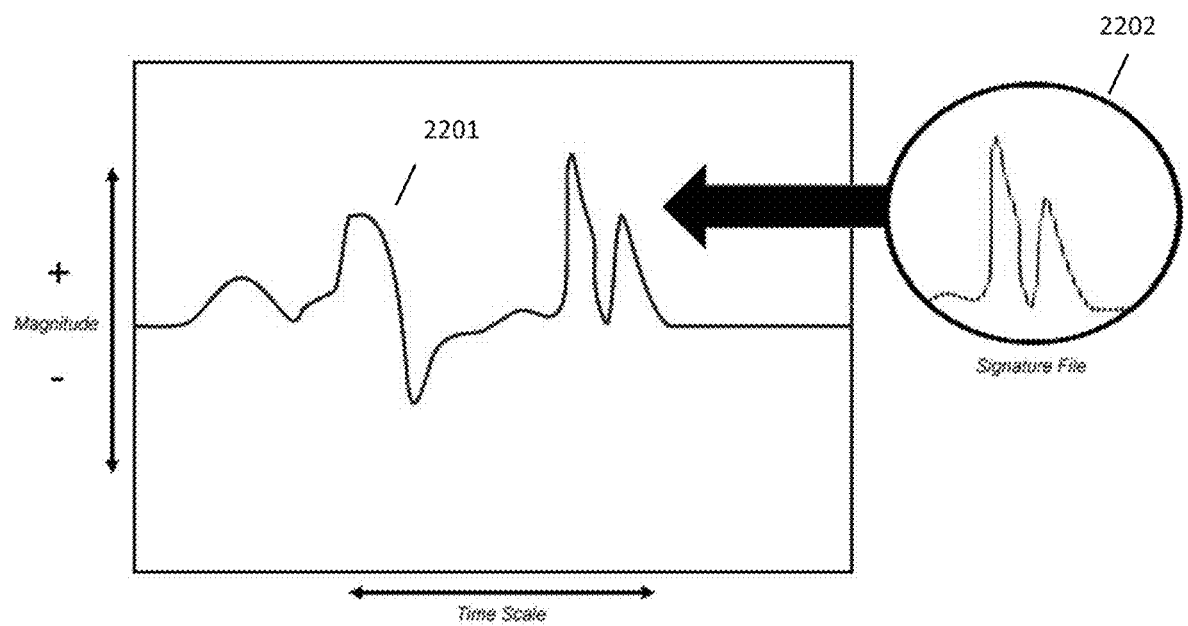
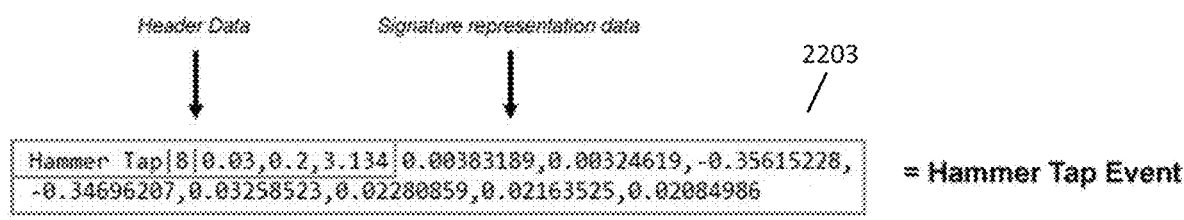
FIG. 22

| Event Name | Signature Time | Signature Sample Time | Signature Point Variance | Event |
|---|---|---|---|---|
| Signature 1 | 19 | 500 | 0.03 | 0.01986273,0.01360435,0.04959434,0.02358059,-0.3377867,-0.33270392,0.02705874,0.04391951,-0.33700547,-0.33270682,0.03746501,0.02514189,-0.0088683,-0.33348316,0.09066777,-0.00204435,-0.005956,-0.06791087,-0.00810864 |
| Signature 2 | 11 | 250 | 0.03 | -0.03936336,-0.03508037,-0.35636405,-0.35122164,-0.02117199,-0.02136785,-0.35230049,0.07992185,-0.00553015,-0.00728907,-0.00846231 |
| Signature 3 | 13 | 1000 | 0.03 | 0.02182732,0.02163145,0.0353218,0.02456573,0.00481314,-0.0350861,0.01654826,0.01517906,0.01361399,0.01540075,0.04432268,0.04536207,0.04530207 |
| Signature 4 | 8 | 250 | 0.03 | 0.00383189,0.00324635,-0.35615228,-0.34696207,0.03258523,0.02289859,0.02163525,0.02084986 |

2401

Initial Variance Limit: 0.0003

2402

| Date/Time of Event | Event Name | Capture Time Period | Event Time Period | Total Exact Point Values | Total Continous Exact Point Values | Total Variable Point Values | Total Continous Variable Points | Confidence Value | User Confirmed | User Confirmed Result |
|---|---|---|---|---|---|---|---|---|---|---|
| 1/1/2017 8:42 | Signature 1 | 19 | 31 | 2 | 2 | 3 | 2 | 12% | No | 0 |
| 1/1/2017 8:42 | Signature 2 | 11 | 31 | 0 | 0 | 0 | 0 | 0% | No | 0 |
| 1/1/2017 8:42 | Signature 3 | 13 | 31 | 0 | 0 | 7 | 4 | 21% | No | 0 |
| 1/1/2017 8:42 | Signature 4 | 8 | 31 | 3 | 5 | 5 | 5 | 52% | Yes | 1 |
| 1/1/2017 10:35 | Signature 1 | 19 | 17 | 0 | 0 | 0 | 0 | 0% | No | 0 |
| 1/1/2017 10:35 | Signature 2 | 11 | 17 | 0 | 0 | 6 | 4 | 61% | No | 0 |
| 1/1/2017 10:35 | Signature 3 | 13 | 17 | 0 | 0 | 3 | 0 | 8% | No | 0 |
| 1/1/2017 10:35 | Signature 4 | 8 | 17 | 0 | 0 | 4 | 0 | 13% | No | 0 |
| 1/1/2017 9:27 | Signature 1 | 19 | 22 | 0 | 0 | 0 | 0 | 0% | No | 0 |
| 1/1/2017 9:27 | Signature 2 | 11 | 22 | 1 | 0 | 8 | 5 | 79% | Yes | 2 |
| 1/1/2017 9:27 | Signature 3 | 13 | 22 | 0 | 0 | 0 | 0 | 0% | No | 0 |
| 1/1/2017 9:27 | Signature 4 | 8 | 22 | 0 | 0 | 0 | 0 | 0% | No | 0 |

FIG. 24

CABLE ASSEMBLY DISTURBANCE DETECTION METHOD

CROSS-REFERENCE TO RELATED APPLICATIONS

This application is a continuation of U.S. application Ser. No. 16/860,789, filed Apr. 28, 2020, which is a continuation of U.S. application Ser. No. 16/008,729, filed Jun. 14, 2018, which claims the benefit of U.S. Provisional Application No. 62/554,912, filed Sep. 6, 2017, and is also a continuation-in-part of U.S. application Ser. No. 15/246,635, filed Aug. 25, 2016, which is a continuation of U.S. patent application Ser. No. 14/849,746, filed Sep. 10, 2015, which is a continuation of U.S. patent application Ser. No. 14/217,259, filed Mar. 17, 2014, which claims the benefit of U.S. Provisional Application No. 61/786,460 filed on Mar. 15, 2013, each of which is incorporated by reference herein in its entirety.

FIELD OF INVENTION

The present invention relates to detection of a disturbance on an information transmission line, including, for example, disturbance location identification, disturbance type identification, disturbance-triggered sensory indicators, disturbance detection handling, or cable assemblies with respect to a physical transmission line.

SUMMARY

Aspects of the invention relate to a cable assembly with respect to a physical transmission line.

In some embodiments, a cable assembly may include an outer jacket, a printed circuit board including light emitting diodes, and a cable configured to transmit information. The outer jacket may include a channel opening, and the printed circuit board may be configured to be positioned within the channel opening and between the cable and the outer jacket.

In some embodiments, a cable assembly may include an inner jacket, an outer jacket, a printed circuit board including light emitting diodes, and a cable configured to transmit information. The inner jacket may include a channel opening, and the printed circuit board may be configured to be positioned within the channel opening and between the inner jacket and the outer jacket.

In some embodiment, an outer jacket for a cable that transmits information may include an outer layer, and an inner layer, where the inner layer comprises a channel opening to allow a plurality of light emitting diodes to be housed within the channel opening.

In some embodiments, an inner jacket for a cable that transmit information may include an inner layer, and an outer layer, where the outer layer comprises a channel opening to allow a plurality of light emitting diodes to be housed within the channel opening.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIG. 22 illustrates sensor data and signature data, in accordance with one or more embodiments;

FIG. 24 illustrates tables including data, in accordance with one or more embodiments;

DETAILED DESCRIPTION

All publications, patents, and patent applications cited in this specification are hereby incorporated by reference in their entirety. The detailed description provided below in connection with the appended drawings is intended as a description of exemplary embodiments and is not intended to represent the only forms in which the invention may be constructed or utilized. The same or equivalent functions and sequences may be accomplished by different embodiments as will be appreciated by those skilled in the art.

Figure 1:
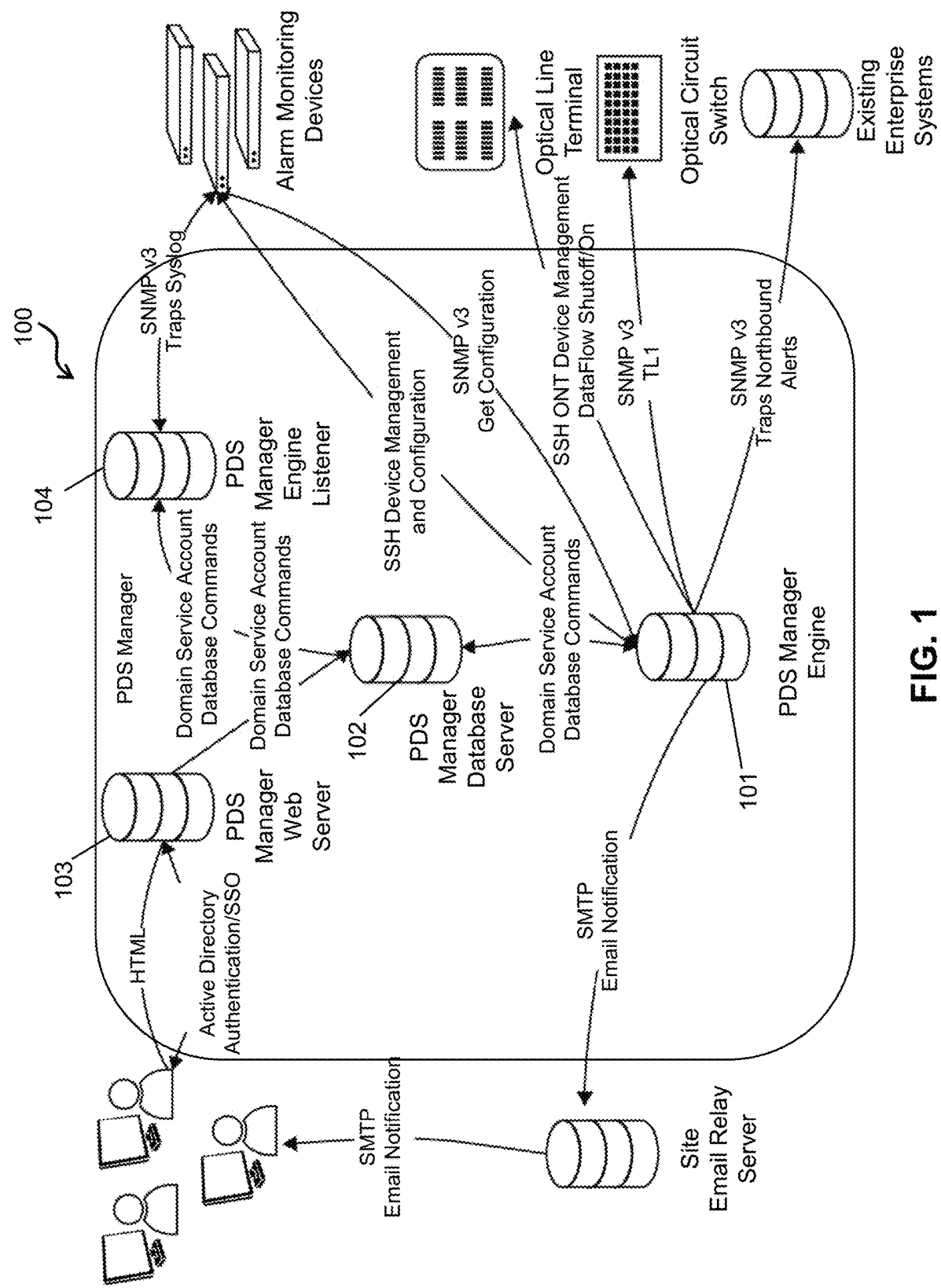
FIG. 1 illustrates a system architecture, in accordance with one or more embodiments.

FIG. 1 illustrates a block diagram of a system 100 according to an embodiment. System 100 may be used to provide proactive real-time alarm monitoring of dark fiber intrusions and may distribute notification of alarms of suspected tampering to a variety of endpoints. System 100 may include a manager engine 101, a manager database server 102, a manager web server 103, and a manager engine listener 104. In an embodiment, system 100 may include one or more components that functions as any of the manager engine, manager database server, manager web server, and manager engine listener.

System 100 may integrate with a variety of network devices to offer alarm detection and alarm response capabilities in a consolidated system. In an embodiment, system 100 may integrate with Passive Optical Network (PON) equipment, Optical Circuit Switch equipment, Optical Test Access Point equipment, and Network Analyzers to stop and start data flow to network endpoints, re-route data flow, and record or further analyze data when alarms are detected and resolved. Alarm events may be captured in a case management oriented workflow for auditing and analytics.

System 100 may provide the ability for complete network mapping of components starting from a source Optical Line Terminal (OLT) down to an end user Optical Network Terminal (ONT). Network components may be enrolled and maintained in system 100 in a logical and efficient manner. System views and reports may be leveraged to inspect an entire network as well as each data run.

System 100 may handle the coordination of tasks between dark fiber alarm monitoring devices and PON equipment through backend adapters leveraging Simple Network Management Protocol (SNMP) traps and Secure Shell (SSH) protocols. System 100 may be monitored actively and passively to assure events are not missed.

System 100 may offer a secure web user interface to provide network operations center (NOC) oriented dashboards for proactive monitoring. Notification of events may be handled in a guaranteed delivery manner over SMTP and HTTP to assure best effort notification to a targeted endpoint so first responders can focus on the status of the remaining system. Maps and images may be immediately provided with floor plan layouts overlaid with network diagrams for an alarmed area to reduce critical decision times for resolving alarms. System 100 may allow staff to identify a suspected intrusion event, isolate its location, notify responder groups, execute planned remediation, and track its history.

In an embodiment, system 100 offers a warning threshold technology to suppress the occurrence of nuisance alarms. A configurable threshold may allow system 100 to filter out accidental or environmental disturbances from actual intrusion attempts.

System 100 may integrate into an existing enterprise by providing consolidated alerts to 'north-bound' systems over SNMP. System 100 may also integrate with any existing Active Directory authentication system to assure its operation is consistent with pre-established IT security policies and site practices. System 100 may be supported by a relational database to provide redundancy, durability, recovery protection, and tools for data extraction and analysis.

In an embodiment, system 100 may provide health reports by providing analytics and reporting on all warnings and alarms captured by system 100. System 100 may provide trend reporting and predictive analysis. System 100 may publish and disseminate the results of the analysis to a configurable group of users at a configurable time period and frequency.

In an embodiment, system 100 may provide infrastructure management for PON Systems. System 100 may provide a graphical and textual depiction of an end to end path for a circuit. For example, one end may start from a port on an optical line terminal and/or network switch joined with a port on an intrusion detector then continue to an optical circuit switch then continue through a trunk cable then continue to a splitter then continue to a zone box then continue to a fiber run to an user area then continue to a user end device, such as an optical network terminal. Each of the devices, passive or active, and each cable run may be represented in the system graphically and textually.

System 100 may provide the ability to add, modify, or delete representative circuit paths. System 100 may track device types, identification numbers, and locations for each device. System 100 may display each circuit path overlaid on a physical diagram, such as a building or floor computer-aided design (CAD) diagram. System 100 may provide querying and reporting capabilities for each device. System 100 may highlight a circuit path when displayed in a graphical view.

Figure 2:
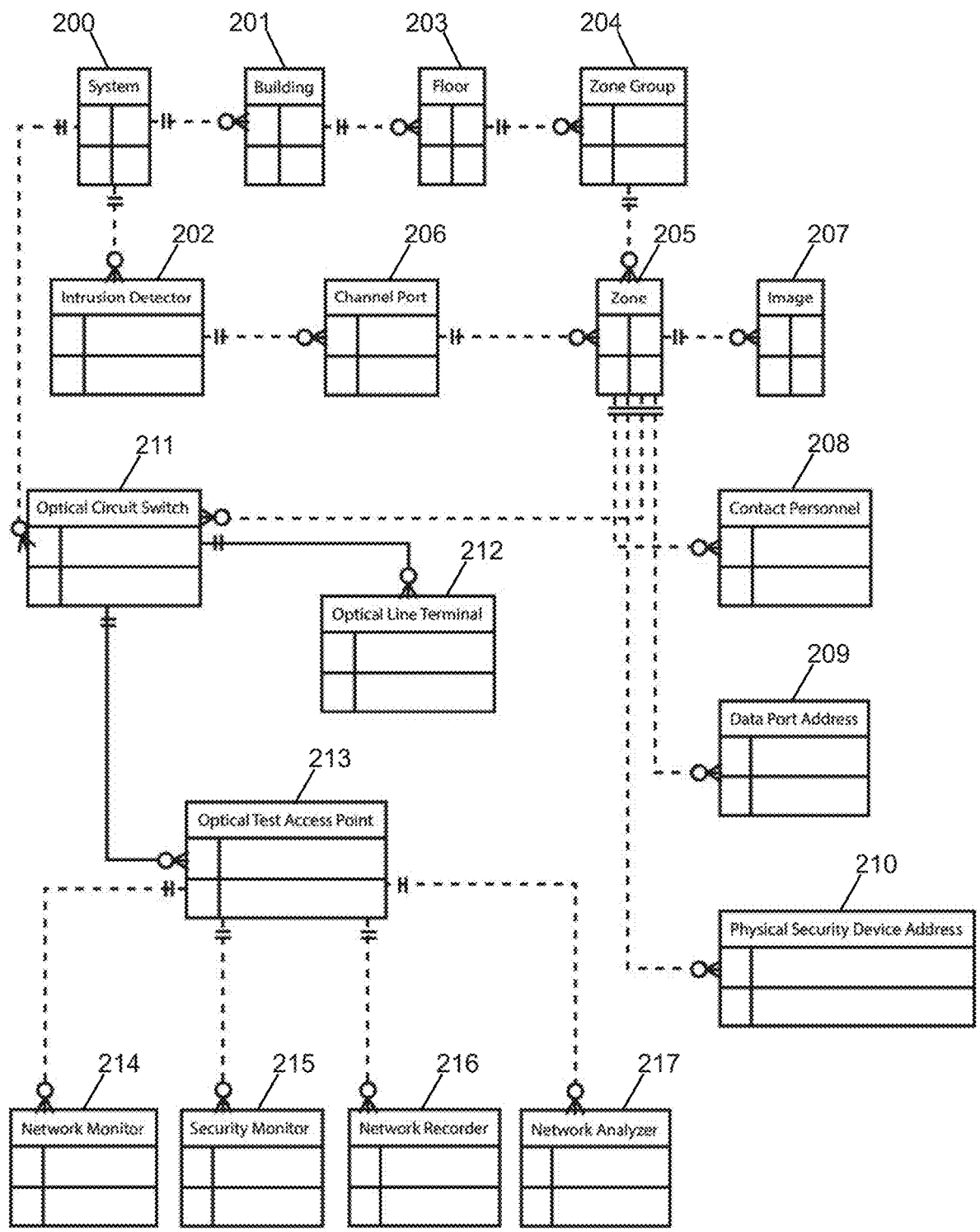
FIG. 2 illustrates an infrastructure management system, in accordance with one or more embodiments.

Turning to FIG. 2, a schematic diagram showing an overview of a Protective Distribution System (PDS) and information technology (IT) infrastructure management system according to an embodiment is shown. In one embodiment, system 200 may be system 100 described above. In one embodiment, system 200 may manage an intrusion detector 202, which monitors a building 201. System 200 may provide the ability to receive alerts when intrusion detector 202 detects intrusion attempts. System 200 may also provide the ability to manage certain features of intrusion detector 202. As will be explained in greater detail below, such features may include learning mode, configuration, enabling and disabling monitoring on a channel port, and reading and updating a threshold setting. Exemplary intrusion detectors that system 200 may integrate with are Network Integrity Systems' INTERCEPTOR, VANGUARD, and INTERCEPTOR LD2.

In one embodiment, system 200 tracks a floor 203 of building 201 that is monitored by intrusion detector 202. Each monitored floor 203 may contain one or more zone groups 204. Within each zone group 204 may be a collection of zones 205, each of which may correspond to a single channel port 206 on intrusion detector 202. Though not depicted in the figure, system 200 may also be used to manage a collection of campuses, each of which may contain a collection of buildings.

System 200 may manage a collection of intrusion detectors 202. Intrusion detector 202 may contain a channel port 206, which corresponds to a zone 205. A zone 205 correlates to a physical location that is being monitored by system 200. A zone 205 may have an image 207, which may include computer-aided design drawings, first person perspective images, or video, to aid users in inspections. A zone 105 may also be associated with a contact personnel 208. Contact personnel 208 may be notified in the event of an intrusion attempt.

System 200 may be configured so that a zone 205 has a data port address 209 associated with the zone to integrate with a data providing networking equipment, such as an optical circuit switch or optical line terminal and/or network switch. In the event of an intrusion attempt in zone 205, system 200 may disable or re-route data by sending a command to a networking equipment using data port address 209. System 200 provides the ability to enable or disable data on a specific port and also provide the ability to read and update details for a port. Some example devices that system 200 may integrate with are Tellabs PON, Zhone PON, and Motorola POL.

Zone 205 may also have a physical security device address 210 associated with the zone. In the event of an intrusion attempt in zone 205, system 200 may adjust physical security including locking doors, recording on IP based cameras, etc. by sending a command to physical security address 210.

System 200 may also manage an optical circuit switch 211. Optical circuit switch 211 may provide the ability to disable, enable, or re-route an optical transmission. Optical circuit switch 211 may have an optical line terminal and/or network switch 212. Optical line terminal and/or network switch 212 may convert and provide a fiber optical signal to a data network. System 200 may also provide the ability to perform a bulk enrollment of a cross connect defined during initial installation or subsequent reconfiguration. An example device that system 200 may integrate with is the Calient 5320 or CyberSecure Cyber Patch Panel.

Optical circuit switch 211 may have an optical test access point 213. Optical test access point 213 may allow system 200 to provide an ability to route or copy network data. Optical test access point 213 may deliver an identical copy of network traffic to a network analytic tool, such as a network monitor 214, a security monitor 215, a network recorder 216, a network analyzer 217, and other analytic tools. An example of an optical test access point device that system 200 may integrate with is the Mimetrix OpticalTAP.

Figure 3:
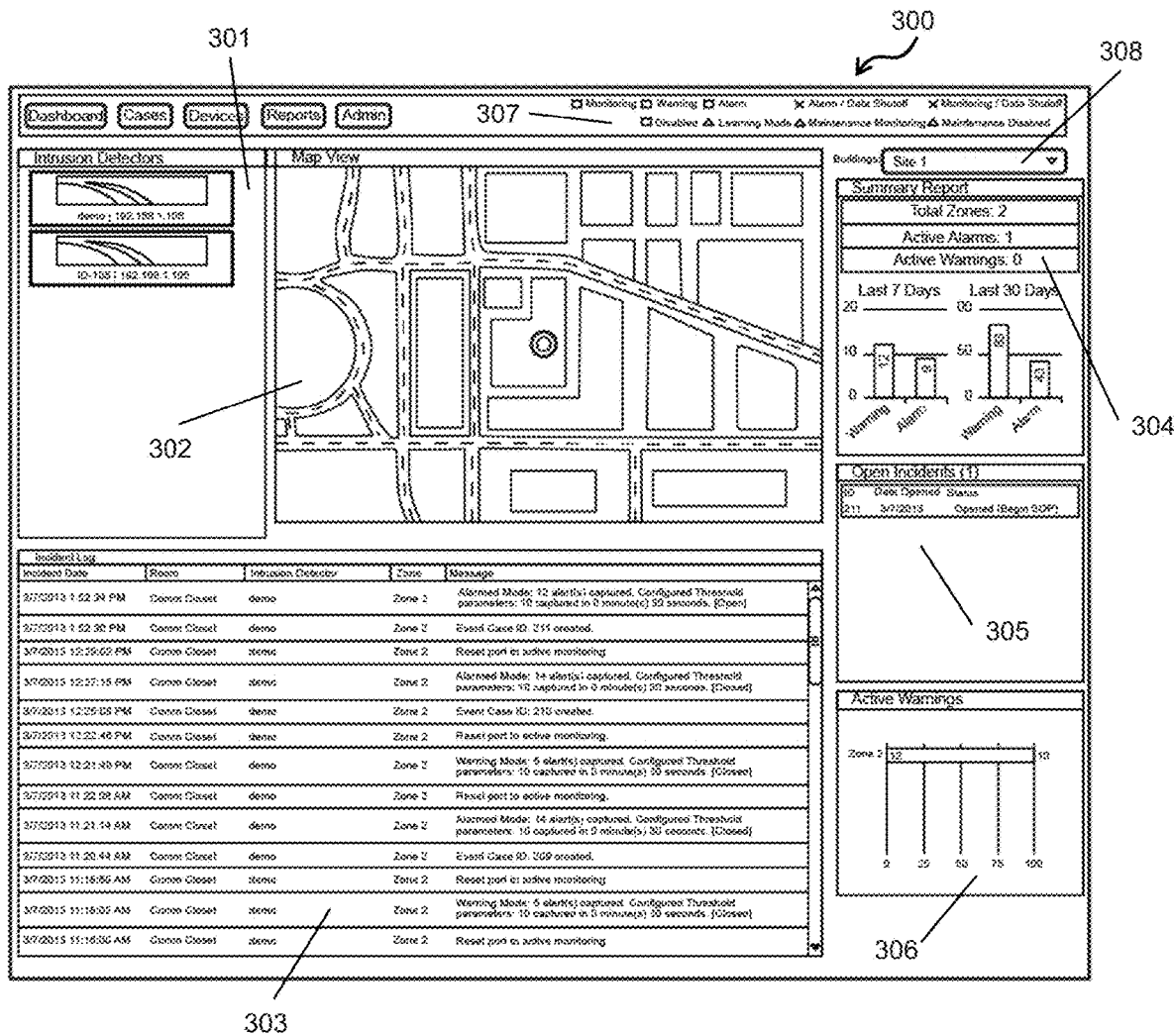
FIG. 3 illustrates a dashboard, in accordance with one or more embodiments.

Turning to FIG. 3, a dashboard 300 according to an embodiment is shown. Dashboard 300 may provide a consolidate view from a system and allow network personnel to determine the health of a network with multiple visual indicators.

Intrusion detectors panel 301 may display a list of all intrusion detectors managed by a system. Each intrusion detector displays a colored icon for a channel port. The colored icons may correlate to a label provided in legend 307. Each intrusion detector may be associated with a unique label, which may include information such as a user defined name, IP Address, etc. The background for the intrusion detector as shown in intrusion detector panel 301 may be programmed to change according to the status of the intrusion detector. For example, the background for an intrusion detector with a channel port in an alarmed state may be colored red. The list of intrusion detectors may be filtered to a building specific intrusion detector when a building is selected in a building drop down list 308 or when a building icon is selected in a map view panel 302.

Map view panel 302 may be configured to display a map image with visual indicators for a building managed by a system. The location of the visual indicators may be based on the geographic coordinates of a building. The color of the visual indicator may provide a combined status for each of the intrusion detector's channel ports managed in a building. According to one embodiment, the background colors may be determined in the following hierarchy:

If one or more channel ports are in an alarmed state, the color will be red.

If one or more channel ports are in a warning state and no channel ports are in an alarmed state, the color will be yellow.

If no channel ports are in an alarmed or a warning state, the color will be green.

Building list 308 may contain the building names for all of the buildings managed by a system. Building list 308 may be set to a default option, e.g. option 'A1', if there are multiple buildings managed by a system. Otherwise, the list may default to a single building managed by a system. When a user selects a building, a system may filter a list of intrusion detectors in intrusion detector panel 301 to only show the devices managed in the selected building.

An incident log panel 303 may display a list of events captured or enacted by a system in response to an alert. In one embodiment, incident log panel 303 may display Incident Date, Room Name, Intrusion Detector Name, Zone Name, and Incident Message for an incident. An incident log may contain the most recent incidents for a given time parameter which may be configured in a system.

A summary report panel 304 may display a total number of zones monitored by a system. Also included may be the number of active alarms in a system as well as the number of active warnings. Summary report panel 304 may also include a chart of all warnings and alarms captured by a system in a specified time period, such as the last 7 days or the last 30 days.

An open incidents panel 305 may include a list of open cases. Open incidents panel 305 may list the ID, Date Opened, and Status for an open case.

An active warnings panel 306 may include a list of all open and active warnings. As will be described in more detail below, active warnings may be set when a set number of disturbances or alerts are captured in a defined amount of time before reaching a configured alarm threshold. The active warning feature may be known as a Zonar Warning System, a Visual Active Alert Indicator. Active warnings panel 306 may also display a graphical chart to show the number of disturbances or alerts captured by a system for a given zone as well as the alarm threshold level for the given zone. When there are no active incidents, a system may display the last number of warning events on the screen, such as the last 5 warning events.

Figure 4:
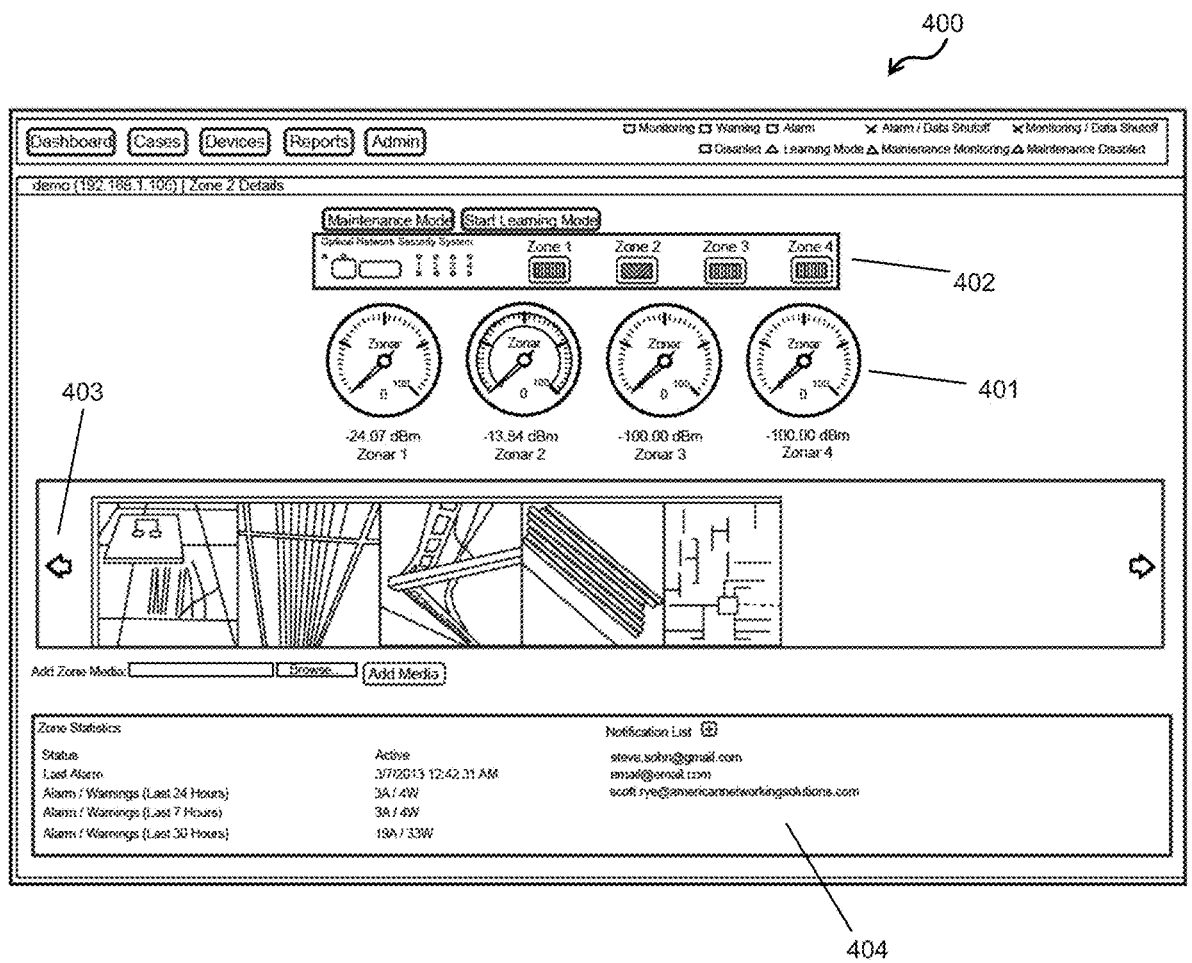
FIG. 4 illustrates a zone screen, in accordance with one or more embodiments.

Turning to FIG. 4, a zone screen display 400 according to an embodiment is shown. Zone screen display 400 may show a live representative view of a zone monitored by an intrusion detector. Zone screen display 400 may show a gauge 401, which may be known as a Zonar Warning Gauge, which displays a current active warning count received by a zone and a current power level reading for a zone. In the event of receiving an alert, zone screen display 400 may show the current alert count and the numeric alarm threshold value by displaying the values in a gauge 401. Similarly, in the event of receiving an alert, zone screen display 400 may show the severity of the alert by displaying a disturbance level in a power meter icon 402.

In one embodiment, power meter icon 402 may display the following levels:
Minor—based on a configurable threshold on a lower end of a disturbance spectrum.
Moderate—based on a configurable threshold in between a Minor and a Major threshold.
Major—based on a configurable threshold on a higher end of a disturbance spectrum.
Critical—indicates a boundary alarm, which may occur when a cable is damaged or removed from an intrusion detector port.

Zone screen display 400 may also show a media 403 related to a zone. Media 403 may be in an image, video, or document format. A system may allow users with the appropriate privileges to add or remove a zone media and enter the required descriptive text for each media item. Zone screen display 400 may include additional section 404 to display information such as status of the zone, time of last alarm, alarm/warnings in the past 24 hours/7 days/30 days, and notification list for the zone.

Figure 5:
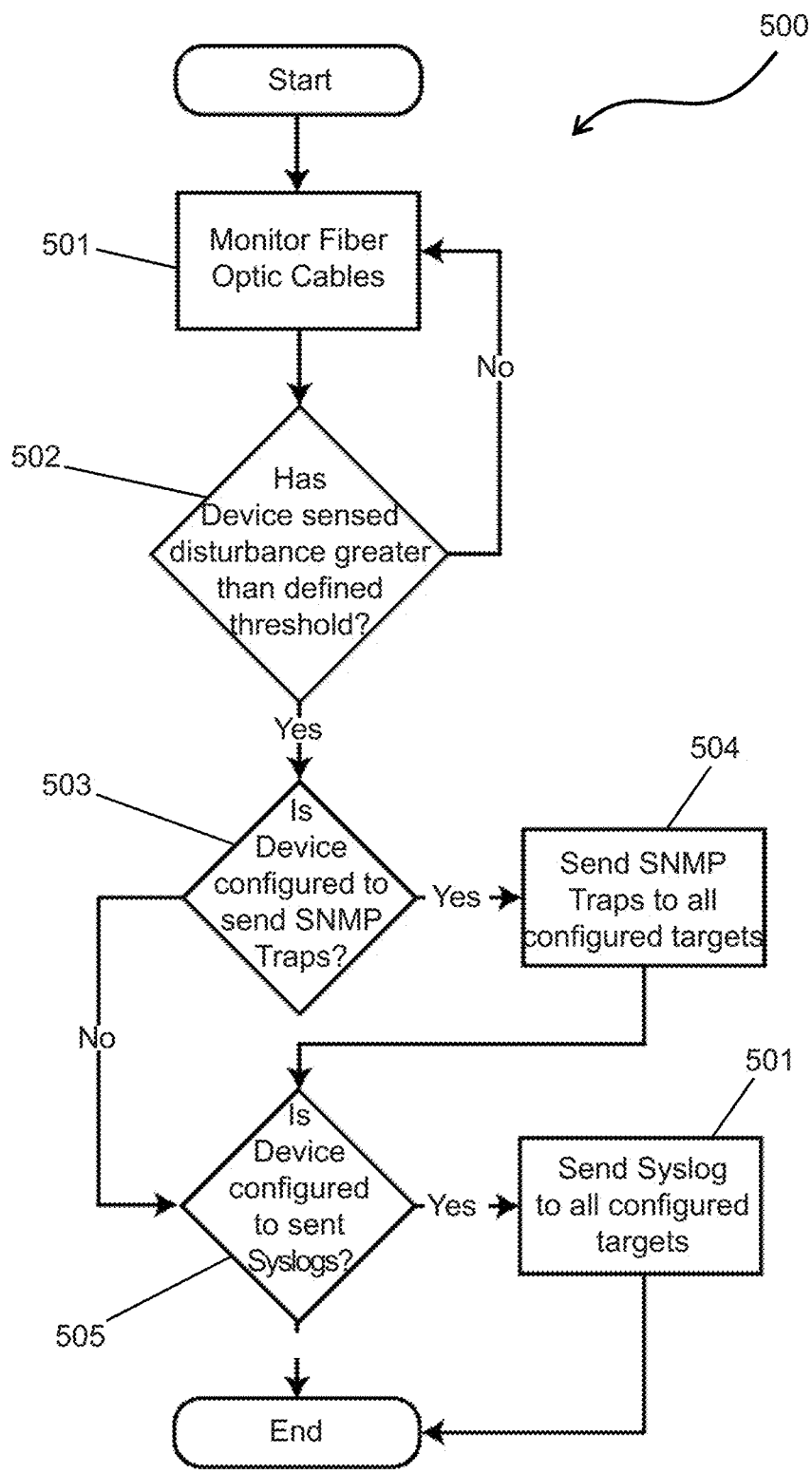
FIG. 5 illustrates a flowchart for monitoring alerts, in accordance with one or more embodiments.

Turning to FIG. 5, a flowchart for creating an alert 500 according to an embodiment is shown. In 501, an intrusion detector monitors a fiber optic cable. In one embodiment, monitoring may be performed by comparing a light transmitted to a light received in order to detect if a disturbance has occurred. In other embodiments, monitoring may be performed on vibration readings, frequency readings, changes in dB, optical time-domain reflectometer (OTDR), acoustic readings, distance determination based on reflective sensors, or combinations thereof. When a disturbance is detected, the disturbance may be compared to a defined threshold in 502. If the disturbance is less than the defined threshold, the intrusion detector may return to monitoring a fiber optic cable in 501. If the disturbance is greater than a defined threshold, the intrusion detector may send an alert to a target based on a configured setting.

In one embodiment, in 503 and 504, an intrusion detector configured to send simple network management protocol (SNMP) traps may send SNMP traps to configured targets. In 505 and 506, an intrusion detector configured to send Syslog entries may send Syslog entries to configured targets.

Figure 6:
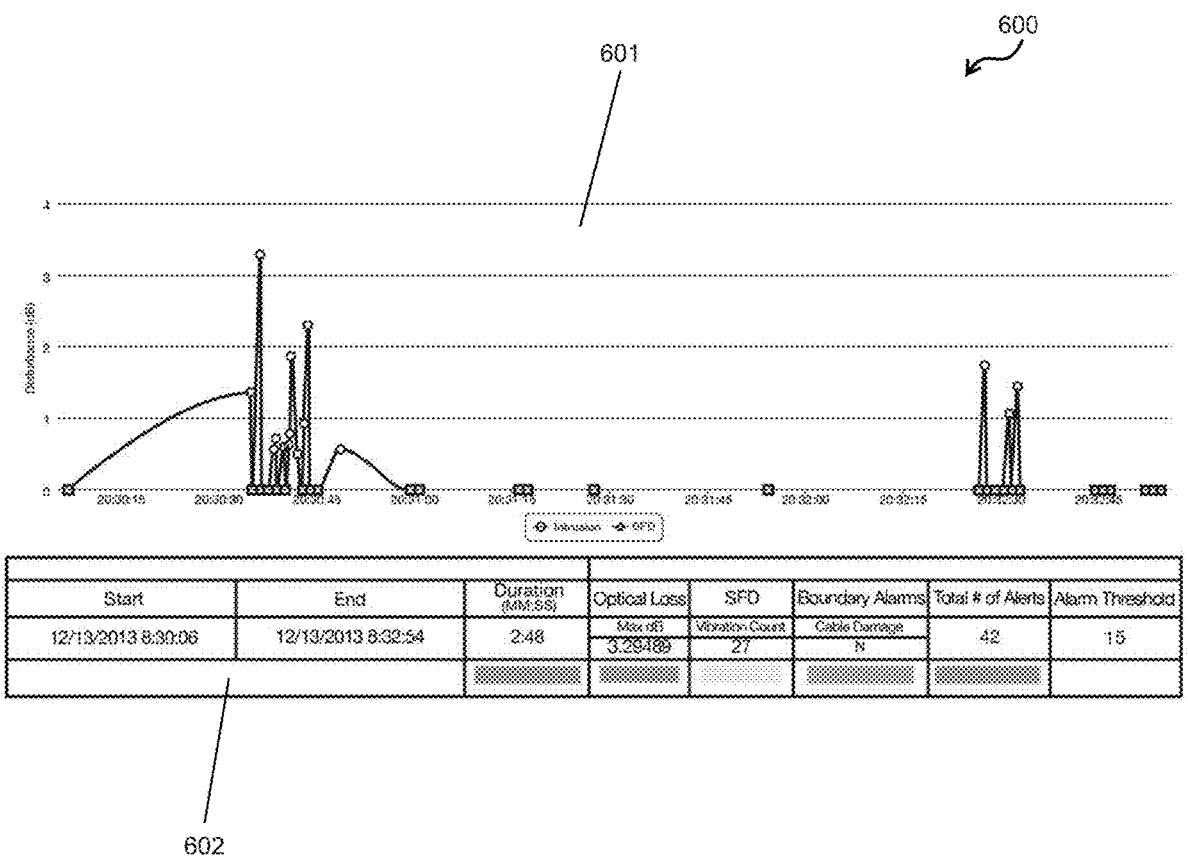
FIG. 6 illustrates a fiber forensic graphical display, in accordance with one or more embodiments.

In one embodiment, a detected disturbance may be presented to a user as a graphical representation. FIG. 6 shows a screen shot of one embodiment of a graphical representation of detected disturbances. Graph 601 shows a detected disturbance as a function of time. The graphical points may be plotted based on the level of dB difference registered on the transmission line during the disturbance and represented accordingly with a unique graphical icon. Additional graphical points may be plotted based on vibration and acoustic calculations registered on the transmission line during the disturbance and represented accordingly with a unique graphical icon. Summary section 602 shows different characteristics of the detected disturbances. The graphical representation may include time characteristics of the detected disturbance including the start time, end time, and total duration of the detected disturbance. The graphical representation may include disturbance characteristics of the detected disturbance including the maximum optical loss measured in dB, the number of registered vibration or acoustic events, the detection of cable damage, and the total number of distinct disturbances. The graphical representation may be used by a user to determine whether an immediate alarm response is required and which alarm response team member would be able to perform the on-site inspection. Similarly, the graphical representation may be used to indicate to the user where to perform the onsite inspection first. The graphical representation showing a short duration with fluctuating dB loss may indicate that inspection starts where the transmission line is readily exposed such as in a telecommunications closet. The graphical representation showing a long duration starting with many vibration or acoustic disturbances followed by multiple fluctuating dB loss disturbances may indicate an injection of an optical tap and that the inspection include an visual inspection of the entire transmission line. The graphical representation showing optical signatures indicative of accidental contact with a low severity would be represented accordingly. Similarly, optical signatures of a sever event such as the insertion of a fiber optic tap would be represented accordingly. While the graphical representation shown in FIG. 6 and described herein depicts an exemplary graphical representation of the detected disturbance, other graphical representations arranged with different plot points may be implemented based on different interfaces with various intrusion detection hardware.

Figure 7:
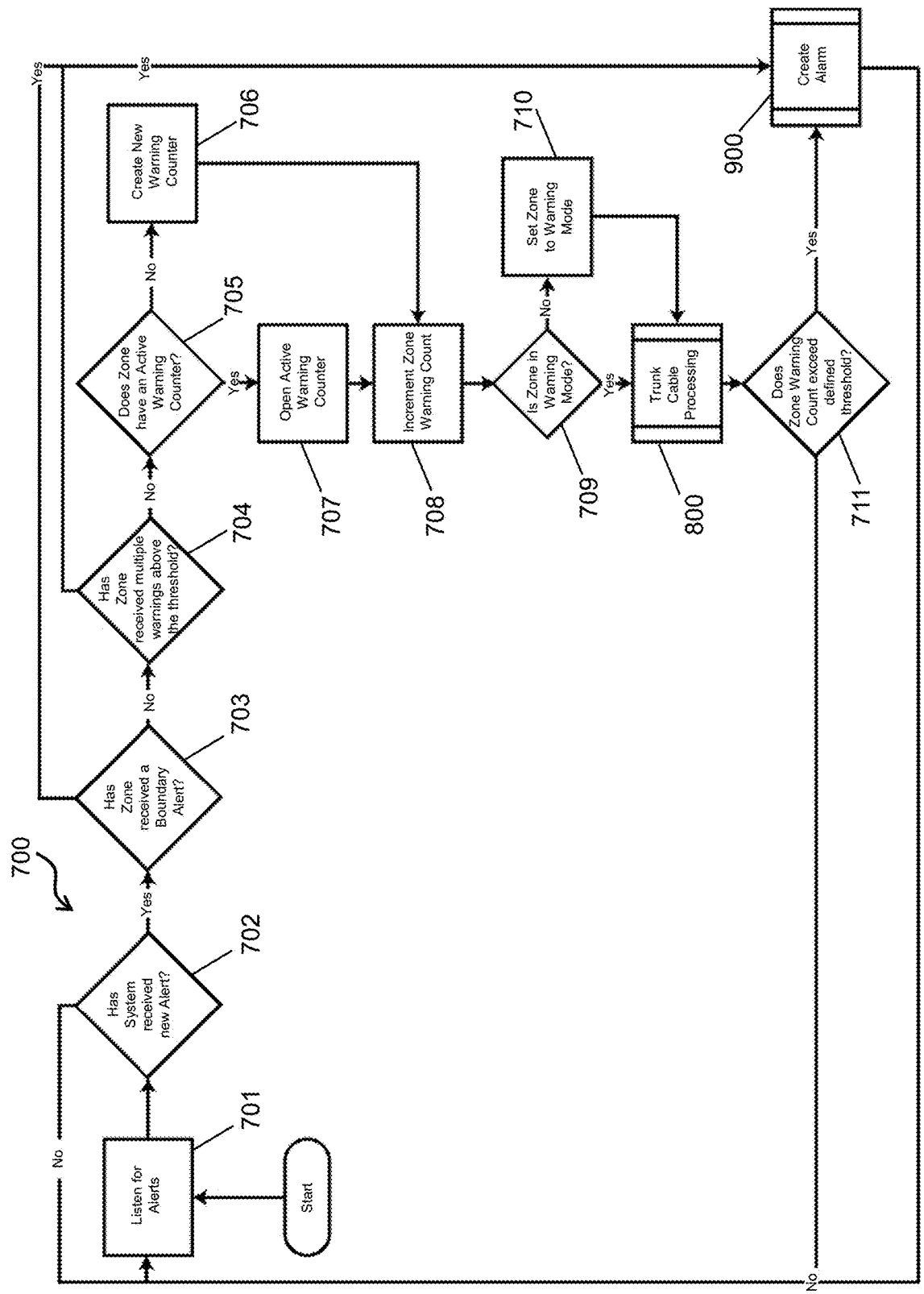
FIG. 7 illustrates a flowchart for processing alerts, in accordance with one or more embodiments.

In FIG. 7, a flowchart for alert processing 700 by a system according to an embodiment is shown. In 701, a system may keep an open port to listen for an alert. In 702, the system determines if an alert has been received by a target. If an alert has been received, the system translates the alert to determine a zone number for the alert. In 703, the system determines if the alert is a boundary alarm. Boundary alarms may be classified as critical severity. If the alert is a boundary alarm, the system creates an alarm as defined in 'create alarm' sub process 900.

If the system determines that the alert is not a boundary alarm in 703, the system may check in 704 to see if multiple warnings above a defined threshold or criteria in a have been received in a defined period of time. For example, the system may check to see if there have been 3 other previous warnings occurring within the past 24 hours for the zone. If the zone does have multiple warnings that meet a defined criteria, the system creates an alarm as defined in 'create alarm' sub process 900.

If the system determines in 704 that the zone has not have multiple warnings that meet a defined criteria, the system may check to see if the zone has an active warning counter in 705. The system creates a new warning counter for a zone in 706 if the zone does not have an active warning counter. If the zone does have an active warning counter, the system opens the warning counter in 707. With an active warning counter identified for the zone, the system increments the warning count for the zone in 708. In 709, the system determines the status of the zone. If the zone is in a warning mode, the system proceeds to a trunk cable processing sub process 800. A warning mode may be defined as a warning count of greater than 1. If the zone is not in a warning mode, the system sets the zone to a warning status in 710 and then proceeds to 'trunk cable processing' sub process 800.

In one embodiment, the system evaluates trunk cable processing in a 'trunk cable processing' sub process 800. After the trunk cable processing sub process, the system moves on to 711 to determine if the warning count exceeds the defined threshold for the zone. If the warning count exceeds the defined threshold for the zone, the system creates an alarm in 'create alarm' sub process 900 and then returns to 701 to listen for alerts. If the warning count does not exceed the defined threshold for the zone, the system returns to 701 to listen for alerts. While the flowchart shown in FIG. 7 and described herein depicts an exemplary workflow for processing an alert, other workflows arranged in a different order may be implemented.

Figure 8:
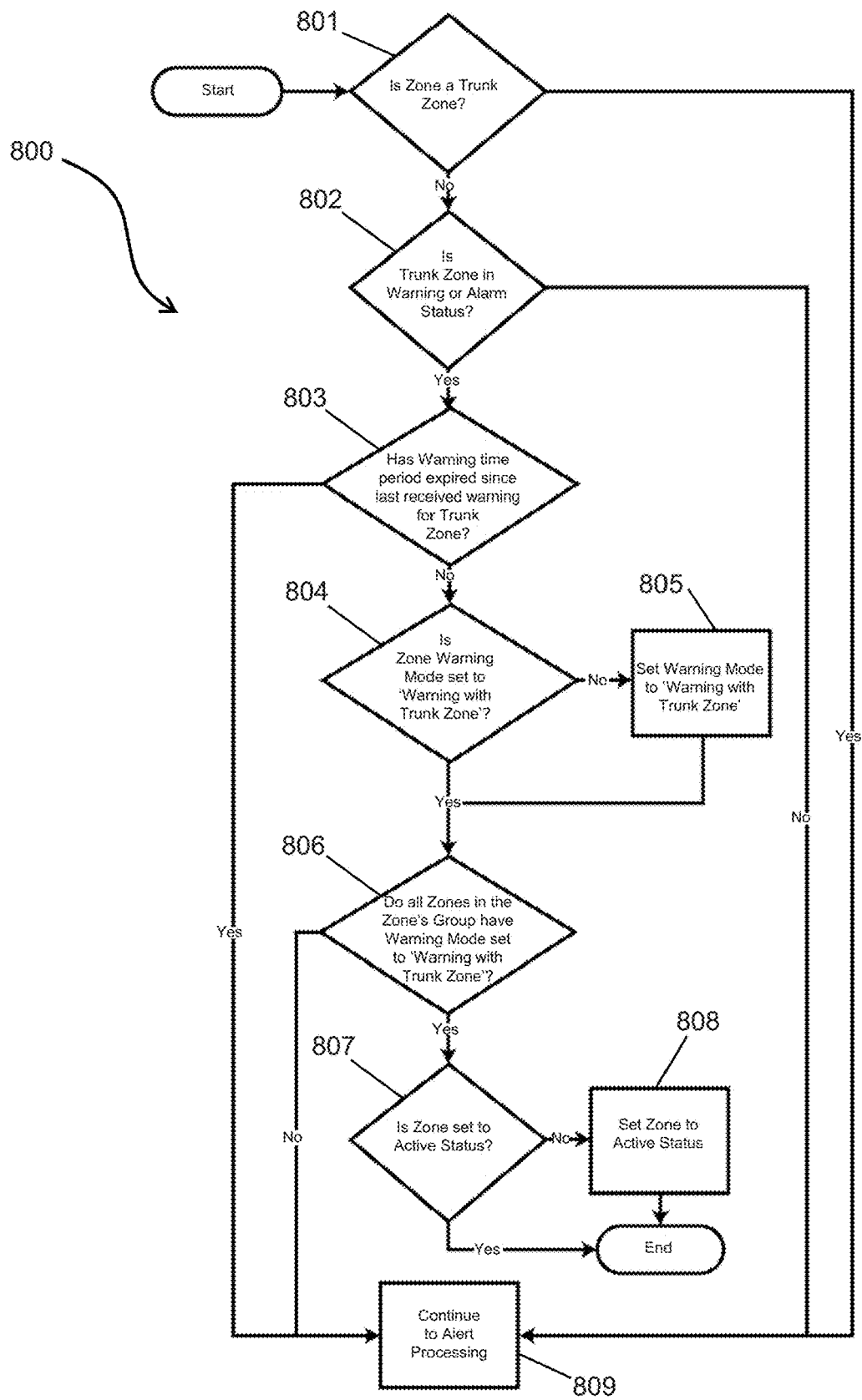
FIG. 8 illustrates a flowchart of a trunk cable processing subprocess, in accordance with one or more embodiments.

In FIG. 8, a flowchart for 'trunk cable processing' sub process 800 according to an embodiment is shown. In 801, a system determines if the zone is a trunk zone. In one embodiment, a trunk zone may be defined as a zone that includes a trunk cable. A trunk cable may be co-bundled with monitoring cables for each floor. At each floor, the cables dedicated to that floor may distribute out to the floors. A trunk cable and remaining floor cables may continue down a riser closet (e.g. communication network closets that traverse up and down an area of a building). Having a dedicated trunk zone that may be monitored by a system may allow for a logical separation of user zones (e.g. network cables distributing data throughout a floor of a building) from a riser closet and a source closet (e.g. place where network data for a building originates). Without a trunk cable, on an intrusion or disturbance, an investigator may be required to inspect an entire user zone and then back up a riser closet and back to a source closet. Logical separation may allow for meeting an inspection requirement, such as an inspection being required within 15 minute of an alert.

If the zone is a trunk zone, the system proceeds to 809 to evaluate the alert as a standard zone and returns to step 711 as described above. If the zone is not a trunk zone, the system continues to 802 to determine if the trunk zone is in a warning or an alarmed status. If the system is not in a warning or alarmed status, the system proceeds to 809 to evaluate the alert as a standard zone and returns to step 711 as described above. If the trunk zone is in a warning or an alarmed status, the system proceeds to 803 and determines if a warning time period has expired since the last received warning for the trunk zone. The warning time period may be configured by a user to a desired length. If the warning time period has expired, this may indicate an intrusion attempt on a separate zone in addition to an intrusion attempt on the trunk zone and the system proceeds to 809 to evaluate the alert as a standard zone and returns to step 711.

If the system determines in 803 that the warning time period has not expired, this may indicate that there is an alert in a zone in conjunction with the trunk zone and the system proceeds to 804. In 804, the system determines if the zone warning mode has been set to a predetermined setting. In one embodiment, the predetermined setting may be 'Warning with Trunk Zone'. In one embodiment, if the zone does not have a warning mode of 'Warning with Trunk Zone' 804, the system sets the warning mode to 'Warning with Trunk Zone' in 805 prior to moving onto 806. In 806, the system evaluates if all zones in the zone's zone group have warning modes set to 'Warning with Trunk Zone'. In one scenario, if a cable in a riser closet is disturbed, the trunk cable and all of the cables that are monitoring the floors below will set off alerts. In this case, the floor cables will have a 'Warning with Trunk Zone' status so the system can separate these from a user zone. If not, the system proceeds to 809 to evaluate the alert as a standard zone and returns to step 711.

If all zones in the zone's zone group have warning modes set to 'Warning with Trunk Zone', this may indicate that the entire zone group has received alerts in conjunction with the trunk zone. In that instance, the system will not evaluate the alert as a standard zone, but instead the system may suppress it. The system then proceeds to 807 to determine if the zone is set to active status. If not, the system sets the zone to active status in 808 and proceeds to continue to alert processing. While the flowchart shown in FIG. 8 and described herein depicts an exemplary workflow for a trunk cable processing sub process, other workflows arranged in a different order may be implemented.

Figure 9:
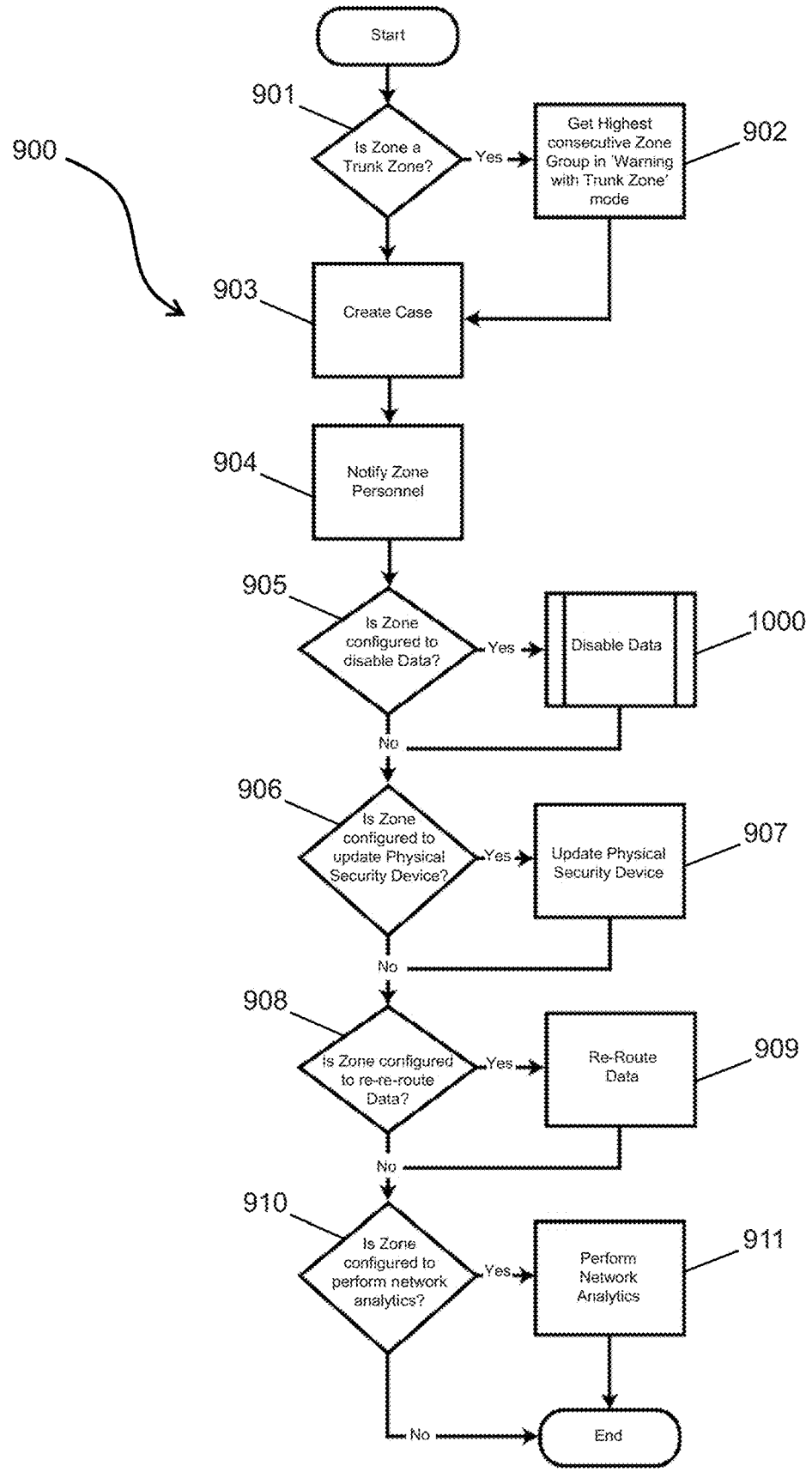
FIG. 9 illustrates a flowchart of a create alarm subprocess, in accordance with one or more embodiments.

Turning to FIG. 9, a flowchart for 'create alarm' sub process 900 according to an embodiment is shown. A system may create an alarm according to 'create alarm' sub process 900 when a zone receives a boundary alert, when a zone receives multiple warnings above a criteria, or when a zone warning count exceeds a defined threshold for the zone. In 901, a system evaluates if a zone is a trunk zone. If the zone is a trunk zone, the system may retrieve the highest consecutive zone group with a warning mode of 'Warning with Trunk Zone' in 902. A system may indicate this information in a case as described in more detail below.

A system may create and opens a case in 903. If a case was opened due to a boundary alert, a system may notate the case accordingly. In 904, a system may notify a personnel related to a zone. If a case was opened due to a boundary alert, a system may notate the notification accordingly. In 905, a system may determine if a zone is configured to disable data. If yes, the system may perform a disable data sub process 1000. In 906, a system may determine if a zone is configured to update a physical security device. If yes, the system may perform the action based on a zone setting by sending a command to the physical security device management platform in 907. In 908, a system may determine if a zone is configured to re-route network data. If yes, the system re-routes data based on a zone setting by sending a command to an optical circuit switch in 909. In 910, a system may determine if a zone is configured to perform network analysis. If yes, the system performs an action based on a zone setting by sending a command to an optical test access point in 911. A system may communicate with a network analytic tool based on a defined action. While the flowchart shown in FIG. 9 and described herein depicts an exemplary workflow for a create alarm sub process, other workflows arranged in a different order may be implemented.

Figure 10:
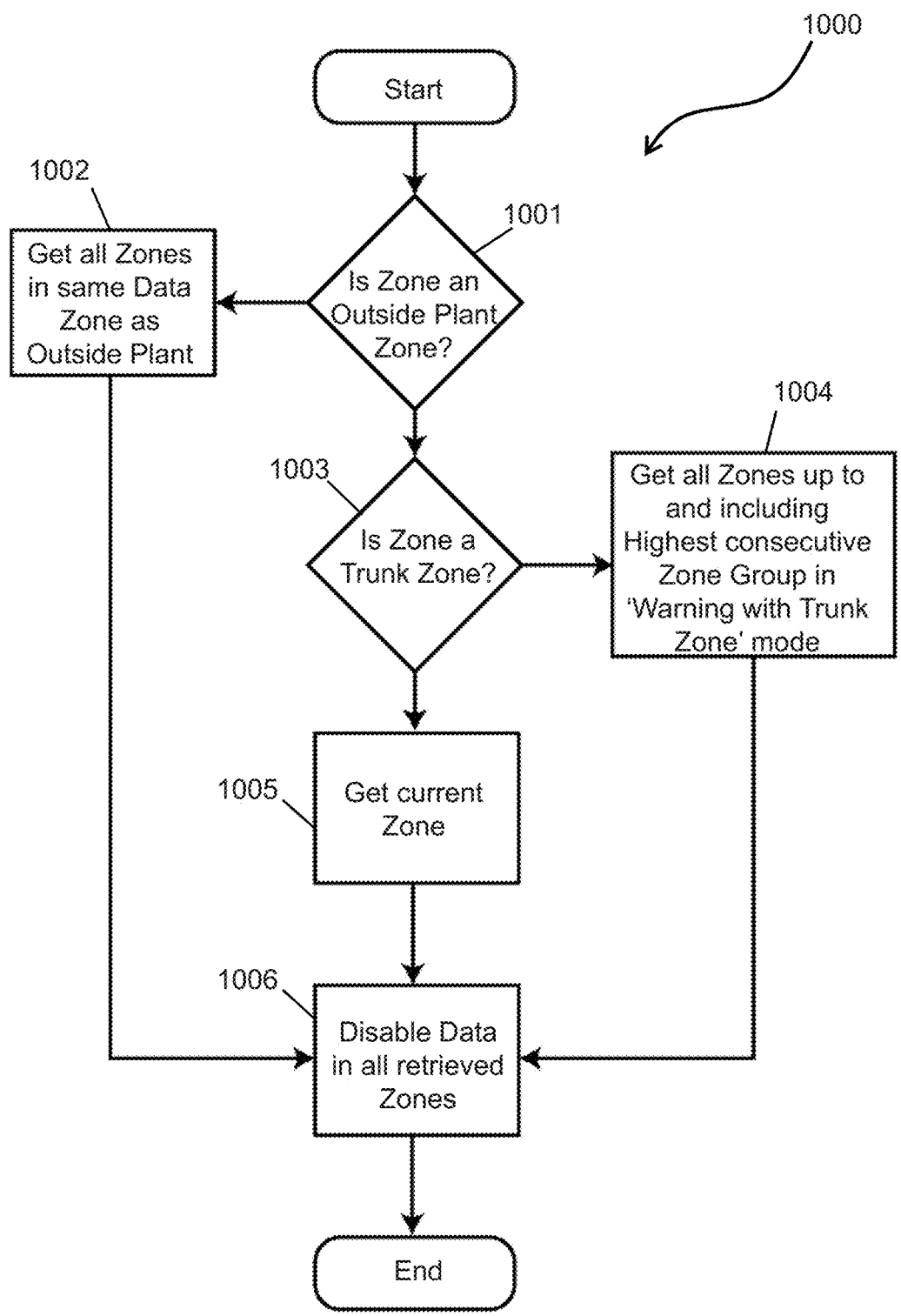
FIG. 10 illustrates a flowchart for a process to disable data, in accordance with one or more embodiments.

In FIG. 10, a flowchart for 'disable data' sub process 1000 according to an embodiment is shown. In 1001, a system may evaluate a zone type. In 1002, if a zone is an outside plant zone, the system may collect all zones in a same data zone as the outside plant zone. The system may then proceeds to 1006 to disable data in all of these zones.

In 1003, a system may evaluate if a zone is a trunk zone. If yes, the system collects all zones up to and including the highest consecutive zone group with a warning mode of 'Warning with Trunk Zone' in 1004. The system may then proceeds to 1006 to disable data in all of these zones. In 1003, if a system determines that a zone is not a trunk zone but is a user zone, the system may retrieve the current zone in 1005 and proceed to disable data in this zone in 1006.

A system may be configured to disable data by directly communicating with an optical line terminal and/or network switch by sending a command to the optical line terminal and/or network switch. A system may also be configured to disabled data by communicating with an optical circuit switch by sending a command to the optical circuit switch. While the flowchart shown in FIG. 10 and described herein depicts an exemplary workflow for a disable data sub process, other workflows arranged in a different order may be implemented.

Figure 11:
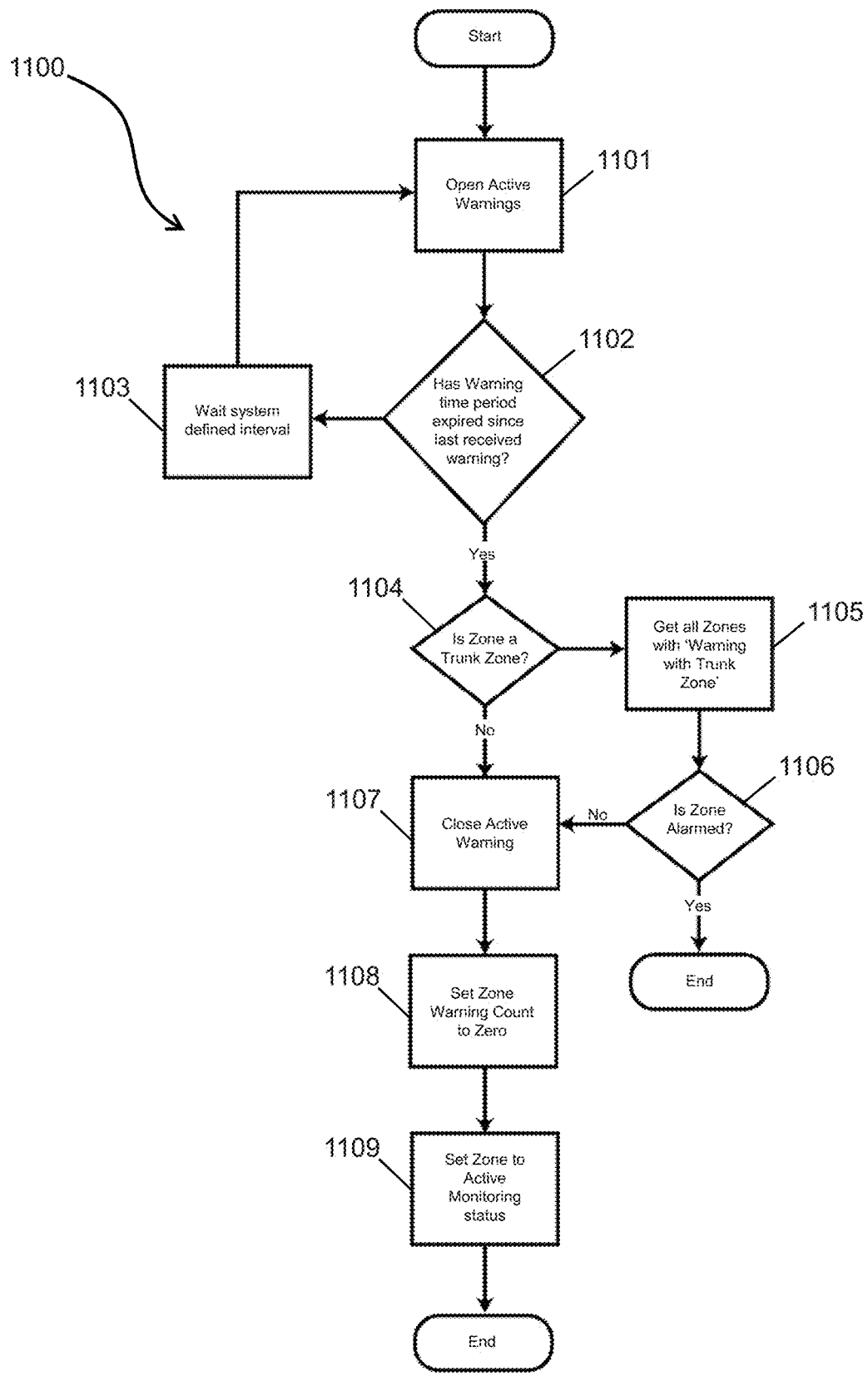
FIG. 11 illustrates a flowchart for processing open warnings, in accordance with one or more embodiments.

Turning to FIG. 11, a work flow for processing open warnings 1100 according to an embodiment is shown. In 1101, on a defined interval, a system may open all active warnings. In 1102, a system may determine if a warning time period has elapsed since last receiving a warning timestamp. If the warning time period has not elapse, the system may proceed to 1103 and wait for a defined interval before returning to check all active warnings. If the warning time period has elapsed, the system may proceed to 1104 to determine if a zone is a trunk zone. If the zone is not a trunk zone, the system may proceed to 1107 and close an active warning. If the zone is a trunk zone, the system may collect all zones up to and including the highest consecutive zone group with a warning mode of 'Warning with Trunk Zone' in 1105 and may then proceed to 1106. In 1106, a system may check if the trunk zone is alarmed. If not, the system may close the active warning in 1107. In 1108, a system may set a zone warning count to zero. In 1109, a system may set a zone status to active monitoring. While the flowchart shown in FIG. 11 and described herein depicts an exemplary workflow for processing open warnings, other workflows arranged in a different order may be implemented.

Figure 12:
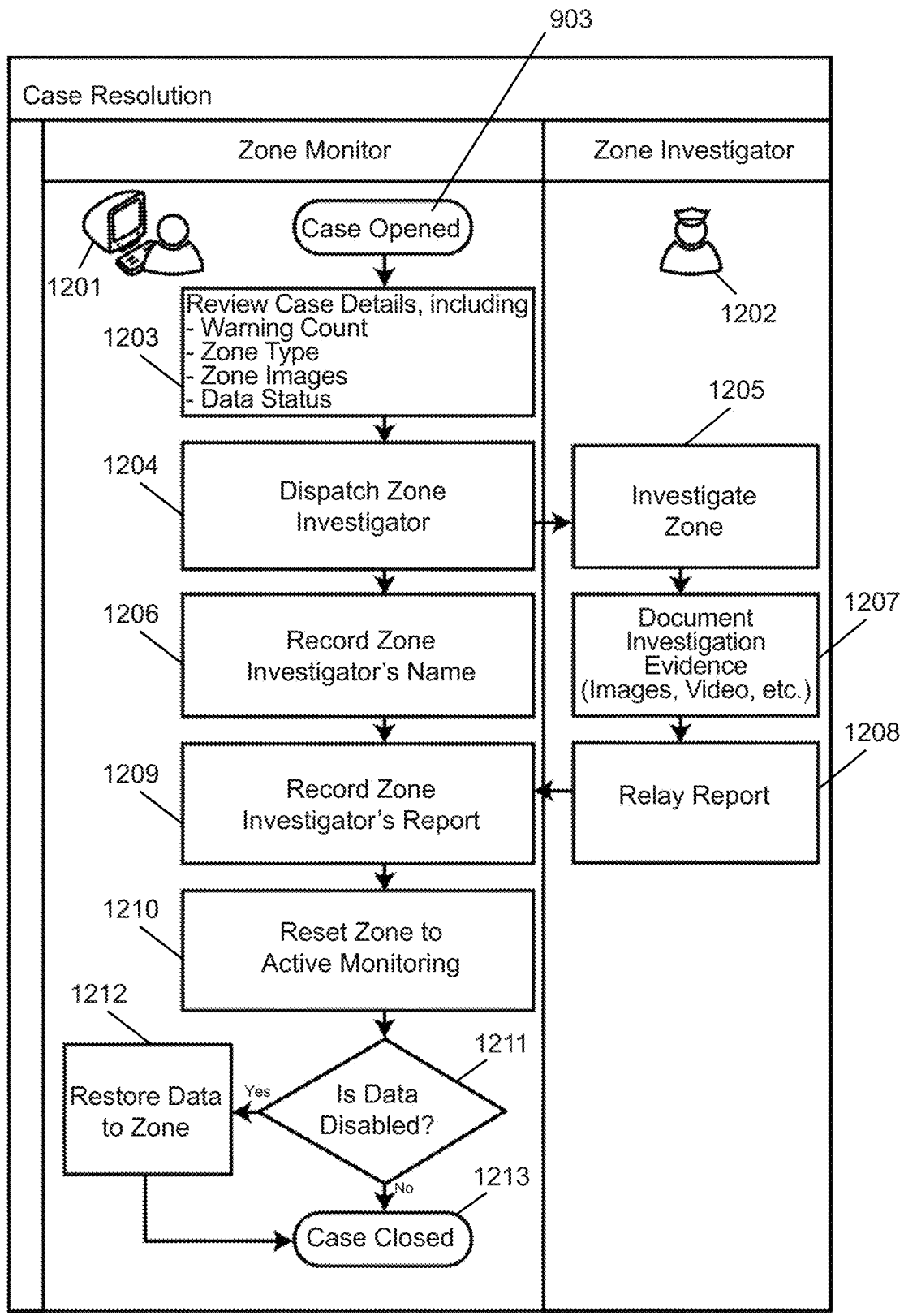
FIG. 12 illustrates a chart showing a process for case resolution, in accordance with one or more embodiments.
Figure 13:
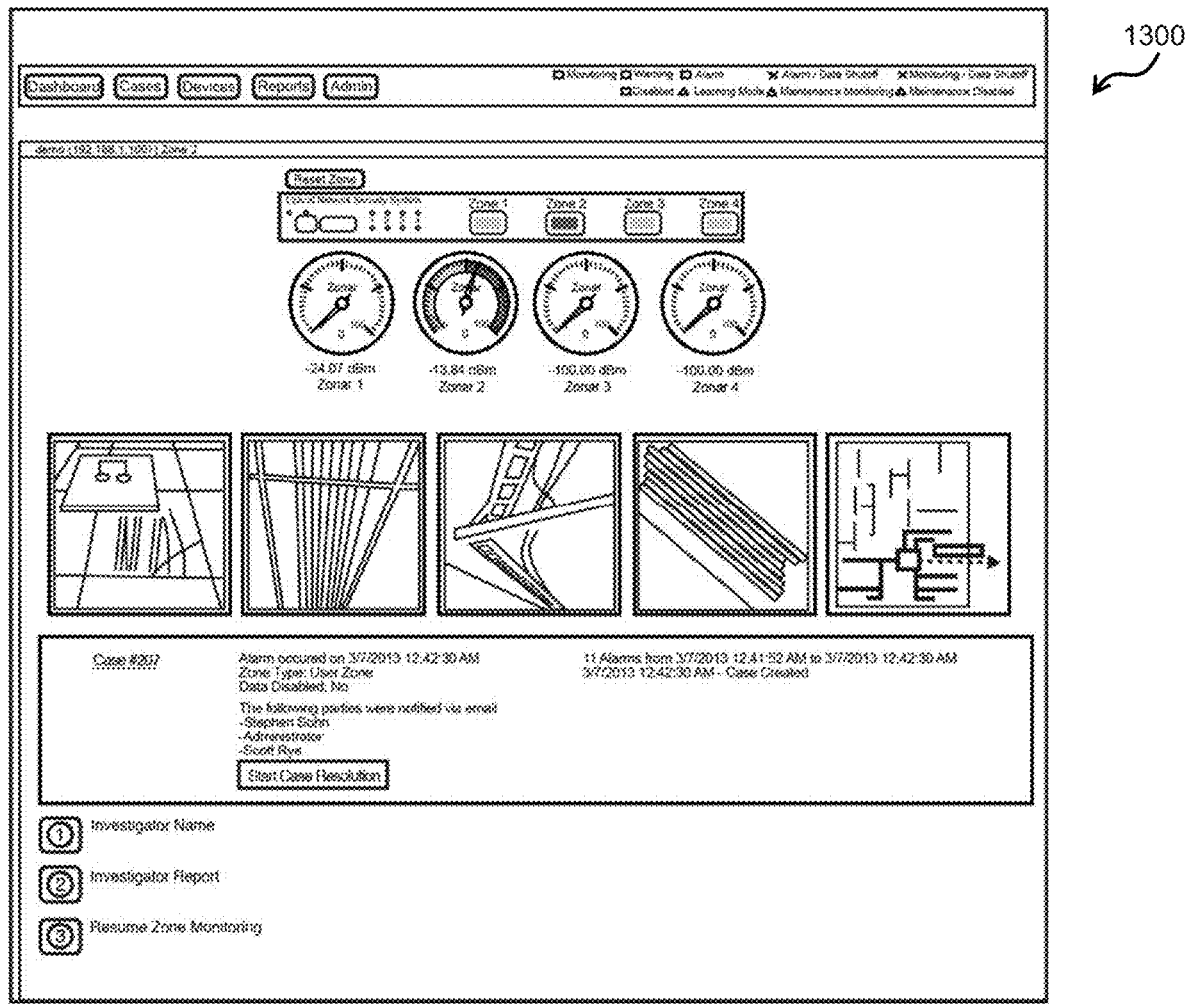
FIG. 13 illustrates a case detail screen, in accordance with one or more embodiments.

FIG. 12 shows a case resolution process according to an embodiment. In 1203, when a case is created, a zone monitor 1201 may open the case and review the case details. The case details displayed by a system may include warning count, zone type, zone images, zone inspection guide, notified contact personnel, and status of the data network. A case detail screen according to one embodiment is shown in FIG. 13.

In 1204, zone monitor 1201 may dispatch an investigator 1202 assigned to a zone. In 1206, zone monitor 1201 may record zone investigator's 1202 name. In 1205, zone investigator 1202 may investigate a zone based on a Standard Operating Procedure defined by a system for a zone. In 1207, zone investigator 1202 may document evidence such as images or videos of the inspection. In 1208, upon completion of an investigation, zone investigator 1202 may relay a full report in back to zone monitor 1201, including investigation evidence, a written report, and a final determination. Final determinations may include items such as intrusion, accidental contact, unscheduled maintenance, natural disaster, and other items.

In 1209, zone monitor 1201 may record zone investigator's 1202 report into a system. In 1210, a system may enable zone monitor 1201 to reset monitoring on a zone.

In 1211, when zone monitor 1201 resets monitoring on a zone, a system may check to see if data was disabled in a zone. If so, the system may allow zone monitor 1201 to restore data to the zone in 1212. Zone monitor 1201 may then restore data to the zone.

In 1213, a system may then close a case and track a time stamp for each event for audit and reporting purposes. While the workflow for a case resolution process as shown in FIG. 12 and described herein depicts an exemplary workflow, other workflows arranged in a different order may be implemented.

Figure 14:
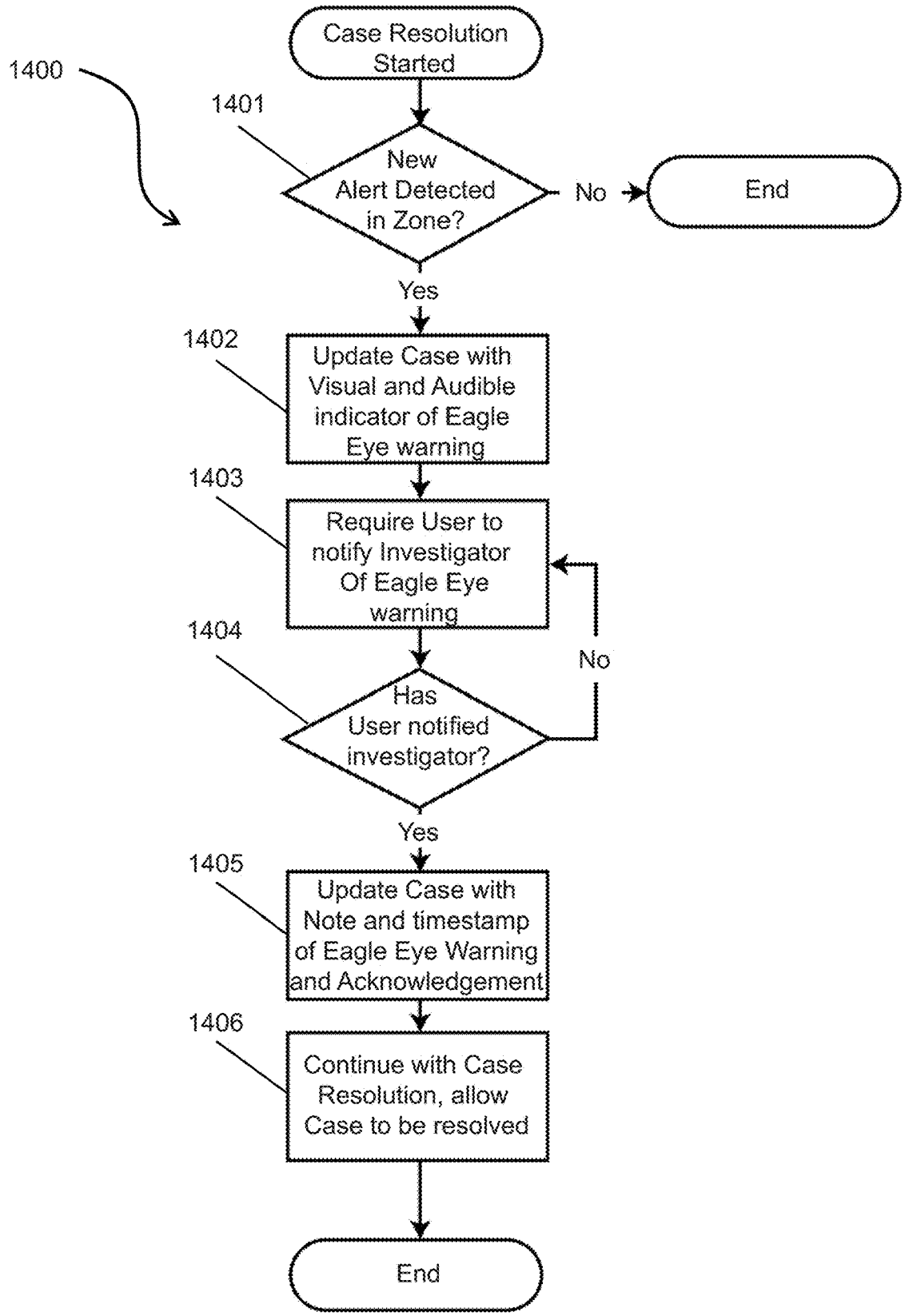
FIG. 14 illustrates a flowchart for continued monitoring during case management, in accordance with one or more embodiments.

In an embodiment, when a case is open and under review, a system may continue to monitor for new alerts in a zone. FIG. 14 shows a flowchart 1400 of a process for a system to continue monitoring during a case management. In 1401, a system may determine if a new alert is detected in a zone. In 1402, if a new alert is detected, the system may update an interface with visual and audible indicators, such as an Eagle Eye Zonar warning. This scenario may occur if an intrusion attempted is continuing. This process may provide an investigator situational awareness and allow for additional safety or response measures.

In 1403, a system may require a user to notify an investigator of the Eagle Eye Zonar warning. In 1404, a system may determine if a user has notified an investigator. If not, the system may return to 1403 to require a user to notify an investigator. In 1405, after a user notifies an investigator, the system may update a case note with information and timestamp for the Eagle Eye warning detection and user acknowledgement. In 1406, a system may then allow a user to continue with a case resolution process. While the flowchart shown in FIG. 14 and described herein depicts an exemplary workflow for a process to continue monitoring during a case management, other workflows arranged in a different order may be implemented.

According to an embodiment, a system may allow a user with an appropriate privilege the ability to modify a case resolution workflow. A system may allow for adding or removing steps into a workflow. A system may allow for routing and re-routing approval or disapproval functions to a user, collection of users, roles or a collection of roles in a system. Where appropriate, a system may allow for modification of a workflow through a graphically based user interface.

In one embodiment, a system may be configured for predictive analysis. A system may calculate the captured alert signatures (duration, count, maximum/minimum/average power, etc.) for a case as well as an associated case resolution status. A system may provide artificial intelligence capabilities in analyzing an alert signature and a resolution to compute likelihood scores for possible causes for an alert.

For a case, a system may use a predictive analysis to offer likelihood scores on the case resolutions status. For each warning, a system may provide a real-time likelihood score for a cause of an alert.

Other features of a system may provide the ability to continuously monitor a given IP address range to discover and enroll unregistered intrusion detectors. A system may allow a user to create a new enrollment task. An enrollment task may include:

Starting IP Address
Ending IP Address
Login ID for Intrusion Detector
Password for Login ID for Intrusion Detector
Frequency at which the Enrollment Task should run (Never, Daily, Weekly)
SNMP Credentials for communication with the Intrusion Detector
Option to All Remote Reset of the Channel Ports of the Intrusion Detector
Option to Disable Data in the Zones when an Alarm occurs
Warning Threshold Count
Warning Threshold Time Period
Alarm Response for Intrusion Alerts (None, Report, Report & Halt, Halt)
Alarm Response for Boundary Alerts (None, Report, Report & Halt, Halt)
Alarm Response for Smart Filter Detect Alerts (None, Report, Report & Halt, Halt)

Device Availability Time Period

During enrollment, a system may query a discovered device and gather device specific information such as the model and the port count of the device. A system may use the information to dynamically enroll the device. A system may provide the ability to discover a variety of device models and types from one enrollment task.

After enrollment completes, a system may read an intrusion detector threshold setting. A system may disable monitoring on channel ports that are determined to not have a fiber cable plugged into it. A system may provide a wizard based workflow to allow a user to provide additional information to configure an enrolled device.

According to another embodiment, a system may provide the ability to set a specific channel port on an intrusion detector into a Learning Mode or Auto Configure. In this mode, an intrusion detector observes a fiber for a channel port for a configurable period of time to determine an optimal monitoring parameter that may be used for monitoring intrusions, excessive optical gains/losses or environmental changes.

A system may be configured to allow a user with an appropriate privilege an option to perform Learning Mode. When the option is selected, the system may present an allowed user with a screen offering various time periods. When a user initiates a task in a system, the system sends an appropriate command to an intrusion detector to begin Learning Mode. A system may set the channel port Report only for any alert and not send Halt alerts. At any time during Learning Mode, a system may allow a user to abort Learning Mode. A system may continue to receive a detected alert during Learning Mode and may record the results in the system for further consideration by a user.

When Learning Mode completes, a system may receive a notification from an intrusion detector. A system may read and record a threshold setting determined during Learning Mode and associate the setting to a specific zone. A system may reset a channel port back from Report only to a previous setting.

A system may read and record a current threshold setting of a channel port of an intrusion detector and associate the setting to a specific zone. For a setting, a system may indicate if the setting was Learned, set by Default, or set by a User.

A system may allow a user with an appropriate privilege the ability to sync a setting from a device to a system. A system may allow a user with an appropriate privilege the ability to edit any or all of the settings. When a user initiates a task in a system to update a setting, the system may send an appropriate command to an intrusion detector to update the settings based on the user provided values. Any settings unchanged by a user remain unaffected.

A system may be deployed for various purposes. In one embodiment, a system may be used to verify whether a data infrastructure is suitable for alarmed carrier PDS. This testing process maybe used pre-deployment on existing cables and conduit or during post-deployment testing process to validate new installations of alarmed cables and conduit.

Figure 15:
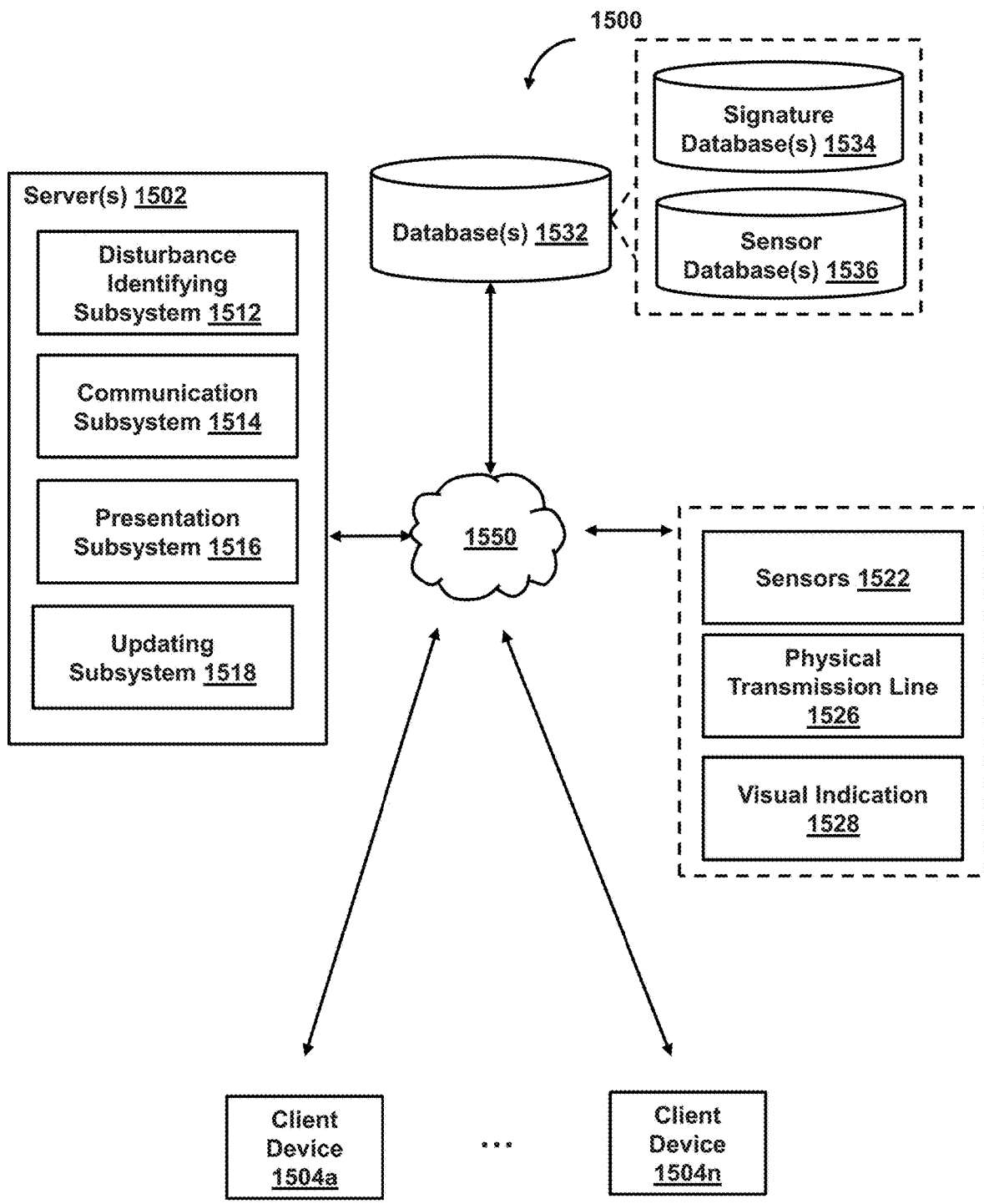
FIG. 15 illustrates a system for facilitating detection of a disturbance on an information transmission line, in accordance with one or more embodiments.

FIG. 15 shows a system 1500 for facilitating detection of a disturbance on an information transmission line, in accordance with one or more embodiments. As shown in FIG. 15, system 1500 may include server(s) 1502, client device 1504 (or client devices 1504a-1504n), network 1550, database 1532, sensors 1522, physical transmission line 1526, visual indication 1528, and/or other components. Server 1502 may include disturbance identifying subsystem 1512, communication subsystem 1514, presentation subsystem 1516, updating subsystem 1518, and/or other components. Each client device 1504 may include any type of mobile terminal, fixed terminal, or other device. By way of example, client device 1504 may include a desktop computer, a notebook computer, a tablet computer, a smartphone, a wearable device, or other client device. Users may, for instance, utilize one or more client devices 1504 to interact with one another, one or more servers, or other components of system 1500. It should be noted that, while one or more operations are described herein as being performed by particular components of server 1502, those operations may, in some embodiments, be performed by other components of server 1502 or other components of system 1500. As an example, while one or more operations are described herein as being performed by components of server 1502, those operations may, in some embodiments, be performed by components of client device 1504. Further, although the server 1502, client device 1504, sensors 1522, physical transmission line 1526, visual indication 1528, and database 1532 are illustrated as being separate and connected via network 1550, it should be understood that one or more of the server 1502, client device 1504, sensors 1522, physical transmission line 1526, visual indication 1528, and database 1532 may be co-located. Further, although the database 1532 is illustrated as being separate from the server 1502 and the client device 1504, the database 1532 may be located within the client device 1504 and/or server 1502. One or more components (and their functions) of the systems illustrated in FIGS. 1 and 2 may correspond to one or more components (and their functions) of the systems illustrated in FIGS. 15, 33, and 34, and vice versa. Further, one or more functions described above with regard FIGS. 1-14 may be performed by one or more components of the systems illustrated in FIGS. 15, 17, 19, 20, 33, and 34. One or more functions described below with regard to FIGS. 15-34 may be performed by one or more components of the systems illustrated in FIGS. 1 and 2.

Sensor-Based Disturbance Detection and Shutdown of Network Data Flow

In some embodiments, server 1502, via sensors 1522, may monitor the physical transmission line 1526 (e.g., a fiber optic information transmission line). As an example, FIG. 7 describes a system that may keep an open port to listen for an alert (see step 701 in FIG. 7). Further, in some embodiments, system 1500 may detect, via one or more sensors 1522, a disturbance on a physical transmission line, where the detected disturbance does not exceed a first present threshold for triggering alerts of a first alert type. With respect to FIG. 7, for example, a system may determine whether a zone has multiple warnings that meet one or more predefined criteria (see step 704 in FIG. 7). System 1500 may also detect, via one or more sensors 1522, a disturbance on the physical transmission line, wherein the detected disturbance does not exceed a first preset threshold for triggering a network data flow shutdown response. With respect to FIG. 2, for example, a system may disable or re-route data by sending a command to a networking equipment using data port address in the event of an intrusion attempt. The system may enable or disable data on a specific port and obtain details for the port.

Additionally, in some embodiments, the system 1500 (e.g., server 1502) may determine, responsive to the detection via the sensor 1522, a count for a number of disturbances within a preset time period that do not exceed the first preset threshold and determine, whether the count, for the number of disturbances that do not exceed the first preset threshold, exceeds a second preset threshold, wherein the second preset threshold corresponds to a preset number of allowable disturbances, not exceeding the first preset threshold and within the preset time period, before one or more alerts of the first alert type are to be triggered. Further, in some embodiments, an alert may be triggered of a first type responsive to a determination that the count exceeds the second preset threshold. With respect to FIG. 7, for example, a warning counter may increment a warning count for a zone when it is determined that the zone does not have multiple warnings that meet one or more predefined criteria (see steps 704, 705, 707, and 708 in FIG. 7), and an alarm may be triggered when the warning count exceeds a predefined threshold (see steps 711 and 900 in FIG. 7). Also, in some embodiments, the network data may be caused to be shut down to one or more network endpoints proximate to the detected disturbance on the physical transmission line response to a determination that the count exceeds the second preset threshold. As discussed, for example, a system may disable or re-route data by sending a command to a networking equipment using data port address in the event of an intrusion attempt. The system may enable or disable data on a specific port and obtain details for the port.

Disturbance Location and/or Type Identification

Figure 16:
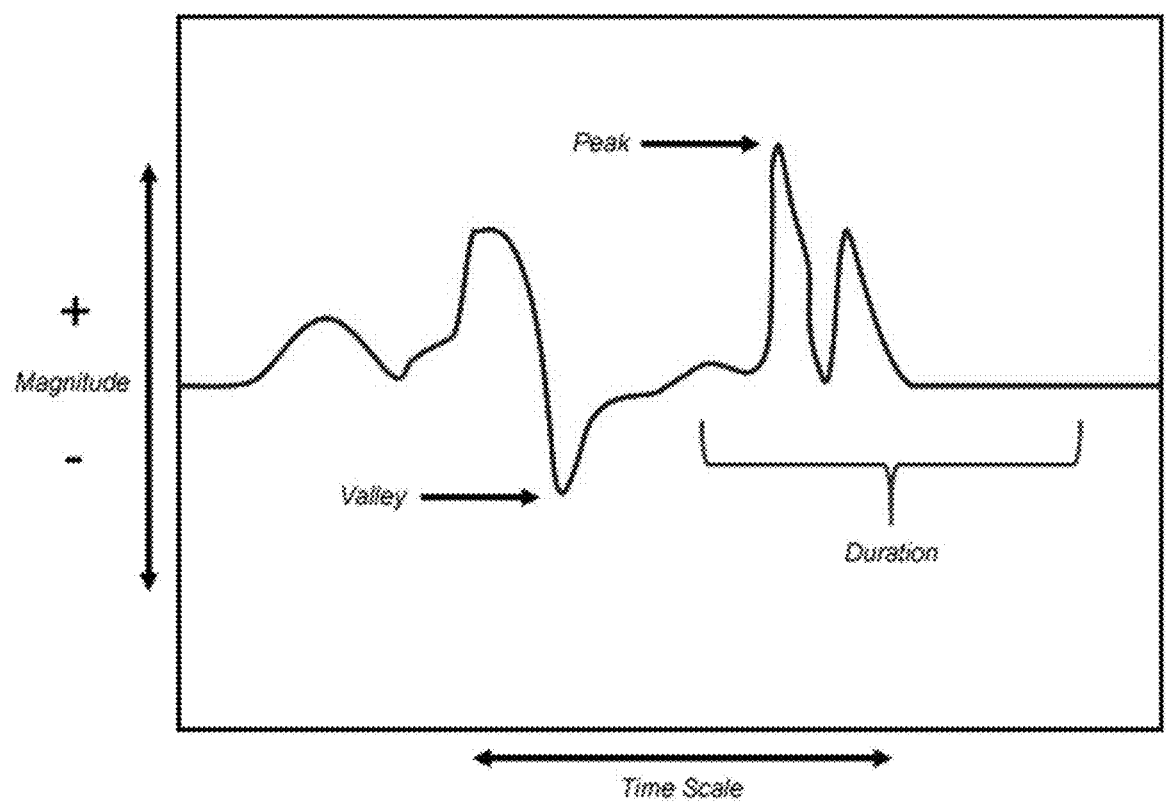
FIG. 16 illustrates sensor data obtained from a sensor, in accordance with one or more embodiments.

In some embodiments, system 1500 may identify a location of a disturbance on a physical transmission line. Server 1502 may obtain sensor data from sensors 1522 located on a physical transmission line 1526 (e.g., obtain first sensor data from a first sensor and second sensor data from a second sensor). The sensors 1522 may be optical sensors, electrical sensors, acoustical sensors, and/or fiber bragg grating (FBG) sensors and may be placed at different locations of the physical transmission line 1526. These sensors 1522 may be capable of detecting one or more disturbance events that occur on or near the physical transmission line 1526. For example, the optical sensors may be able to detect optical disturbance events, the electrical sensors may be able to detect electrical disturbance events, and the acoustical sensors may be able to detect acoustical disturbance events. Although only optical sensors, electrical sensors, acoustical sensors, and/or fiber bragg grating (FBG) sensors are discussed above, it should be understood that one or more other types of sensor may be used to detect disturbance events on the physical transmission line 1526. The sensor data may be received by the server 1502 from the sensors 1522 on a continuous basis or may be received upon request. Continuous reception of the sensor data from the sensors 1522 may allow the system 1500 to continuously monitor the physical transmission line 1526 and identify a location of a disturbance event on the physical transmission line 1526. The sensor data received from the sensors 1522 may include measured values of one or more disturbance events (e.g., first sensor data from a first sensor may include first measured values of the disturbance event, second sensor data from a second sensor may include second measured values of the disturbance event, etc.) over a length of time. For example, FIG. 16 illustrates sensor data obtained from a sensor (from among sensors 1522) that includes peaks and valleys (e.g., measured values of a disturbance event) over a length of time. These peaks and valleys over the length of time illustrate an occurrence of a disturbance event and these peaks and valleys can be used to identify a location of the disturbance event and a type of the disturbance event.

Figure 17:
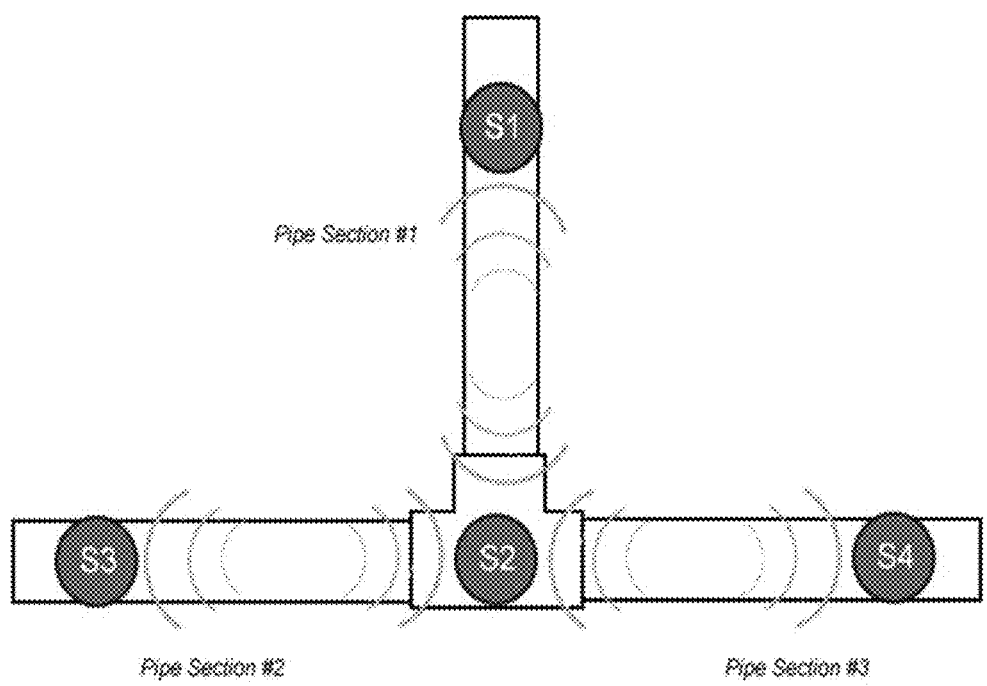
FIG. 17 illustrates a physical transmission line and sensors placed at different locations on a physical transmission line, in accordance with one or more embodiments.
Figure 18:
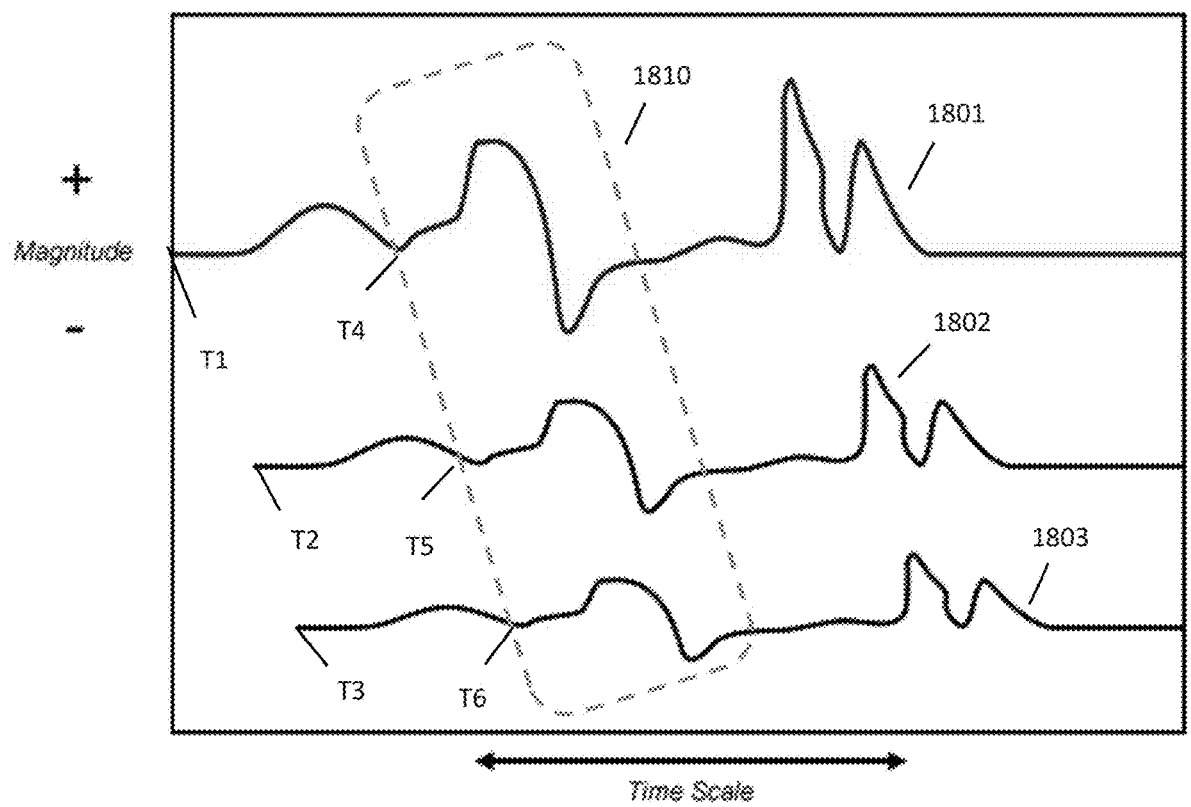
FIG. 18 illustrates sensor data obtained from sensors, in accordance with one or more embodiments.

In some embodiments, the sensors 1522 may be located at predetermined positions on the physical transmission line 1526. Information regarding the location of the sensors 1522 on the physical transmission line 1526 may be stored in a sensor database 1536. In addition to the information regarding the location of the sensors 1522, information regarding the distances between these sensors 1522 may also be stored in the sensor database 1526. FIG. 17 illustrates a physical transmission line (see pipe sections #1, #2, and #3) and sensors (see sensors S1, S2, S3, and S4) placed at different locations on the physical transmission line. The distance between sensors S1 and S2 may be equal to the distance between sensors S3 and S2 (and S2 and S4). Alternatively, the distances between adjacent sensors may be different. When sensors measure disturbance events (e.g., based on detected disturbance events), server 1502 (via, for example, communication subsystem 1514) may obtain sensor data that includes measured values of the disturbance events over a length of time. For example, FIG. 18 illustrates sensor data 1801, 1802, and 1803 obtained from sensors S1, S2, and S3, respectively. The sensor data 1801, 1802, and 1803 may include measured values (e.g., as measured in gain or loss in optical power, acoustical power, and/or electrical resistance) of a disturbance event over a length of time. The measured values may correspond to either light or sound disturbances (e.g., changes in ambient environmental conditions) that the sensors may detect. Sensor data 1801 may include measured values of a disturbance event by sensor S1, sensor data 1802 may include measured values of the same disturbance event by sensor S2, and sensor data 1803 may include measured values of the same disturbance event by sensor S3. For example, when there is a disturbance event, more than one sensor may detect the disturbance event and output its own corresponding sensor data. The sensor data 1801, 1802, and 1803 that include measured values of a disturbance event by the sensors S1, S2, and S3, respectively, may correspond to a single disturbance event or multiple different disturbance events.

In some embodiments, the server 1502 (e.g., disturbance identifying subsystem 1512) may determine an initial detection time of the measured values based on the obtained sensor data (or a portion of the obtained sensor data). For example, server 1502 may determine a first initial detection time T1 of the first measured values (see sensor data 1801 in FIG. 18), a second initial detection time T2 of the second measured values (see sensor data 1802 in FIG. 18), and a third initial detection time T3 of the third measured values (see sensor data 1803 in FIG. 18). Additionally or alternatively, the server 1502 may determine other detection times. For example, server 1502 may determine detection times T4, T5, and T6 (see broken line of box 1810 intersecting sensor data 1801, 1802, and 1803) of the first measured values (see sensor data 1801 in FIG. 18), the second measured values (see sensor data 1802 in FIG. 18), and the third measured values (see sensor data 1803 in FIG. 18), respectively, based on the obtained sensor data 1801, 1802, and 1803. The server 1502 (e.g., disturbance identifying subsystem 1512) may determine a time difference between detections times (e.g., difference between T1 and T2, T2 and T3, T1 and T3, T4 and T5, T5 and T6, and/or T4 and T6) and may approximate (i) a first distance between the disturbance event and the first sensor based on a determined time difference, a known constant (e.g., speed of sound and/or speed of light), and a known length of the physical transmission line (or a section of the physical transmission line), (ii) a second distance between the disturbance event and the second sensor based on a determined time difference, the known constant, and a known length of the physical transmission line (or a section of the physical transmission line), and (iii) a third distance between the disturbance event and the third sensor based on a determined time difference, the known constant, and a known length of the physical transmission line (or a section of the physical transmission line).

The server 1502 (e.g., disturbance identifying subsystem 1512) may identify a location of the disturbance event on the physical transmission line based on the approximated distances of the sensors from the disturbance event. In addition, the location of the disturbance event on the physical transmission line may be identified further based on locations of these sensors on the physical transmission line. For example, the server 1502 may retrieve the information regarding the location of the sensors from the sensor database 1536 and utilize this information to identify the location of the disturbance event on the physical transmission line. Additionally, the server 1502 may retrieve information regarding the distance between the sensors from the sensor database 1536 and utilize this information to identify the location of the disturbance event on the physical transmission line. Although the example provided above describes three sensors and three sensor data, it should be understood that a location of the disturbance event on the physical transmission line may be identified based on sensor data obtained from two sensors. In summary, the system 1500 may use time difference (e.g., time of flight) between sensor data of different sensors to determine and identify a location of the disturbance event on the physical transmission line. Additionally, the server 1502 (for example disturbance identifying subsystem 1512) may compare the sensor data 1801, 1802, and 1803 to each other (e.g., by comparing the time durations of the sensor data, peak/valley magnitudes of the sensor data, etc.) to determine whether the sensor data 1801, 1802, and 1803 correspond to a single disturbance event or multiple different disturbance events on the physical transmission line. For example, in FIG. 18, the comparison of the sensor data 1801, 1802, and 1803 within box 1810 suggests that the sensor data 1801, 1802, and 1803 correspond to a single disturbance event.

Figure 19:
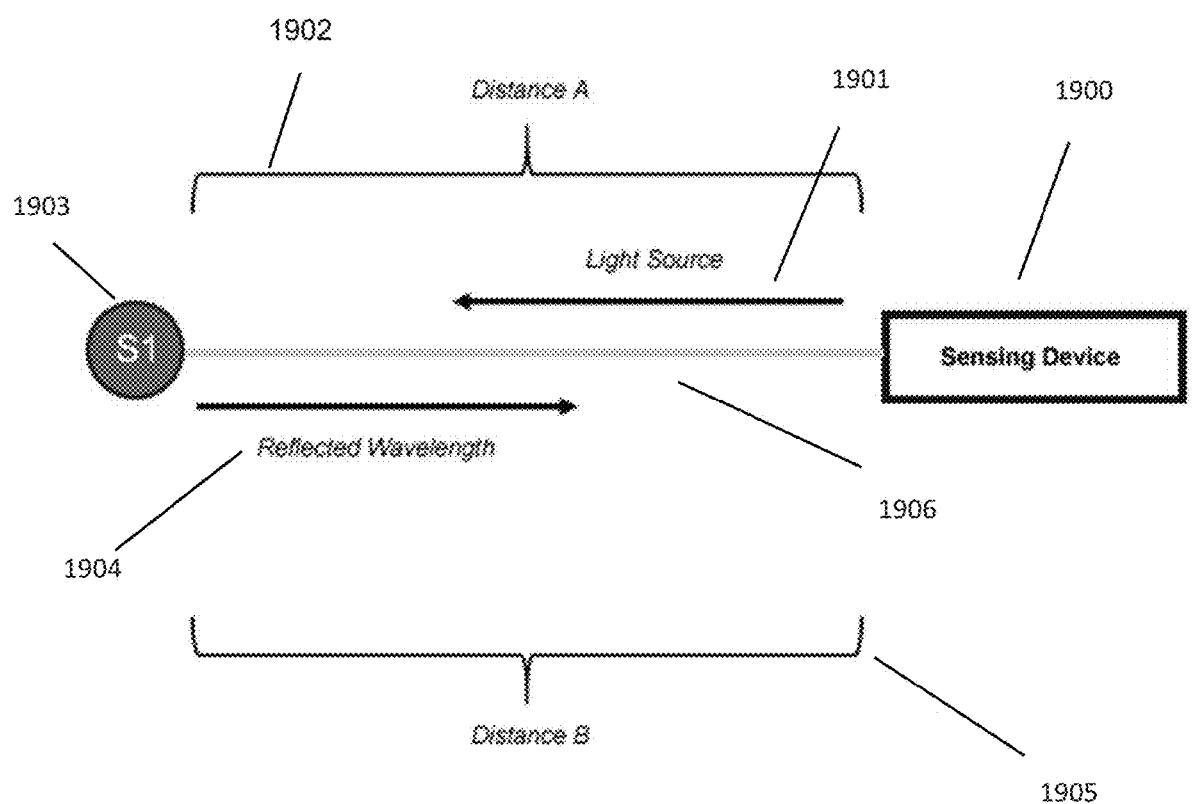
FIG. 19 illustrates a system for identifying a location of a disturbance event, in accordance with one or more embodiments.

Further, in some embodiments, the location of a disturbance event on a physical transmission line (e.g., a sensing fiber) may be determined/identified using a sensing device 1900 (e.g., a circuit or meter that reads resistance and/or current, or an optical interrogator) and a sensor 1903 (e.g., a fiber bragg grating (FBG) sensor) illustrated in FIG. 19. The sensing device 1900 may be connected to the sensor 1903 via a port/channel and may acquire data sensed by the sensor 1903.

FIG. 19 illustrates a sensing device 1900 that emits a beam of light 1901 to a reflecting sensor 1903 via the sensing fiber 1906, and based on the sensor 1903, a specific and known wavelength of light 1904 is reflected via the sensing fiber 1906. A disturbance event on the sensing fiber 1906 may alter the reflected light's wavelength, amplitude, and/or other properties of light along distance B (e.g., 1905 in FIG. 19). The sensing device 1900 may gather sensing data based on the reflected light 1904. The sensing data may include information regarding timestamp values assigned to a light beam 1901 emitted by the sensing device 1900 and reflected back (e.g., light 1904) to the sensing device 1900 by the sensor 1903 and information regarding a property of the light beam 1904 reflected back to the sensing device 1900. The sensing device 1900 may provide the sensing data to the server 1502 (based on a wired or wireless connection between the server 1502 and the sensing device 1900). The server 1502 may then calculate a roundtrip time of the light beam 1901 emitted by the sensing device 1900 and reflected back (e.g., light 1904) to the sensing device 1900 by the sensor 1903 based on the assigned timestamp values. Further, the server 1502, based on the received sensing data from the sensing device 1900, may determine a change in properties of the light beam 1901 emitted by the sensing device 1900 and reflected back (e.g., light 1904) to the sensing device 1900 by the sensor 1903 by comparing the properties (e.g., amplitude, frequency, wavelength, power variance, etc.) of the reflected light beam 1904 to the properties of a known light beam that is reflected by sensor 1903 with and/or without a disturbance event on the sensing fiber 1906. In other words, the sensing device 1900 may provide raw data to the server 1502, and the server 1502 may calculate the roundtrip time and determine the change in properties based on such raw data. Alternatively, the sensing device 1900 may calculate the roundtrip time of the light beam 1901 emitted by the sensing device 1900 and reflected back (e.g., light 1904) to the sensing device 1900 by the sensor 1903 based on the assigned time stamp values. Also, alternatively, the sensing device 1900 may determine the change in properties of the light beam 1901 emitted by the sensing device 1900 and reflected back (e.g., light 1904) to the sensing device 1900 by the sensor 1903 by comparing the properties (e.g., amplitude, frequency, wavelength, power variance, etc.) of the reflected light beam 1904 to the properties of a known light beam that is reflected by sensor 1903 with and/or without a disturbance event on the sensing fiber 1906. The properties of known light beams may be stored in the database 1532 and may be retrieved by the server 1502 and/or sensing device 1900 for comparisons with the reflected light beam 1904

Based on the sensing data, the server 1502 (e.g., the disturbance identifying subsystem 1512) may identify the location of the disturbance event on the physical transmission line. In other words, the server 1502 may identify the location of the disturbance event on the physical transmission line 1906 (and may identify the distance of the disturbance event from the sensing device 1900) based on the roundtrip time of the light beam 1901 emitted by the sensing device 1900 and reflected back (e.g., light 1904) to the sensing device 1900 by the sensor 1903 and the change in the property (or multiple properties) of the light beam 1901 emitted by the sensing device 1900 and reflected back (e.g., light 1904) to the sensing device 1900 by the sensor 1903. The server 1502 may also be able to determine a length of the distance event (e.g., start and end locations of the disturbance event) based on the comparison of the properties (e.g., wavelength, power variance, etc.) of the reflected light beam 1904 to the properties of a known light beam that is reflected by sensor 1903 with and/or without a disturbance event on the sensing fiber 1906. For instance, the wavelength of the reflected light beam 1904 may be compared to a baseline wavelength to determine start and end locations of the disturbance event on the physical transmission line. Also, the power variance of the reflected light beam 1904 may be compared to a baseline power variance to determine start and end locations of the disturbance event on the physical transmission line. Further, the detection times of the start and end of peaks and valleys of the sensor data (along with a known constant) may also be used to determine the start and end locations of the disturbance event on the physical transmission line. Alternatively, the sensing device 1900, based on the sensing data, may identify the location of the disturbance event on the physical transmission line 1906 (and may identify the distance of the disturbance event from the sensing device 1900) based on the roundtrip time of the light beam 1901 emitted by the sensing device 1900 and reflected back (e.g., light 1904) to the sensing device 1900 by the sensor 1903 and the change in the property (or multiple properties) of the light beam 1901 emitted by the sensing device 1900 and reflected back (e.g., light 1904) to the sensing device 1900 by the sensor 1903. Also, alternatively, the sensing device 1900 may determine a length of the distance event (e.g., start and end locations of the disturbance event) based on the comparison of the properties (e.g., wavelength, power variance, etc.) of the reflected light beam 1904 to the properties of a known light beam that is reflected by sensor 1903 with and/or without a disturbance event on the sensing fiber 1906. The properties of known light beams may be stored in the database 1532 and may be retrieved by the server 1502 and/or sensing device 1900 for comparisons with the reflected light beam 1904.

Although only one sensor is illustrated in FIG. 19, it should be understood that multiple sensors may be used and sensing data from each sensor may be gathered by the sensing device 1900. Additionally, more than one sensing device 1900 may be placed at different locations of the physical transmission line to gather sensing data, which may then be obtained by the server 1502. The known distances A (see 1902 in FIG. 19) and B (see 1905 in FIG. 19), a known constant (e.g., speed of light and/or sound), and time resolution capabilities of the sensing device 1900 can be taken into account to identify the location of the disturbance event on the physical transmission line. Additionally, the location of the disturbance event on the physical transmission line may be identified further based on a location of the sensing device on the physical transmission line. The information regarding a location of one or more sensing devices on the physical transmission line may be stored in the sensor database 1536, and such information may be retrieved by, for example, the server 1502 and/or the sensing device 1900.

Figure 20:
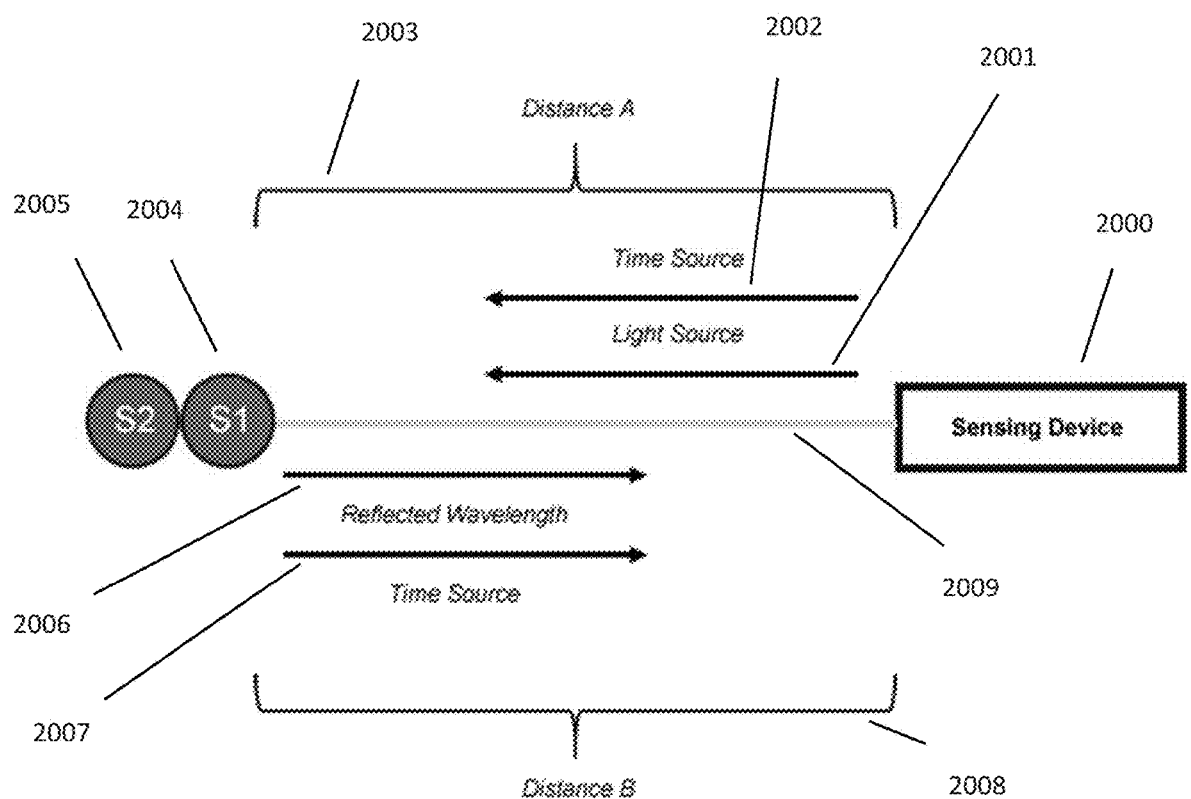
FIG. 20 illustrates a system for identifying a location of a disturbance event, in accordance with one or more embodiments.

Further, in some embodiments, the location of a disturbance event on a physical transmission line (e.g., a sensing fiber) may be determined/identified using a sensing device 2000 (e.g., a circuit or meter that reads resistance and/or current, or an optical interrogator) and sensors 2004 and 2005 (e.g., fiber bragg grating (FBG) sensors) illustrated in FIG. 20. The sensors 2004 and 2005 may be connected to the sensing device 2000 either individually or in series to a port/channel on the sensing device 2000, and the sensing device 2000 may acquire data sensed by the sensors 2004 and 2005.

FIG. 20 illustrates a sensing device 2000 that emits a beam of light 2001 to a reflecting sensor 2004 via a sensing fiber 2009, and based on the sensor 2004, a specific and known wavelength of light 2006 is reflected via the sensing fiber 2009. A disturbance event on the sensing fiber 2009 may alter the reflected light's wavelength, amplitude, and/or other properties of light along distance B (e.g., 2008 in FIG. 20). Further, the sensing device 2000 may emit another beam of light 2002 (e.g., this may be a time source signal such as an alternating beam of light at a specific interval) that is reflected (see 2007 in FIG. 20) against another sensor 2005 at an alternate wavelength from the light beam 2001 and/or 2006. The other beam of light 2002 may be emitted via the sensing fiber 2009 and reflected (see 2007 in FIG. 20) back to the sensing device 2000 via the sensing fiber 2009. The sensing device 2000 may gather sensing data based on the reflected light 2006 and 2007. The sensing data may include information regarding a change in a property of the light beam 2001 emitted by the sensing device 2000 and reflected back (e.g., light 2006 in FIG. 20) to the sensing device 2000 by sensor 2004 and information regarding timestamp values assigned to light beam 2002 emitted by the sensing device 2000 and reflected (e.g., light 2007) back to the sensing device 2000 by sensor 2005. The sensing device 2000 may provide the sensing data to the server 1502 (based on a wired or wireless connection between the server 1502 and the sensing device 2000).

The server 1502 may then calculate a roundtrip time of the light beam 2002 emitted by the sensing device 2000 and reflected back (e.g., light 2007) to the sensing device 2000 by sensor 2005 based on the assigned timestamp values. The time source signal (see 2002 and 2007 in FIG. 20) may be used to establish a timing sequence, which based on a known distance can establish an internal timestamp that correlates to the detected light properties used for disturbance detection. Further, the server 1502, based on the received sensing data from the sensing device 2000, may determine the change in properties of the light beam 2001 emitted by the sensing device 2000 and reflected back (e.g., light 2006) to the sensing device 2000 by sensor 2004 by comparing the properties (e.g., amplitude, frequency, wavelength, power variance, etc.) of the reflected light beam 2006 to the properties of a known light beam that is reflected by sensor 2004 with and/or without a disturbance event on the sensing fiber 2009. In other words, the sensing device 2000 may provide raw data to the server 1502, and the server 1502 may calculate the roundtrip time and determine the change in properties based on such raw data. Alternatively, the sensing device 2000 may calculate the roundtrip time of the light beam 2002 emitted by the sensing device 2000 and reflected back (e.g., light 2007) to the sensing device 2000 by sensor 2005 based on the assigned timestamp values. Also, alternatively, the sensing device 2000 may determine the change in properties of the light beam 2001 emitted by the sensing device 2000 and reflected back (e.g., light 2006) to the sensing device 2000 by sensor 2004 by comparing the properties (e.g., amplitude, frequency, wavelength, power variance, etc.) of the reflected light beam 2006 to the properties of a known light beam that is reflected by sensor 2004 with and/or without a disturbance event on the sensing fiber 2009. The properties of known light beams may be stored in the database 1532 and may be retrieved by the server 1502 and/or sensing device 2000 for comparisons with the reflected light beam 2006.

Based on the sensing data, the server 1502 (e.g., the disturbance identifying subsystem 1512) may identify the location of the disturbance event on the physical transmission line. In other words, the server 1502 may identify the location of the disturbance event on the physical transmission line 2009 (and may identify the distance of the disturbance event from the sensing device 2000) based on the roundtrip time of the light beam 2002 emitted by the sensing device 2000 and reflected back (e.g., light 2007) to the sensing device 2000 by the sensor 2005 and the change in the property (or multiple properties) of the light beam 2001 emitted by the sensing device 2000 and reflected back (e.g., light 2006) to the sensing device 2000 by the sensor 2004. The server 1502 may also be able to determine a length of the distance event (e.g., start and end locations of the disturbance event) based on the comparison of the properties (e.g., wavelength, power variance, etc.) of the reflected light beam 2006 to the properties of a known light beam that is reflected by sensor 2004 with and/or without a disturbance event on the sensing fiber 2009. For instance, the wavelength of the reflected light beam 2006 may be compared to a baseline wavelength to determine start and end locations of the disturbance event on the physical transmission line. Also, the power variance of the reflected light beam 2006 may be compared to a baseline power variance to determine start and end locations of the disturbance event on the physical transmission line. Alternatively, the sensing device 2000, based on the sensing data, may identify the location of the disturbance event on the physical transmission line 2009 (and may identify the distance of the disturbance event from the sensing device 2000) based on the roundtrip time of the light beam 2002 emitted by the sensing device 2000 and reflected back (e.g., light 2007) to the sensing device 2000 by the sensor 2005 and the change in the property (or multiple properties) of the light beam 2001 emitted by the sensing device 2000 and reflected back (e.g., light 2006) to the sensing device 2000 by the sensor 2004. Also, alternatively, the sensing device 2000 may determine a length of the distance event (e.g., start and end locations of the disturbance event) based on the comparison of the properties (e.g., wavelength, power variance, etc.) of the reflected light beam 2006 to the properties of a known light beam that is reflected by sensor 2004 with and/or without a disturbance event on the sensing fiber 2009. The properties of known light beams may be stored in the database 1532 and may be retrieved by the server 1502 and/or sensing device 2000 for comparisons with the reflected light beam 2006.

Although only two sensors are illustrated in FIG. 20, it should be understood that more than two sensors may be used and sensing data from each sensor may be gathered by the sensing device 2000. Additionally, more than one sensing device 2000 may be placed at different locations of the physical transmission line to gather sensing data, which may then be obtained by the server 1502. The known distances A (see 2003 in FIG. 20) and B (see 2008 in FIG. 20), a known constant (e.g., speed of light and/or sound), and internal timestamps can be taken into account to identify the location of the disturbance event on the physical transmission line. Additionally, the location of the disturbance event on the physical transmission line may be identified further based on a location of the sensing device on the physical transmission line. The information regarding a location of one or more sensing devices on the physical transmission line may be stored in the sensor database 1536, and such information may be retrieved by, for example, the server 1502 and/or the sensing device 2000.

Figure 21:
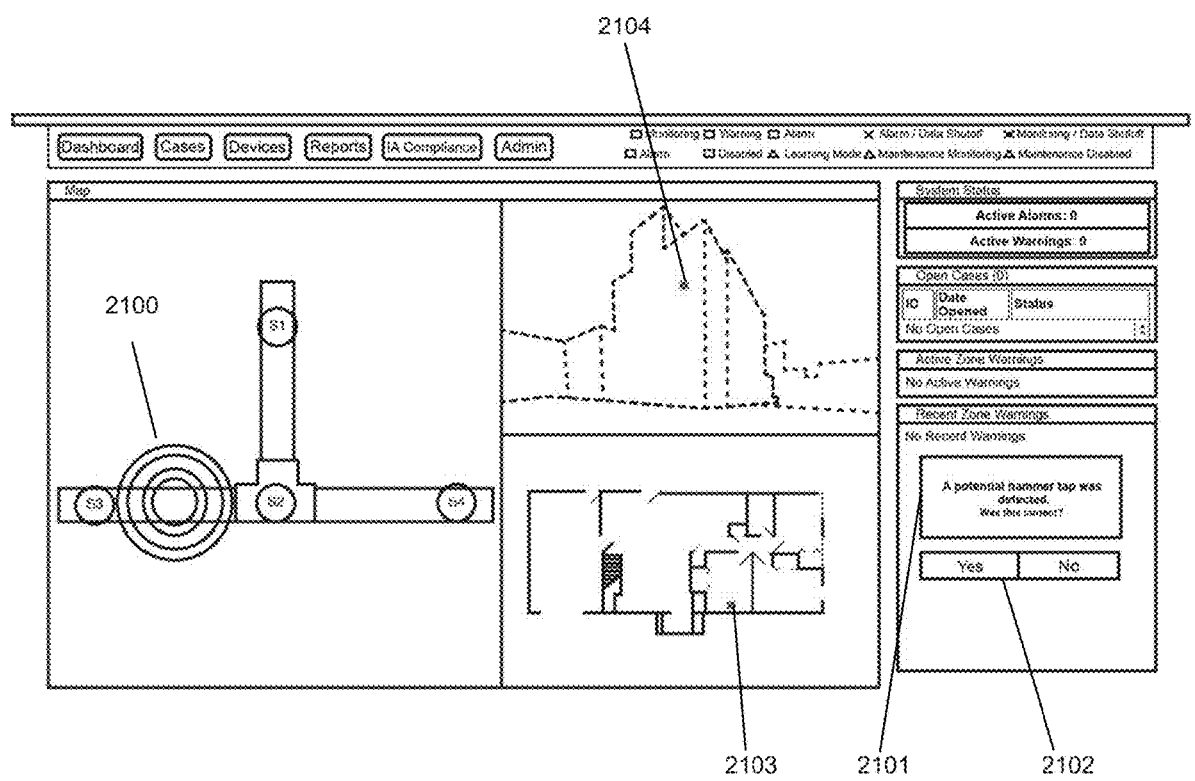
FIG. 21 illustrates a user interface, in accordance with one or more embodiments.

The identified location of the disturbance event may be presented/displayed to a user via a user interface (see presentation subsystem 1516 in FIG. 15). As illustrated in FIG. 21, a location 2100 of a disturbance event can be identified on a physical transmission line that includes a plurality of sensors S1, S2, S3, and S4. The user interface may also present/display the identified location of the disturbance event as a location 2104 within a building and/or a location 2103 within a floor plan. The user interface may also present/display a type of the disturbance event. For example, in FIG. 21, the disturbance event is identified as a potential hammer tap (see 2101 in FIG. 21). The user interface may request a user to confirm the accuracy (via buttons 2102 in FIG. 21) of the identified type of disturbance event.

When a location of the disturbance event is identified, the server 1502 (e.g., communication subsystem 1514) may communicate a signal to the physical transmission line. Such a signal may disable (or cause shut down of) a portion of the physical transmission line that includes the disturbance event and re-route the information transmitted via the physical transmission line such that the portion of the physical transmission line that includes the disturbance event does not transmit the information. For example, as noted above, the server 1502 may be able to determine a length of the disturbance event (e.g., start and end locations of the disturbance event) based on the comparison of the properties (e.g., wavelength, power variance, etc.) of a reflected light beam (see FIGS. 19 and 20) to the properties of a known light beam that is reflected by sensor with and/or without a disturbance event on a sensing fiber. Based on the length of the disturbance event on the physical transmission line, the server 1502 may determine which portion of the physical transmission line needs to be disabled (e.g., temporarily) and determine a new route for the transmission of information via the physical transmission line. It should be understood that only a specific portion of the physical transmission line (e.g., the portion corresponding to the identified location of the disturbance event) may be disabled, while other portions of the physical transmission line may be allowed to function normally (e.g., other portions of the physical transmission line where no disturbance event has been identified).

In some embodiments, system 1500 may identify a type of a disturbance event on a physical transmission line based on a comparison of the obtained sensor data and stored signature data. Signature data may correspond to previous disturbance events and may include previously measured values over a length of time. Signatures files that include signature data may be stored in a signature database 1534 and may be retrieved by the server 1502. The server 1502 may obtain (via, for example, the communication subsystem 1514) signature files corresponding to previous disturbance events from the signature database 1534. Each of the signature files may include signature data including previously measured values of the previous disturbance events over a length of time. For example, a first signature file may correspond to a hammer tap, a second signature file may correspond to a drill, a third signature file may correspond to a human voice, etc. FIG. 22 illustrates a hammer tap 2200 (which results in hammers sounds) on a physical transmission line (which includes a plurality of sensors S1, S2, and S3), which results in the generation of sensor data 2201 by one of the sensors. A signature file including a portion of the sensor data 2202 and other data 2203 may be generated based on the sensor data 2201 and the signature file may be stored in the signature database 1534.

The server 1502 (e.g., disturbance identifying subsystem 1512) may compare sensor data (which may be obtained from sensors 1522) and signature data of the signature files obtained from the signature database 1534 and based on such a comparison, the server 1502 (e.g., disturbance identifying subsystem 1512) may determine a confidence value for each of the signature files based on the comparison of the sensor data with the signature data of the signature files. For example, if the obtained sensor data includes first sensor data 1801, second sensor data 1802, and third sensor data 1803 (see FIG. 18), the server 1502 may compare the first, second, and third sensor data with the signature data of the signature files, and determine a confidence value for each of the signature files based on the comparison of the first, second, and third sensor data with the signature data of the signature files.

Figure 23:
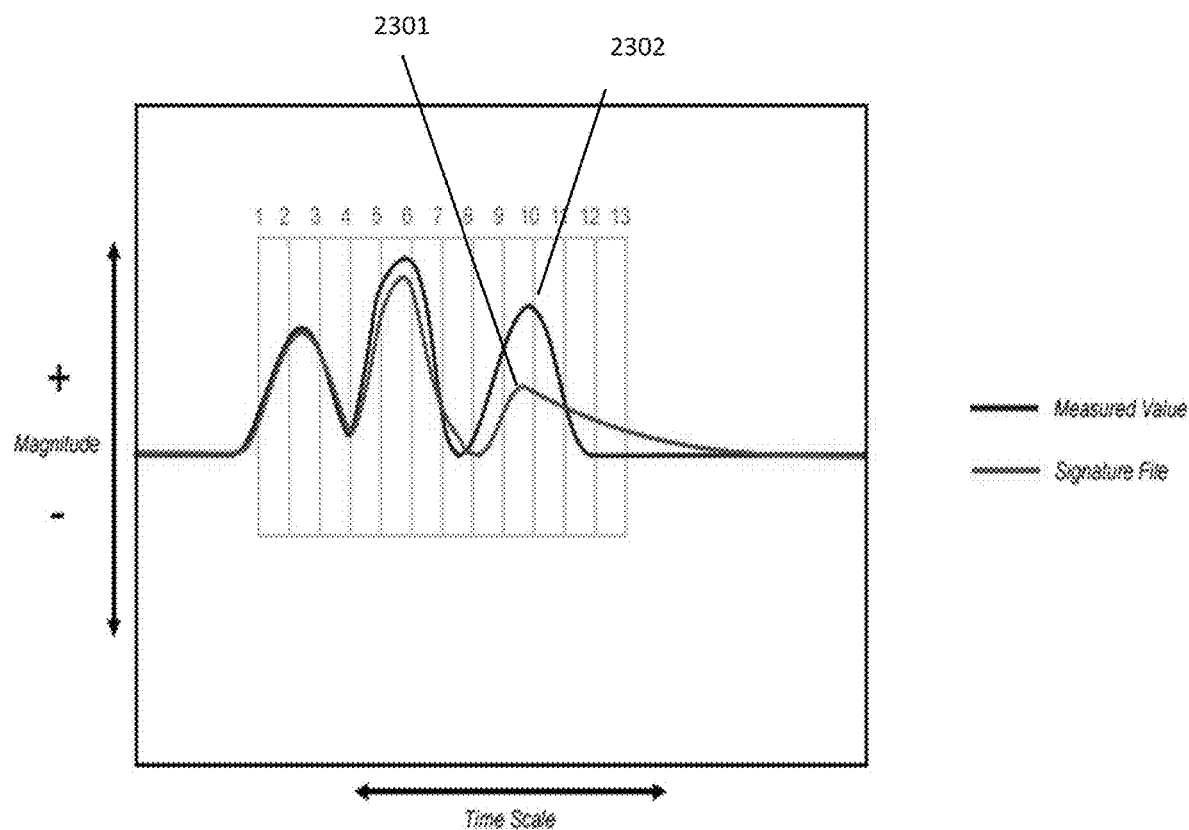
FIG. 23 illustrates a comparison between sensor data and signature data, in accordance with one or more embodiments.

For instance, comparing first sensor data with the signature data of the signature files may include determining, for each of the signature files, a first total number of overlapping values between the first sensor data and the signature data of the signature file, determining, for each of the signature files, a first total number of continuously overlapping values between the first sensor data and the signature data of the signature file, determining, for each of the signature files, a first total number of values of the signature data of the signature file that are within a predetermined threshold from the first sensor data, and determining, for each of the signature files, a first total number of continuous values of the signature data of the signature file that are within the predetermined threshold from the first sensor data. Similarly, second sensor data and third sensor data may also be compared with the signature data of the signature files. FIG. 23 illustrates a comparison between sensor data 2302 and signature data 2301 of a signature file. Although three sensor data are described above, it should be understood that sensor data from only a single sensor may be compared to signature data to identify a type of a disturbance event on a physical transmission line. In FIG. 23, a total number of overlapping values between the sensor data 2302 and the signature data 2301 of the signature file is 6 (e.g., in FIG. 23, points 1-4, 7, and 11 are the points that overlap), a total number of continuously overlapping values between the sensor data 2302 and the signature data 2301 of the signature file is 4 (e.g., points 1-4 in FIG. 23), a total number of values of the signature data 2301 of the signature file that are within a predetermined threshold from the sensor data 2302 is 9 (e.g., points 1-8 and 11 in FIG. 23), and a total number of continuous values of the signature data 2301 of the signature file that are within the predetermined threshold from the sensor data 2302 is 3 (e.g., points 5, 6, and 8 in FIG. 23. FIG. 24, for example, illustrates a table 2402 (this information along with table 2401 may be stored in the signature database 1534) that includes a total number of overlapping values between the sensor data and the signature data, a total number of continuously overlapping values between the first sensor data and the signature data of the signature file, a total number of values of the signature data of the signature file that are within a predetermined threshold from the sensor data, and a total number of continuous values of the signature data of the signature file that are within the predetermined threshold from the sensor data based on a comparison of the sensor data with signature data of the signature file. Although comparisons between sensor data and signature data are discussed above, it should be understood that similar comparisons can be made between first sensor data from a first sensor and second sensor data from a second sensor to determine a total number of overlapping values between the first sensor data and the second sensor data, a total number of continuously overlapping values between the first sensor data and the second sensor data, a total number of values of the second sensor data that are within a predetermined threshold from the first sensor data, and a total number of continuous values of the second sensor data that are within the predetermined threshold from the first sensor data based on a comparison of the first sensor data with second sensor data. Based on such a comparison between the first sensor data and the second sensor data, the server 1502 may determine whether the first sensor data and the second sensor data correspond to a single disturbance event or multiple different disturbance events.

The server 1502 may determine a first confidence value for each signature file based on a first total number of overlapping values between the first sensor data and the signature data, a first total number of continuously overlapping values between the first sensor data and the signature data of the signature file, a first total number of values of the signature data of the signature file that are within a predetermined threshold from the first sensor data, and a first total number of continuous values of the signature data of the signature file that are within the predetermined threshold from the first sensor data. Similarly, server 1502 may determine a second confidence value and a third confidence value for each signature file based on a comparison of the second sensor data and the third sensor data with the signature data of each signature file. FIG. 24 illustrates information regarding the signature files (e.g., signature 1, signature 2, signature 3, and signature 4) in table 2401 and comparisons of different sensor data with the signature files in table 2402. The data in tables 2401 and 2402 may be stored in the signature database 1534. As an example, table 2402 in FIG. 24 illustrates a confidence value for each signature file based on a comparison of sensor data with signature data of the signature file. These confidence values may be compared to a predetermined threshold to identify a type of disturbance event on the physical transmission line. For example, FIG. 24 illustrates that a comparison of sensor data with signature date of the signature file 2 results in a determination of a confidence value of 73%. If this confidence value is greater than a predetermined threshold, a type of disturbance event associated with the signature file 2 is identified. For example, signature database 1534 may include information indicating that signature file 2 is associated with a hammer tap. Accordingly, when the confidence value for signature file 2 exceeds a predetermined confidence threshold based on a comparison of sensor data with the signature data of the signature file 2, the hammer tap is identified as a type of disturbance event on the physical transmission line. The server 1502 (e.g., the disturbance identifying subsystem 1512) may identify one or more signature files whose confidence value exceeds a predetermined confidence threshold, and identify a type of the disturbance event on the physical transmission line based on the identified one or more signature files. The identified type of disturbance event may be presented to a user via a user interface (see presentation subsystem 1516 and client device 1504 in FIG. 15). Alternatively, the server 1502 (e.g., the disturbance identifying subsystem 1512) may identify the disturbance event as an unknown event on the physical transmission line when the confidence value for each of the signature files does not exceed a predetermined confidence threshold. A notification that the disturbance event is an unknown event may also be presented to a user via a user interface (see presentation subsystem 1516 and client device 1504 in FIG. 15).

Once the type of disturbance event (e.g., a hammer tap) is presented to the user, the server 1502 may request a user to confirm the accuracy of the identified type of disturbance event (see 2101 and 2102 in FIG. 21). For example, a user may be requested to confirm that the disturbance event is a hammer tap via a user interface (see 2101 and 2102 in FIG. 21). When the user confirms the accuracy of the type of disturbance event presented to the user, the server 1502 may retrieve, from the signature database 1534, one or more signature files. These retrieved one or more signature files may correspond to signature files that were identified to have a confidence value exceeding a predetermined confidence threshold and that were used to identify the type of disturbance event on the physical transmission line. For example, if signature file 2 from FIG. 24 was identified to have a confidence value that exceeds a predetermined confidence threshold, and the hammer tap was identified as the type of disturbance event on the physical transmission line based on signature file 2, then signature file 2 is retrieved from the signature database 1534 when the user confirms the accuracy of the type of disturbance event (e.g., hammer tap) presented to the user. Once the signature files are retrieved from the signature database 1534 via communication subsystem 1514, the server 1502 (e.g., the updating subsystem 1518) may compare the sensor data with the signature data of the retrieved one or more signature files to determine differences between the sensor data and the signature data of the retrieved one or more signature files and may update the signature data of the retrieved one or more signature files based on the determined differences. The updated signature files may be stored in the signature database 1534. It should be understood that multiple sensor data may be compared with the signature data of the retrieved signature files to determine differences between multiple sensor data and the signature data of the retrieved signatures files, and the signature data of the signature files may be updated based on such determined differences. Such update of the signature files may help refine accuracy of future detection of disturbance events.

In some embodiments, a neural network or other machine learning model may be trained and utilized to predict a location of a disturbance event on the physical transmission line and a type of the disturbance event on the physical transmission line. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Alternatively, the disturbance event may be identified as an unknown event on the physical transmission line when the confidence value for each of the signature files in the signature database 1534 does not exceed a predetermined confidence threshold. When the disturbance event is identified as an unknown event, the disturbance event may be presented to a user via a user interface as an unknown event (see presentation subsystem 1516 and client device 1504). Further, the user may be prompted to provide additional information about the disturbance event via the user interface so that the server 1502 can classify future disturbance events. For example, if the disturbance event is identified as an unknown event, then the user may be requested to identify the disturbance event and provide additional information regarding the disturbance event. In response to the user providing information regarding the disturbance event, the server 1502 (e.g., updating subsystem 1518) may generate one or more new signature files including new signature data. The new signature files may be generated based on one or more sensor data (e.g., for which an unknown event was identified) and the information provided by the user of the disturbance event. Such generation of the new signature files may help identify future detection of disturbance events.

The system 1500 may also distinguish voice patterns and identify human presence in specific areas that surround the physical transmission line based on the above description. In other words, system 1500 may distinguish between ambient environmental conditions, object interaction (e.g., a hammer tap) and minute optical, electrical, and wave distortions created by human voice.

When a type of a disturbance event on the physical transmission line is identified by the server 1502, the server 1502 (e.g., communication subsystem 1514) may communicate a signal to the physical transmission line based on the type of the identified type of disturbance event. For example, when a disturbance event is identified as a hammer tap, the server 1502 may communicate a signal to the physical transmission line to disable (or cause shut down of) a portion of the physical transmission line that includes the disturbance event and re-route the information transmitted via the physical transmission line such that the portion of the physical transmission line that includes the disturbance event does not transmit the information. It should be understood that only a specific portion of the physical transmission line (e.g., the portion corresponding to the identified location of the disturbance event) may be disabled, while other portions of the physical transmission line may be allowed to function normally (e.g., other portions of the physical transmission line where no disturbance event has been identified). Further, when a disturbance event is identified as a human voice, the sever 1502 may not communicate a signal to the physical transmission line to disable a portion of the physical transmission line that detected the human voice and to re-route information transmitted via the physical transmission line.

Figure 25:
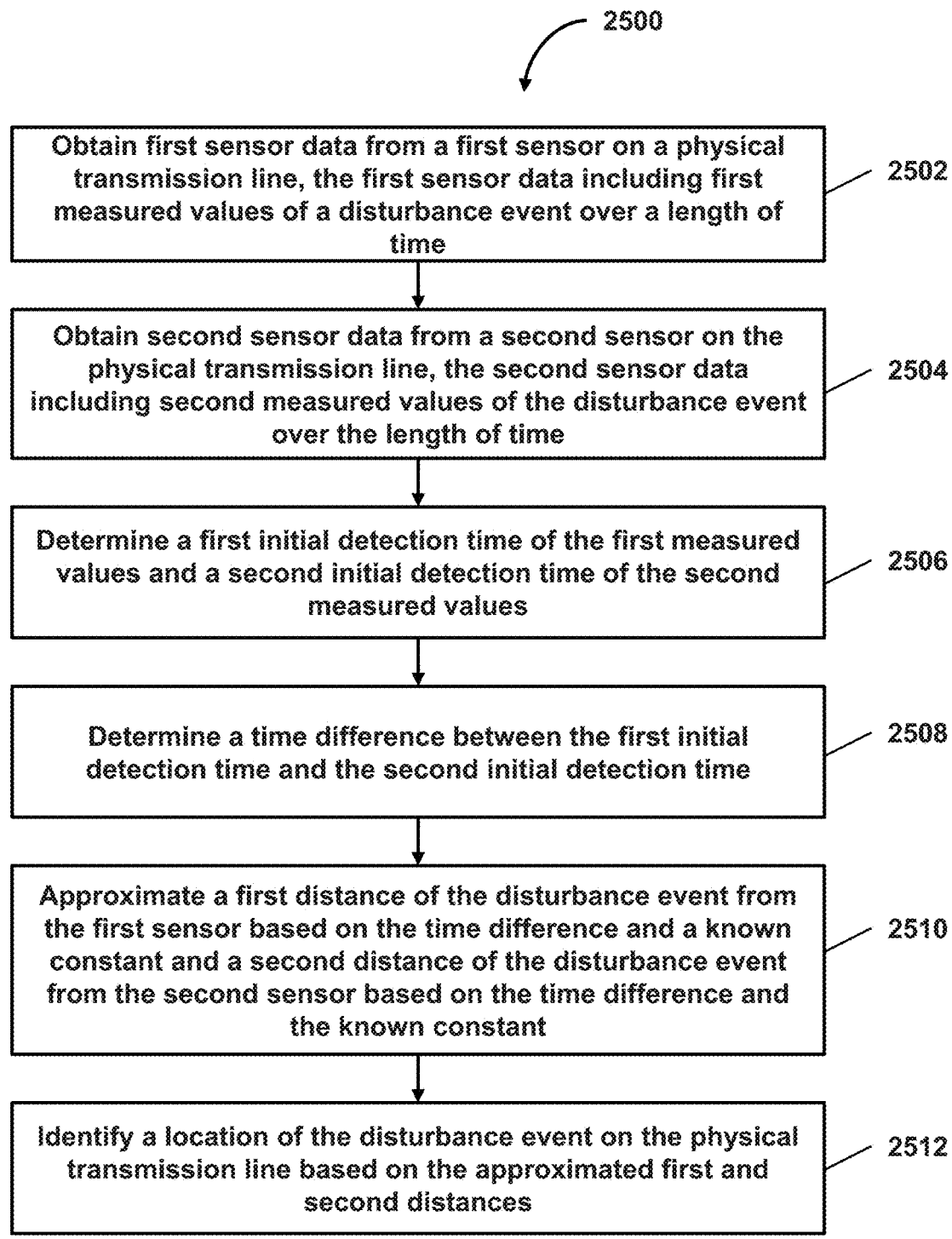
FIG. 25 illustrates a flowchart describing a method for identifying a location of a disturbance event on a physical transmission line, in accordance with one or more embodiments.

FIG. 25 illustrates a flowchart 2500 describing a method for identifying a location of a disturbance event on a physical transmission line, in accordance with one or more embodiments. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the method in response to instructions stored electronically on an electronic storage medium. The processing devices may include one or more devices configured through hardware, firmware, and/or software to be specifically designed for execution of one or more of the operations of the method.

In steps 2502 and 2504, first and second sensor data may be obtained from first and second sensors, respectively, located on a physical transmission line. The first and second sensors may be optical sensors, electrical sensors, acoustical sensors, and/or fiber bragg grating (FBG) sensors and may be placed at different locations of the physical transmission line. The first and second sensor data received from the first and second sensors may include first and second measured values, respectively, of one or more disturbance events over a length of time. In some embodiments, the sensors may be located at predetermined positions on the physical transmission line and the information regarding the location of the sensors on the physical transmission line may be retrieved from a sensor database. In steps 2502 and 2504, when the first and second sensors measure a disturbance event (e.g., based on a detected disturbance event), first and second sensor data that includes first and second measured values, respectively, of the disturbance event over a length of time may be obtained. The first and second measured values may be measured in gain or loss in optical power, acoustical power, and/or electrical resistance. The first and second sensors may detect a single disturbance event or may detect multiple different disturbance events. Accordingly, the first sensor data and the second sensor data may correspond to a single disturbance event or multiple different disturbance events.

In steps 2506, a first initial detection time of the first measured values and a second initial detection time of the second measured values may be determined and in step 2508, a time difference between the first initial detection time and the second initial detection time may be determined.

Further, in step 2510, a first distance of the disturbance event from the first sensor may be approximated based on the time difference and a known constant (e.g., speed of sound and/or speed of light) and a second distance of the disturbance event from the second sensor may be approximated based on the time difference and the known constant. In step 2512, location of the disturbance event on the physical transmission line may be identified based on the approximated first and second distances of the disturbance event from the first sensor and the second sensor, respectively. In addition, the location of the disturbance event on the physical transmission line may be identified further based on locations of these sensors on the physical transmission line. For example, the information regarding the location of the sensors may be retrieved from the sensor database and this information may be utilized to identify the location of the disturbance event on the physical transmission line. Additionally, the information regarding the distance between the sensors may be retrieved from the sensor database 1536 and this information may be utilized to identify the location of the disturbance event on the physical transmission line.

Figure 26:
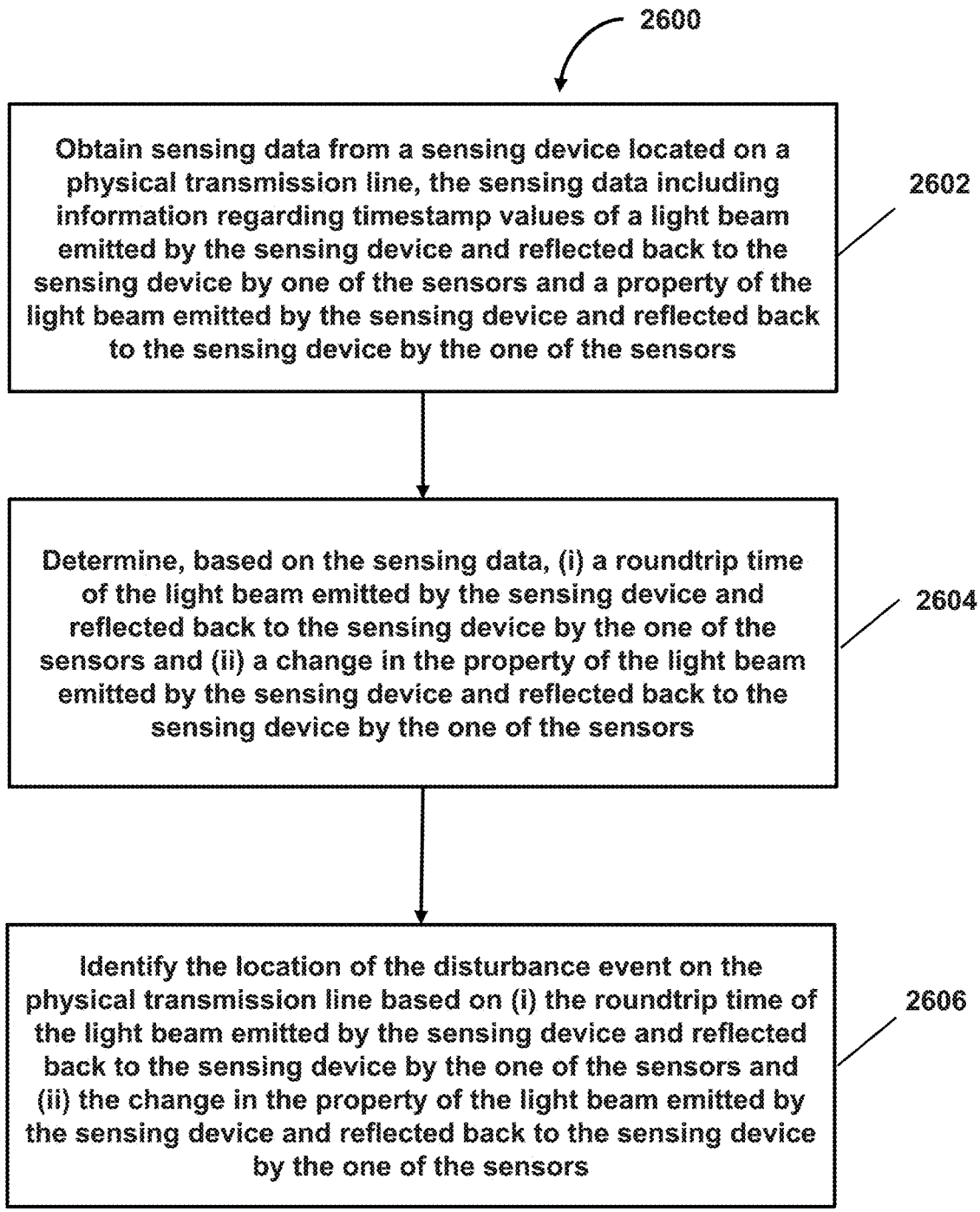
FIG. 26 illustrates a flowchart describing a method for identifying a location of a disturbance event on a physical transmission line, in accordance with one or more embodiments.

FIG. 26 illustrates a flowchart 2600 describing another method for identifying a location of a disturbance event on a physical transmission line, in accordance with one or more embodiments. In step 2602, sensing data may be obtained from a sensing device located on a physical transmission line. The sensing data may include information regarding a property of a light beam emitted by the sensing device and reflected back to the sensing device by one of the sensors and information regarding timestamp values of the light beam emitted by the sensing device and reflected back to the sensing device by the one of the sensors. In step 2604, based on the sensing data, a roundtrip time of the light beam emitted by the sensing device and reflected back to the sensing device by the one of the sensors may be determined. Further, in step 2604, based on the sensing data, a change in the property of the light beam emitted by the sensing device and reflected back to the sensing device by the one of the sensors may be determined. In step 2606, based on the sensing data, a location of the disturbance event on the physical transmission line may be identified. In other words, a location of the disturbance event on the physical transmission line may be identified based on (i) the roundtrip time of the light beam emitted by the sensing device and reflected back to the sensing device by the one of the sensors and (ii) the change in the property of the light beam emitted by the sensing device and reflected back to the sensing device by the one of the sensors. Additionally, information regarding the location of the sensing device may be retrieved from a sensor database and this information may be utilized to identify the location of the disturbance event on the physical transmission line. Also, more than one sensing device may be placed at different locations of the physical transmission line to gather sensing data. Known distances between the sensors and the sensing device(s), a known constant (e.g., speed of light and/or sound), and time resolution capabilities of the sensing device(s) can be taken into account to identify the location of the disturbance event on the physical transmission line.

Figure 27:
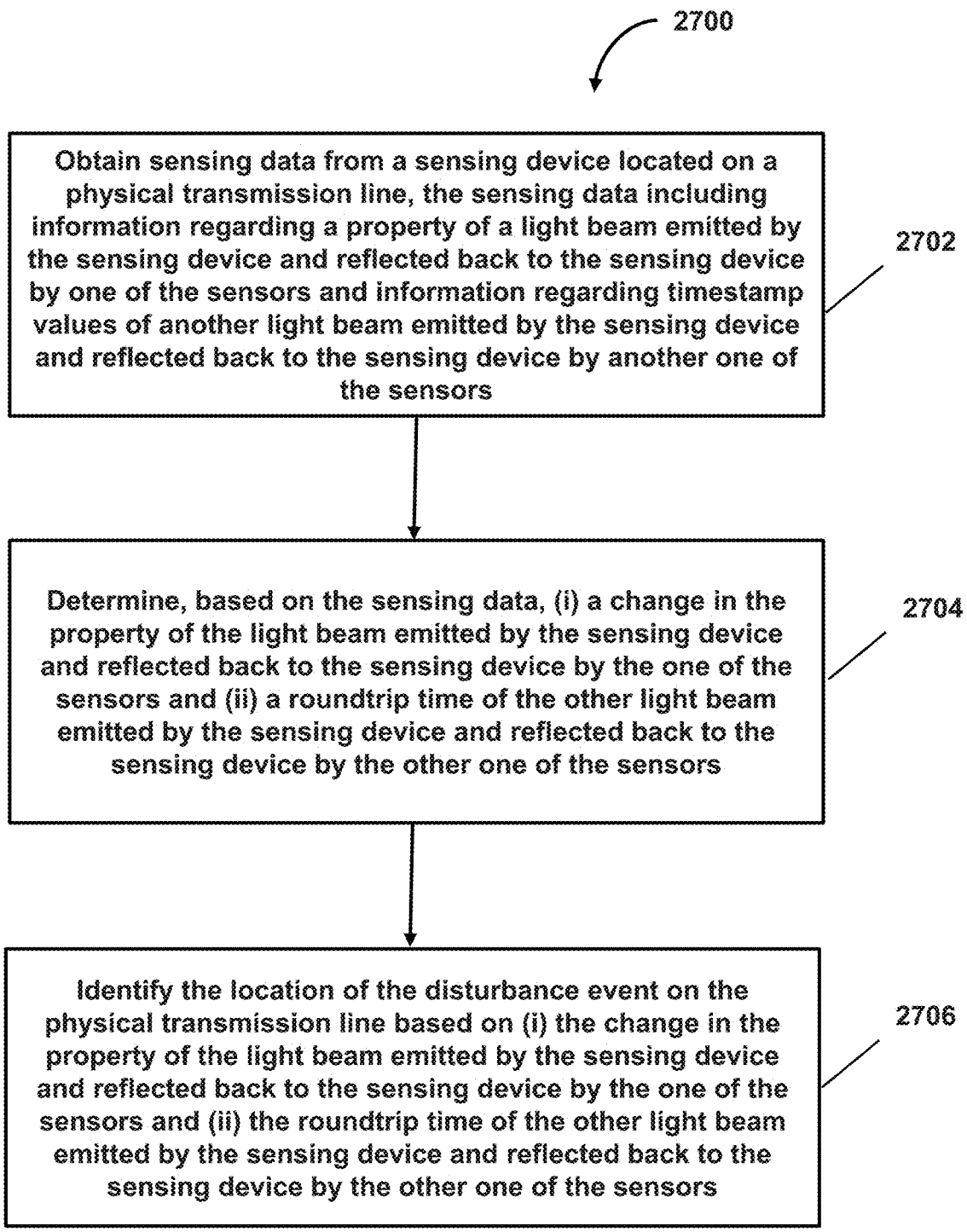
FIG. 27 illustrates a flowchart describing a method for identifying a location of a disturbance event on a physical transmission line, in accordance with one or more embodiments.

FIG. 27 illustrates a flowchart 2700 describing another method for identifying a location of a disturbance event on a physical transmission line, in accordance with one or more embodiments. In step 2702, sensing data may be obtained from a sensing device located on a physical transmission line. The sensing data may include information regarding a property of a light beam emitted by the sensing device and reflected back to the sensing device by one of the sensors and information regarding timestamp values of another light beam emitted by the sensing device and reflected back to the sensing device by another one of the sensors. In step 2704, based on the sensing data, a change in the property of the light beam emitted by the sensing device and reflected back to the sensing device by the one of the sensors may be determined. Further, in step 2704, based on the sensing data, a roundtrip time of the other light beam emitted by the sensing device and reflected back to the sensing device by the other one of the sensors may be determined. In step 2706, based on the sensing data, a location of the disturbance event on the physical transmission line may be identified. In other words, a location of the disturbance event on the physical transmission line may be identified based on (i) the change in the property of the light beam emitted by the sensing device and reflected back to the sensing device by the one of the sensors and (ii) the roundtrip time of the other light beam emitted by the sensing device and reflected back to the sensing device by the other one of the sensors. Additionally, information regarding the location of the sensing device may be retrieved from a sensor database and this information may be utilized to identify the location of the disturbance event on the physical transmission line. Also, more than one sensing device may be placed at different locations of the physical transmission line to gather sensing data. Known distances between the sensors and the sensing device(s), a known constant (e.g., speed of light and/or sound), and time resolution capabilities of the sensing device(s) can be taken into account to identify the location of the disturbance event on the physical transmission line.

Figure 28:
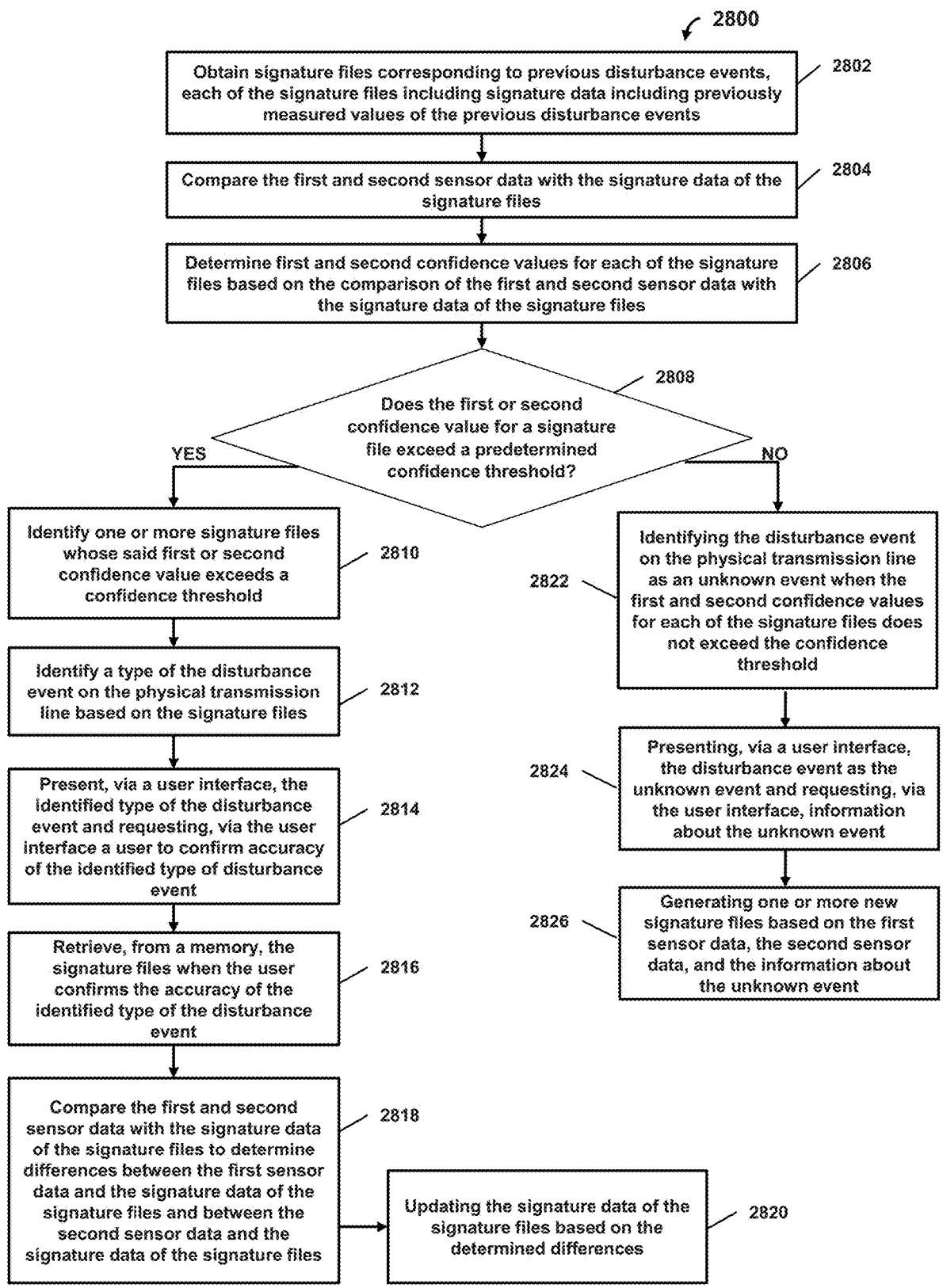
FIG. 28 illustrates a flowchart describing a method for identifying a type of a disturbance event on a physical transmission line, in accordance with one or more embodiments.

FIG. 28 illustrates a flowchart 2800 describing a method for identifying a type of a disturbance event on a physical transmission line, in accordance with one or more embodiments. In step 2802, signature files corresponding to previous disturbance events may be obtained. Each of the signature files may include signature data including previously measured values of the previous disturbance events over a length of time. The signatures files may be stored in a signature database and may be retrieved from the signature database. In step 2804, the first and second sensor data (e.g., obtained from first sensor and second sensor located on the physical transmission line) may be compared with the signature data of the signature files. The first and second sensor data may be compared with the signature data of the signature files when at least a portion of the first and second measured values (of the first sensor data and the second sensor data) exceeds a predetermined threshold. Comparing the first and second sensor data with the signature data of the signature files may include determining, for each of the signature files, a first total number of overlapping values between the first sensor data and the signature data of the signature file, determining, for each of the signature files, a second total number of overlapping values between the second sensor data and the signature data of the signature file, determining, for each of the signature files, a first total number of continuously overlapping values between the first sensor data and the signature data of the signature file, determining, for each of the signature files, a second total number of continuously overlapping values between the second sensor data and the signature data of the signature file, determining, for each of the signature files, a first total number of values of the signature data of the signature file that are within a predetermined threshold from the first sensor data, determining, for each of the signature files, a second total number of values of the signature data of the signature file that are within a predetermined threshold from the second sensor data, determining, for each of the signature files, a first total number of continuous values of the signature data of the signature file that are within the predetermined threshold from the first sensor data, and determining, for each of the signature files, a second total number of continuous values of the signature data of the signature file that are within the predetermined threshold from the second sensor data.

In step 2806, a first confidence value and a second confidence value for each of the signature files may be determined based on the comparison of the first and second sensor data with the signature data of the signature files. In step 2808, a determination is made as to whether the first confidence value or the second confidence value for a signature file exceeds a predetermined confidence threshold. If the answer is YES, in step 2810, one or more signature files whose confidence value exceeds a predetermined confidence threshold is identified. Further, in step 2812, a type of disturbance event on the physical transmission line is identified based on the identified one or more signature files. For example, a hammer tap may be identified as a type of disturbance event on the physical transmission line.

In step 2814, the identified type of disturbance event may be presented, via a user interface, to a user and the user may be requested, via the user interface, to confirm the accuracy of the identified type of disturbance event. For example, a user may be requested to confirm that the type of disturbance event is a hammer tap via a user interface. In step 2816, when the user confirms the accuracy of the type of disturbance event presented to the user, one or more signature files may be retrieve from a signature database. These retrieved one or more signature files correspond to signature files that were identified to have a confidence value exceeding a predetermined confidence threshold and that were used to identify the type of disturbance event on the physical transmission line.

In step 2818, the first and second sensor data (e.g., obtained from first sensor and second sensor located on the physical transmission line) may be compared with the signature data of the retrieved one or more signature files to determine differences between the first sensor data and the signature data of the retrieved one or more signature files and between the second sensor data and the signature data of the retrieved one or more signature files. In step 2820, the signature data of the retrieved one or more signature files may be updated based on the determined differences. The updated one or more signature files may be stored in the signature database. Such update of the signature files may help refine accuracy of future detection of disturbance events.

However, in step 2808, if the first confidence value or the second confidence value for a signature file does not exceed a predetermined confidence threshold (e.g., NO in step 2808), then we proceed to step 2822. In step 2822, the disturbance event on the physical transmission line is identified as an unknown event when the first confidence value and the second confidence value for each of the signature files does not exceed the predetermined confidence threshold. Further, in step 2824, the disturbance event may be presented to a user via a user interface as an unknown event and the user, via the user interface, may be requested to provide information about the unknown event. For example, the user may be requested to provide a brief description of the disturbance event. In step 2826, one or more new signature files may be generated based on the first sensor data, the second sensor data, and the information provided by the user about the unknown event. Although flowchart 2800 describes a method for identifying a type of a disturbance event on a physical transmission line based on first and second sensor data, it should be understood that only one of the first sensor data or the second sensor data may be used to identify a type of a disturbance event on a physical transmission line.

In some embodiments, one or more components described herein may be configured in accordance with one or more variables, functions, or other code represented by the following pseudocode:

```
// Variables
_DeviceOutputFrequency=5000 // number of data points per second
_DistanceTimingValue=0
_CompleteTimeCycle=0
_StartingTimeStampValue=0
_CenterDistance=0
_SpeedOfWave=0
_MatchVariance=0.15
_WavelengthVariance=0.15
_DBVariance=1
_BaselineWavelength=1450
_BaselineDB=-14
_CompareResultThresholdCEPoM=0.10
_CompareResultThresholdTEPoM=0.05
_CompareResultThresholdCPoVM=0.10
_CompareResultThresholdTPoVM=0.40
Structure DisturbanceResult
   DisturbanceStart=0
   DisturbanceEnd=0
   DisturbanceLength=0
End Structure
Structure CompareResults
   ContExactPointsofMatch=0
   TotalExactPointsofMatch=0
   TotalContinousPointsofVariableMatch=0
   TotalPointsofVariableMatch=0
End Structure
Start Function Main
   // Sensor Data Time of Flight for Two Sensors
   If CalibrateTimeOfFlight( )=True Then
   // Calibrate Completed, and future disturbances can be determined by the following
      EstimatedDisturbanceLocation=ReturnDistance
         (SensorDisturbance1.DisturbanceStart,
         SensorDisturbance2.DisturbanceStart)
   End If
```

```
// Device Timing Methods
If CalibrateTimingValue( )=True Then
    // Calibration Completed, and future disturbances can be
        determined by the following
    EstimatedDisturbanceLocationByTime
        (SensorDisturbance1.DisturbanceTimeStamp)
End If
End Function
Start Function GridMatch(LeftGridArray[], RightGridArray
    [], PointVarianceThreshold) Returns
CompareResults Object
    For r=0 to RightGridArray.Count
        If LeftGridArray[r]=RightGridArray[r] then
            TotalExactPointsofMatch=TotalExactPointsofMatch+1
        End If
        CheckValue=(LeftGridArray[r]-RightGridArray[r])
        If CheckValue<=PointVarianceThreshold then
            TotalPointsofVariableMatch=TotalPointsofVariable
                Match+1
        End If
    Loop
    Temp_ContExactPointsofMatch=0
    For r=0 to RightGridArray.Count
        For l=0 to LeftGridArray.Count
            LeftGridArray[l]=RightGridArray[r] then
                Temp_ContExactPointsofMatch=Temp_ContExact
                    PointsofMatch+1
            Else
                If    Temp_ContExactPointsofMatch>ContExact
                    PointsofMatch
                    ContExactPointsofMatch=Temp_ContExact
                        PointsofMatch
                End If
                Temp_ContExactPointsofMatch=0
            End If
        Loop
        If Temp_ContExactPointsofMatch>ContExact Point-
            sofMatch
            ContExactPointsofMatch=
Temp_ContExactPointsofMatch
        End If
    Loop
    Temp_ TotalContinousPointsofVariableMatch=0
    For r=0 to RightGridArray.Count
        For l=0 to LeftGridArray.Count
            CheckValue=(LeftGridArray[l]-RightGridArray[r])
            If CheckValue<=PointVarianceThreshold then
                Temp_ TotalContinousPointsofVariableMatch=
Temp_ TotalContinousPointsofVariableMatch+1
            Else
                If Temp_ TotalContinousPointsofVariableMatch>
TotalContinousPointsofVariableMatch Then
                    TotalContinousPointsofVariableMatch=
Temp_ TotalContinousPointsofVariableMatch
            End If
                Temp_ TotalContinousPointsofVariableMatch=0
            End If
        Loop
        If Temp_ TotalContinousPointsofVariableMatch>
TotalContinousPointsofVariableMatch Then
            TotalContinousPointsofVariableMatch=
Temp_ TotalContinousPointsofVariableMatch
        End If
    Loop
    // Set values of return object
    CompareResults.ContExactPointsofMatch=ContExact
        PointsofMatch
    CompareResults.TotalExactPointsofMatch=TotalExact
        PointsofMatch
    CompareResults.TotalContinousPointsofVariableMatch=
TotalContinousPointsofVariableMatch
    CompareResults.TotalPointsofVariableMatch=Total
        PointsofVariableMatch
    Return CompareResults
End Function
Start Function DetermineDisturbance (AnalysisBuffer[])
    Returns DisturbanceResult
    // This function determines disturbance based on multiple
        factors
    // This example utilizes only wavelength and power vari-
        ance, however, multiple reading types
based on device can be utilized
    DisturbanceStart=0
    DisturbanceStarted=False
    DisturbanceEnd=0
    For b=0 to AnalysisBuffer.Count
        If    ((AnalysisBuffer[b].Wavelength-_BaselineWave-
            length)>
_WavelengthVariance)
        OR    ((AnalysisBuffer[b].DB-_BaselineDB)>_DBVariance)
        Then
            If DisturbanceStarted=False then
                DisturbanceStart=b
                DisturbanceStarted=True
            End If
        Else
            If DisturbanceStarted=True Then
                DisturbanceEnd=b
                Exit Loop
            End If
        End If
    Loop
    DisturbanceResult.DisturbanceStart=DisturbanceStart
    DisturbanceResult.DisturbanceEnd=DisturbanceEnd
        DisturbanceResult.DisturbanceLength=DisturbanceEnd-
            DisturbanceStart
    Return DisturbanceResult
End Function
Start Function ReturnDistance(Time1, TimeValue2) Returns
    Number
    DistancePer=_SpeedOfWave/ _DeviceOutputFrequency
    DistanceDifference=TimeValue2-TimeValue1
    SideDistance=DistanceDifference*DistancePer
    Return (_CenterDistance+SideDistance)
End Function
Start    Function    CalculateSpeedofWave(TimeDifference,
    TotalLength,
KnownDisturbanceDistance) as Number
    CenterDistance=TotalLength/2
    _CenterDistance=CenterDistance
    CenterDifference=DisturbanceDistance-CenterDistance
    For t=40 to 13000
        If ((t/ _DeviceOutputFrequency)*TimeDifference)=Cen-
            terDifference Then
            Return t
            Exit Loop
        End If
    Next
End Function
// Calibration of Sensor Data
Start Function CalibrateTimeOfFlight ( ) Returns Boolean
    *Read Device Information
        *Populate Sensor1ReadBuffer[] with Device Information
            (Wavelength, Amplitude, etc)
```

Figure 29A:
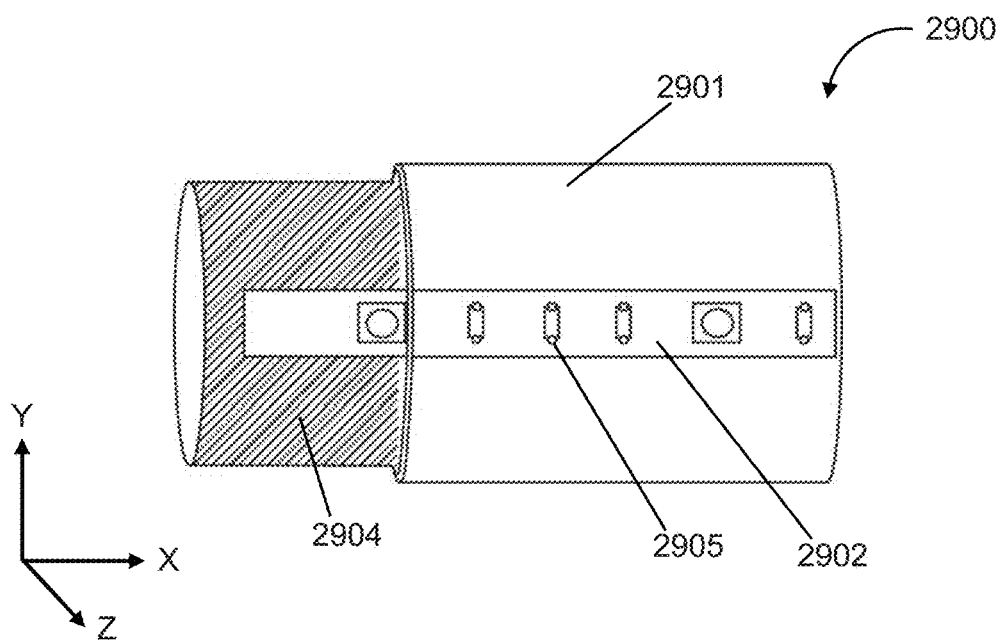
FIGS. 29A and 29B illustrate a cable assembly, in accordance with one or more embodiments.
Figure 29B:
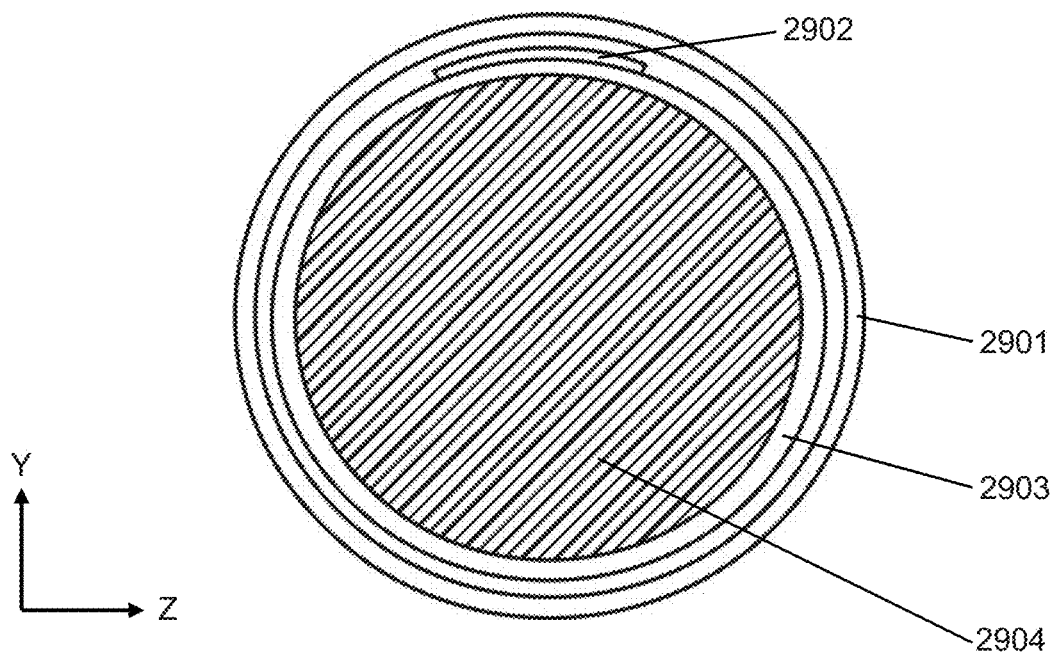

*Populate Sensor2ReadBuffer[] with Device Information (Wavelength, Amplitude, etc)
  EstimatedDistance=Prompt User for Estimated Distance of Disturbance
  TotalKnownDistance=Prompt User for Known Distance of Section
  // Method One: Sensor Data Time of Flight for Two Sensors
  Sensor1DisturbanceResult=DetermineDisturbance (Sensor1ReadBuffer[])
Sensor2DisturbanceResult=DetermineDisturbance (Sensor2ReadBuffer[])
  // Verify that disturbance is the same
  SensorDisturbance1=CopyFromArray (Sensor1ReadBuffer[]),
Sensor1DisturbanceResult.DisturbanceStart,
  Sensor1DisurbanceResult.DisturbanceLength)
  SensorDisturbance2=CopyFromArray (Sensor2ReadBuffer[],
Sensor2DisturbanceResult.DisturbanceStart,
  Sensor2DisturbanceResult.DisturbanceLength)
  SensorCompareResults=GridMatch(SensorDisturbance1 [], SensorDisturbance2[],
_MatchVariance)
  If  ((SensorCompareResults.ContExactPointsofMatch/ SensorDisturbance1.Count)>=
_CompareResultThresholdCEPoM) OR
(SensorCompareResults.TotalExactPointsofMatch/ SensorDisturbance1.Count)>=
_CompareResultThresholdTEPoM) OR
(SensorCompareResults.TotalContinousPointsofVariableMatch/SensorDisturbance1.Count)>=
_CompareResultThresholdCPoVM) OR
(SensorCompareResults.TotalPointsofVariableMatch/ SensorDisturbance1.Count)>=
_CompareResultThresholdTPoVM) Then
    // Determine the speed of wave through the material
    _SpeedOfWave=CalculateSpeedofWave( (SensorDisturbance2.DisturbanceStart–
SensorDisturbance1.DisturbanceStart),  TotalKnownDistance, EstimatedDistance)
    Return True
  Else
    Return False
  End If
End Function
Start Function CalculateTimingSpeed(DisturbanceTime1, DisturbanceTime2,
TotalKnownDistance)
  DisturbanceTimeDiff=DisturbanceTime2–DisturbanceTime1
  DisturbanceDistanceDiff=DisturbanceDistance2–DisturbanceDistance1
  DistancePerTime=DisturbanceDistanceDiff/DisturbanceTimeDiff
  _DistanceTimingValue=DistancePerTime
End Function
// Starlight
Start Function CalibrateTimingValue( ) Returns Boolean
  // Method Two & Three: Timestamp Distance Calculation
  TotalKnownDistance=Prompt User for Known Distance of Section
  *Prompt User to Create Disturbance at the Beginning of the Section
  KnownDistance1=Prompt User for Known Distance of Section Disturbance
  *Read Device Information
    *Populate Sensor1ReadBuffer[] with Device Information (Wavelength, Amplitutde, etc)
  and Timestamp Information
    SensorBeginDisturbanceResult=DetermineDisturbance (Sensor1ReadBuffer[])
  *Set Known KnowDistance1TimeStamp from SensorBeginDisturbanceResult.DisturbanceStart
    *Prompt User to Create Disturbance at the End of the Section
    KnownDistance=Prompt User for Known Distance of Section Disturbance
  *Read Device Information
    *Populate Sensor1ReadBuffer[] with Device Information (Wavelength, Amplitude, etc)
  and Timestamp Information
    SensorEndDisturbanceResult=DetermineDisturbance (Sensor1ReadBuffer[])
    CalculateTimingSpeed(KnowDistance1TimeStamp, KnowDistance2TimeStamp,
  TotalKnownDistance)
  _CompleteTimeCycle=TotalKnownDistance*_Distance TimingValue
  _StartingTimeStampValue=KnowDistance1TimeStamp– (KnownDistance1*
  _DistanceTimingValue
  Return True
End Function
Start Function EstimatedDisturbanceLocationByTime(DisturbanceTimeStamp) Returns Number
  TickDisturbanceDiff=DisturbanceTimeStamp–_StartingTimeStampValue
  CompletedCycles=Math.RoundDown(TickDisturbanceDiff/ _CompleteTimeCycle)
  Return  (TickDisturbanceDiff– (_CompleteTimeCycle*CompletedCycles))* DistanceTimingValue
End Function
  Cable Assembly
  FIGS. 29A and 29B show a cable assembly that illuminates using, for example, light emitting diodes (LEDs) (see also visual indication 1528 in FIG. 15) to provide an inspection personnel with real-time information regarding the state of the cable assembly. The inner and outer jackets (or sheaths) of the cable assembly may be utilized for new or existing optical fiber cable designs as well as armored optic fiber assemblies that utilize metal or non-metallic tubing (spiral, inter-locking, or non-interlocking) with aramid and/or other strengthening materials.

Figure 30:
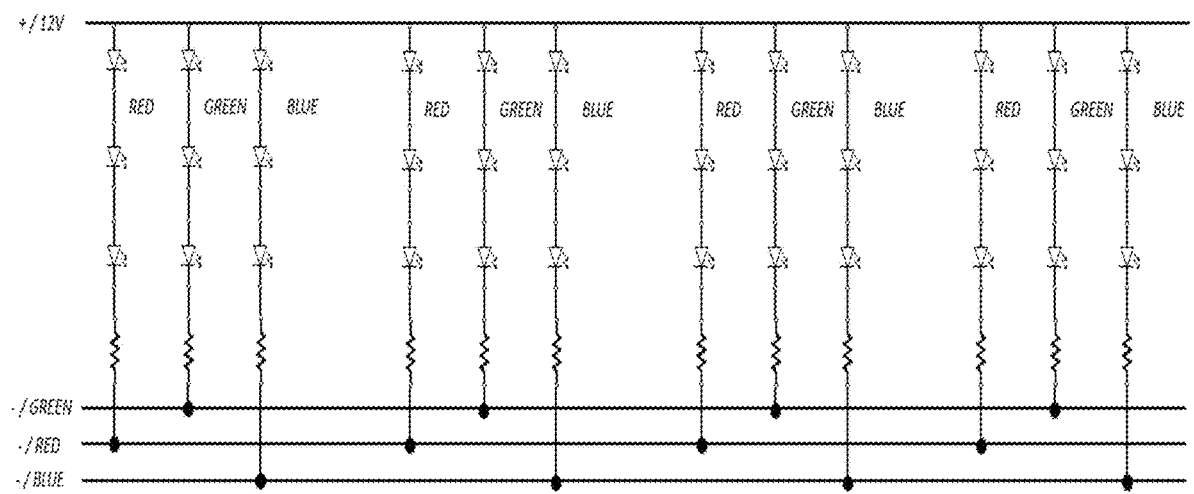
FIG. 30 illustrates a circuit, in accordance with one or more embodiments.

FIGS. 29A and 29B show a cable assembly 2900 that includes an outer jacket 2901 (or outer sheath), a printed circuit board (PCB) 2902 (including a plurality of LEDs 2905), an optional inner jacket 2903 (or inner sheath), and a core 2904 (e.g., a fiber optic cable or optical fiber assembly which comprises at least one optical fiber enclosed in a tubular member). The PCB 2902 may include circuitry to communicate with the server 1502 to receive instructions to turn on/off one or more LEDs 2905 and may include control circuitry to turn on/off the LEDs 2905 based on such instructions. The outer jacket 2901 may have an inner diameter than is slightly larger than an outer diameter of the core 2904. The outer jacket 2901 may be composed of Polyvinly Chloride (PVC), Low smoke Zero Halogen (LSZH), Thermoplastic polyurethane (TPU), Ethylene Tetrafluoroethylene (ETFE), Optical Fiber Nonconductive Plenum (OFNP), or other types of plastic or rubber compounds. The outer jacket 2901 may or may not be flame retardant and the outer jacket 2901 may either be translucent in color or may be a colored jacket with transitions of translucent material at the location of the LEDs 2905 to allow emitted light to pass through. The PCB 2902 may include LEDs 2905 and additional circuitry for control. The thickness of the PCB 2902 may range from 0.50-2.50 mm, the width of the PCB 2902 may vary, but is typically between 6 and 12 mm, and the length of the PCB 2902 may be consistent with the length of the cable assembly. An example of the circuitry for the PCB 2902 is illustrated in FIG. 30. FIG. 30 shows an SMD5050 design for analog control of Red Green Blue (RGB) LEDs. However alternate LED control circuits such as an LPD8806 can be utilized to provide individually accessible RGB LED control. The PCB 2902 may include connections at the beginning and/or end of the assembly for connecting to an external power source and additional control circuits for signal processing. The relative thickness of the PCB 2902 allows for contouring around the inner jacket 2903 and/or core 2904.

The inner jacket 2903 may have an inner diameter than is slightly larger than the outer diameter of the core 2904. The inner jacket 2903 may be composed of PVC, LSZH, TPU, ETFE, OFNP, or other types of plastic or rubber compounds that can be utilized to color the inner jacket 3 when utilizing a translucent outer jacket 2901. The core 2904 (e.g., a fiber optic cable or optical fiber assembly which may comprise at least one optical fiber enclosed in a tubular member) may be composed of PVC, High-density Polyethylene (HDPE) or Silicone. Optionally, the core 2904 may be an armored assembly composed of a metallic or non-metallic spiral, inter-locking or non-interlocking tube. Core 2904 may include optional strengthening materials, such as aramid or glass fibers, plastic or metal wiring or similar strength and rigidity increasing materials.

The PCB 2902 can be integrated into the cable assembly 2900 using multiple methods based on the outer and inner jacket materials and the environmental and performance requirements of the cable assembly 2900.

FIG. 29A shows a cable assembly 2900 without channels (or channel openings). In FIG. 29, the PCB 2902 (which includes a plurality of LEDs 2905) is placed between the outer jacket 2901 and core 2904. For example, the PCB 2902 may be placed on top of the core 2904 using an adhesive to ensure proper alignment of the PCB 2902 with the overall cable assembly 2900. Alternatively, as illustrated in FIG. 29B, the PCB 2902 may be placed between the inner jacket 2903 and outer jacket 2901. For example, the PCB 2902 may be placed on top of the inner jacket 2903 using an adhesive to ensure proper alignment of the PCB 2902 with the overall cable assembly 2900. FIG. 29B shows a YZ plane view of the cable 2900 assembly illustrated in FIG. 29A.

The spacing between the outer jacket 2901 and the core 2904 (or between the outer jacket 2901 and the inner jacket 2903) may be approximately 0.50-2.50 mm depending upon the thicknesses of the PCB 2902 and the material of the outer jacket 2901. For example, a rigid PVC material for the outer jacket 2901 may require spacing equivalent to the full PCB thickness, whereas a rubber or rubber type compound would allow inherent contouring/molding around the PCB 2902. Utilizing no channels (or channel openings) for the outer jacket 2901 may ensure that the inherent durability of the outer jacket 2901 is unaffected.

The outer jacket 2901 may be translucent, thereby, allowing light from the LEDs 2905 to be seen. When a location of a disturbance event (e.g., a location of an intrusion attempt) on the cable assembly 2900 is identified, the system 1500 may be configured to supply a signal via network 1550 to the cable assembly 2900 so that the LEDs 2905 that are located at or near the location of the disturbance event can be illuminated. Additionally, the system 1500 may be configured to supply a signal via network 1550 to the cable assembly 2900 so that the LEDs 2905 can be illuminated to indicate a type of disturbance event. For example, different LEDs can be illuminated (different patterns) to identify different types of disturbance events. Additionally, or alternatively, different colors can be illuminated to identify different types of disturbance events. Further, the LEDs can also be illuminated to show specific status information such as warning conditions and maintenance activity. Although only one strip of LEDs 2905 is illustrated in FIGS. 29A and 29B, it should be understood that a plurality of PCBs 2902 can be included between the core 2904 and outer jacket 2901 (or between the inner jacket 2903 and the outer jacket 2901) such that the LEDs 2905 on the PCB 2902 can be viewed from different angles and directions.

Figure 31A:
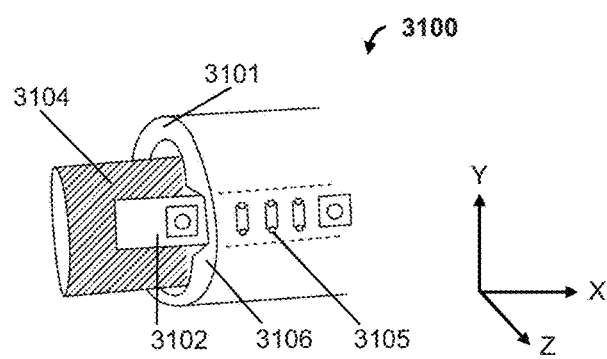
FIGS. 31A, 31B, 31C, and 31D illustrate a cable assembly, in accordance with one or more embodiments.
Figure 31B:
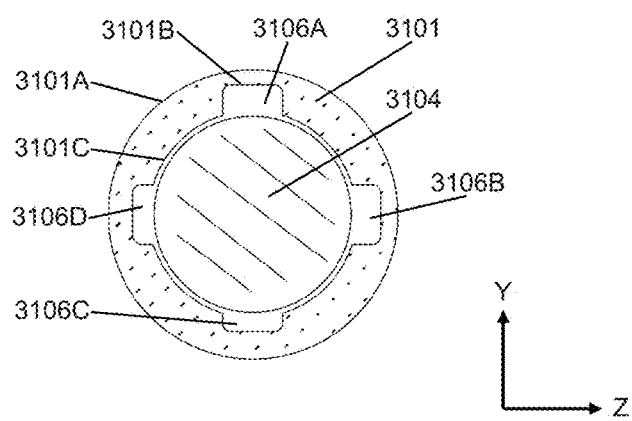

FIG. 31A shows a cable assembly 3100 that includes a core 3104, PCB 3102 (including a plurality of LEDs 3105), and an outer jacket 3101. The outer jacket 3101 includes a channel (or channel opening) 3106 that allows the PCB 3102 to be positioned within the channel opening 3106. The channel may be molded, cut, or otherwise imparted on the inside of the outer jacket 3101. The PCB 3102 may include circuitry to communicate with the server 1502 to receive instructions to turn on/off one or more LEDs 3105 and may include control circuitry to turn on/off the LEDs 3105 based on such instructions. FIG. 31B shows another view of the cable assembly 3100 (view of the YZ plane). In FIG. 31B, the outer jacket 3101 is illustrated to include a plurality of channel openings 3106A-D (within which a plurality of PCBs 3102 may be positioned). Further, FIG. 31B illustrates core 3104. Although the cable assembly 3100 does not illustrate an inner jacket, it should be understood that an inner jacket may be included in the cable assembly 3100 such that the inner assembly surrounds the core 3104 and the PCB 3102 may be positioned between the inner jacket and the outer jacket 3101.

FIG. 31B also illustrates an outer layer 3101A of the outer jacket 3101, a first inner layer 3101B of the outer jacket 3101, and a second inner layer 3101C of the outer jacket 3101. Here, the first inner layer 3101B corresponds to a top portion of the channel 3106A. The first inner layer 3101B is formed in a section of the outer jacket 3101 that includes the channel opening 3106A and the second inner layer 3101C is formed in a section of the outer jacket 3101 that does not include the channel opening 3106A. The first thickness between the outer layer 3101A and the first inner layer 3101B is smaller than the second thickness between the outer layer 3101A and the second inner layer 3101C. The shape of the channel opening 3106 can be rectangular, square, circular, trapezoidal, or any other shape that can allow the PCB 3102 to be positioned within the channel opening 3106.

Figure 31C:
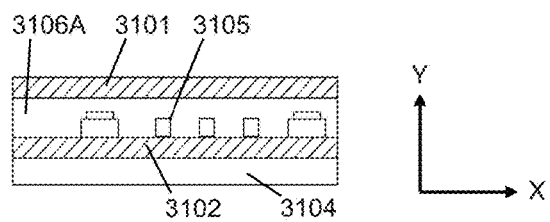

FIG. 31C illustrates another view of the channel assembly 3100 (view of the YX plane). In FIG. 31C, a PCB 3102 is illustrated to be positioned within the channel opening 3106A and between the outer jacket 3101 and the core 3104. Here, a depth of the channel opening is illustrated as being consistent throughout a length of the outer jacket in the X direction. This allows the PCB 3102 to stay in a specific orientation and position within the channel 3106A, while also allowing for removal of the PCB 3102 for activities such as repair, by allowing the PCB 3102 to slide out of the channel 3106A when adhesives have not been utilized during the manufacturing process. The depth of the channel opening 3106A may be measured based on a difference between the second thickness (e.g., the second thickness between the outer layer 3101A and the second inner layer 3101C) and the first thickness (e.g., the first thickness between the outer layer 3101A and the first inner layer 3101B). Alternatively, the depth of the channel opening 3106A may be measured as the difference between the second thickness and the first thickness plus a spacing between the core 3104 and the second inner layer 3101C. The spacing between the core 3104 and the second inner layer 3101C (e.g., the spacing between the core 3104 and the outer jacket 3101) may be less than 1 mm. The channel opening 3106 may have a depth of approximately 0.50-2.50 mm dependent on the type and size of the PCB 3102 that is embedded within the channel opening 3106.

Figure 31D:
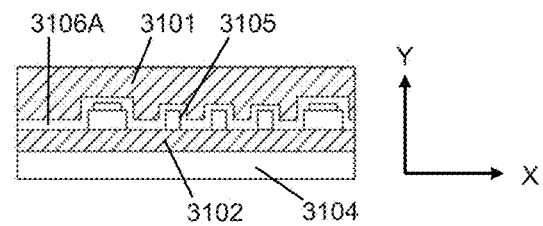

FIG. 31D illustrates another view of the channel assembly 3100 (view of the YX plane) and is an alternate to the configuration described and illustrated with regard to FIG. 31C. For example, FIG. 31D illustrates a molded channel opening 3106A (that may contour around each PCB 3102 component) such that a depth of the channel opening 3106A varies along a length of the outer jacket 3101. The depth of the channel opening 3106A may vary by 1 mm because of the varied depth of the channel opening 3106A. This varied depth allows strict control of the PCB 3102 and may prevent removal or movement under normal and adverse operating circumstances. Adhesives between the core 3104 and the PCB 3102 may be utilized. However, an adhesive is not required.

Figure 32A:
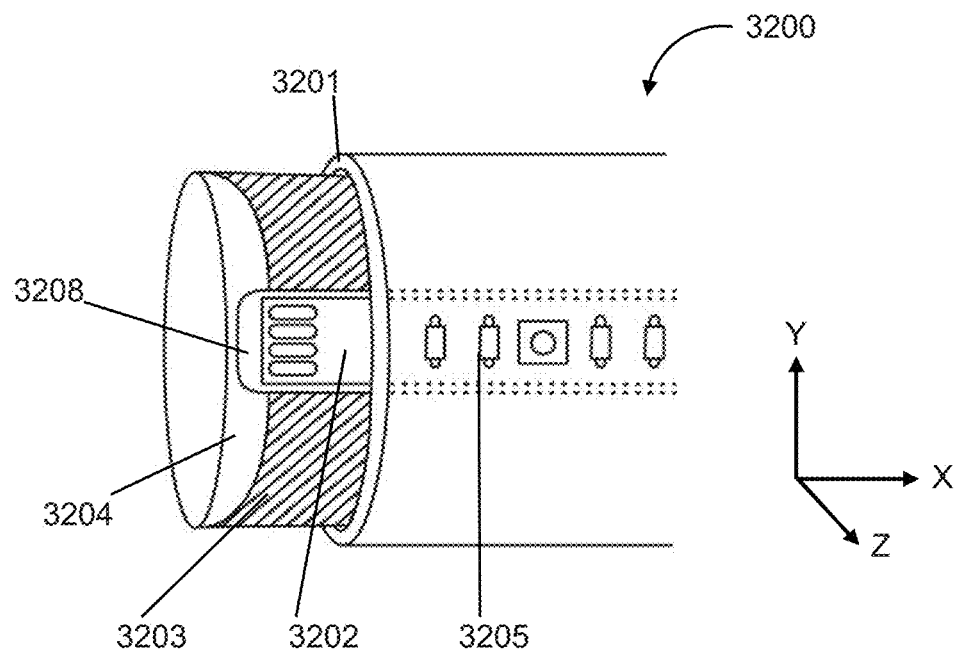
FIGS. 32A and 32B illustrate a cable assembly, in accordance with one or more embodiments.
Figure 32B:
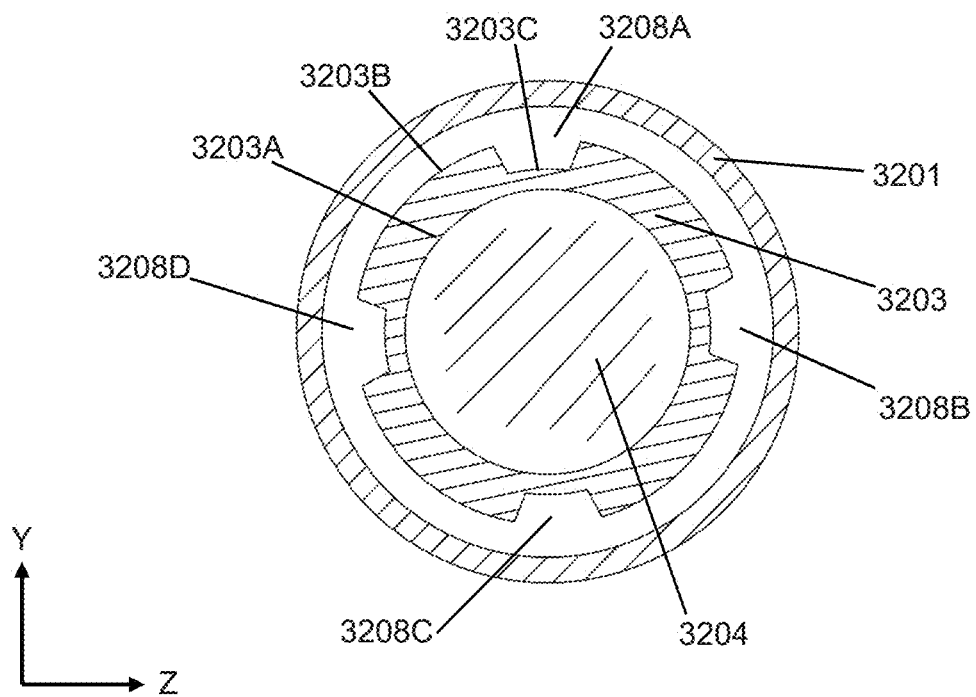

FIG. 32A shows a cable assembly 3200 that includes a core 3204, PCB 3202 (including a plurality of LEDs 3205), an outer jacket 3201, and an inner jacket 3203. The inner jacket 3203 includes a channel (or channel opening or depression) 3208 that allows the PCB 3202 to be positioned within the channel opening 3208. The channel may be molded, cut, or otherwise imparted on the outside of the inner jacket 3203. FIG. 32B shows another view of the cable assembly 3200 (view of the YZ plane). In FIG. 32B, the inner jacket 3203 is illustrated to include a plurality of channel openings 3208A-D (within which a plurality of PCBs 3202 may be positioned). Further, FIG. 32B also illustrates the outer jacket 3201 and core 3204.

FIG. 32B also illustrates an inner layer 3203A of the inner jacket 3203, a first outer layer 3203B of the inner jacket 3203, and a second outer layer 3203C of the inner jacket 3203. Here, the second inner layer 3203C corresponds to a bottom portion of the channel opening 3208A. The second outer layer 3203C is formed in a section of the inner jacket 3203 that includes the channel opening 3208A and the first outer layer 3203B is formed in a section of the inner jacket 3203 that does not include the channel opening 3208A. The first thickness between first outer layer 3203B and the inner layer 3203A is larger than the second thickness between the second outer layer 3203C and the inner layer 3203A. The shape of the channel opening 3208 can be rectangular, square, circular, trapezoidal, or any other shape that can allow the PCB 3202 to be positioned within the channel opening 3208.

A depth of the channel opening 3208 may be consistent throughout a length of the outer jacket 3201 in the X direction. The depth of the channel opening 3208 may be measured based on a difference between the first thickness (e.g., the first thickness between first outer layer 3203B and the inner layer 3203A) and the second thickness (e.g., the second thickness between the second outer layer 3203C and the inner layer 3203A). Alternatively, the depth of the channel opening 3208A may be measured as the difference between the first thickness and the second thickness plus a spacing between the first outer layer 3203B and the outer jacket 3201. The spacing between the first outer layer 3203B and the outer jacket 3201 (e.g., the spacing between the inner jacket 3203 and the outer jacket 3201) may be less than 1 mm. The channel opening 3208 may have a depth of approximately 0.50-2.50 mm dependent on the type and size of the PCB 3202 that is embedded within the channel opening 3208.

The channel opening 3208 may be included within the inner jacket 3203 in situations where the durability, rigidity or performance of the material of the outer jacket 3201 could be negatively affected by the varying diameter/thickness of the channel within the outer jacket 3201. Such a configuration in FIGS. 32A and 32B may ensure that environmental durability, bending radius, and other stress factors do not affect the integrity of the outer jacket 3201.

The channel opening 3208 within the inner jacket 3203 ensures that the PCB 3202 stays within a fixed position relative to the rest of the cable assembly 3200. This configuration in FIGS. 32A and 32B allows the PCB 3202 to stay in a specific orientation and position, while allowing for removal of the PCB 3202 for activities such as repair, by allowing the PCB 3202 to slide out of the channel 3208 when adhesives have not been used during the manufacturing process.

The LEDs described above may provide alarm response personnel with visual indicators attached to transmission lines (or their enclosures) that provide specific status information such as warning conditions, maintenance activity, intrusion information, and/or location information. The spacing between LEDs may be varied based on several factors. Some of the factors may include length, width, and/or diameter of the cable assembly. For example, a shorter cable assembly may have less spacing between the LEDs compared to a longer cable.

Further, a number of LEDs that are lit may depend on a length of the disturbance event on the physical transmission line. For example, if the disturbance event spans a large portion of the transmission line, then several LEDs (that span the portion of the physical transmission line that has been disturbed) may be lit. Alternatively, only two LEDs may be lit (e.g., an LED at a start location of the disturbance event on the physical transmission line and at an end location of the disturbance event on the physical transmission line). Alternatively, only one LED may be lit that is closest to the identified location of the disturbance event on the physical transmission line. By lighting few number of LEDs, power can be saved. Long distances of continuously lit LEDs require large amounts of power. For that reason, the number of LEDs that are simultaneously lit may be limited to ensure that usage of power by the LEDs is below a predetermined threshold. The server 1502 may determine a number of LEDs to be lit and/or the pattern of the LEDs to be lit based on the length of the disturbance event on the physical transmission line (in other words, a length of the portion of the physical transmission line that has been disturbed), amount of power supply required for each of the LEDs, and/or color of the LEDs to be visually displayed so that the power used by the LEDs does not exceed a predetermined threshold. Alternatively, control circuitry of the PCB may determine a number of LEDs to be lit and/or the pattern of the LEDs to be lit based on the length of the disturbance event on the physical transmission line (in other words, a length of the portion of the physical transmission line that has been disturbed), amount of power supply required for each of the LEDs, and/or color of the LEDs to be visually displayed so that the power used by the LEDs does not exceed a predetermined threshold.

In addition to visually indicating that there is a disturbance event at a specific location of the physical transmission line, the LEDs may be lit based on one or more patterns. For example, one LED may be made to blink (e.g., an LED closest to the identified location of the disturbance event on the physical transmission line), thereby, providing a network personnel better visibility of the exact location of the disturbance event on the physical transmission line. Alternatively, a series of LEDs may be lit one after another (a "chase" effect) that located between a start location of the disturbance event on the physical transmission line and an end location of the disturbance event on the physical transmission line. Such a chase effect may allow very long sections of the physical transmission line to be illuminated without exceeding a power level beyond a predetermined threshold. Further, different color LEDs may be lit to indicate different information to a network personnel. For example, a red LED may indicate that there is a disturbance event on the physical transmission line, a green LED may indicate that there is no disturbance event on the physical transmission line, and a blue LED may indicate that maintenance is being conducted on the physical transmission line. It should be understood that these are merely some examples, and various combinations of patterns and colors may be used to provide alarm response personnel with specific status information such as warning conditions, maintenance activity, intrusion information, and/or location information.

Figure 33:
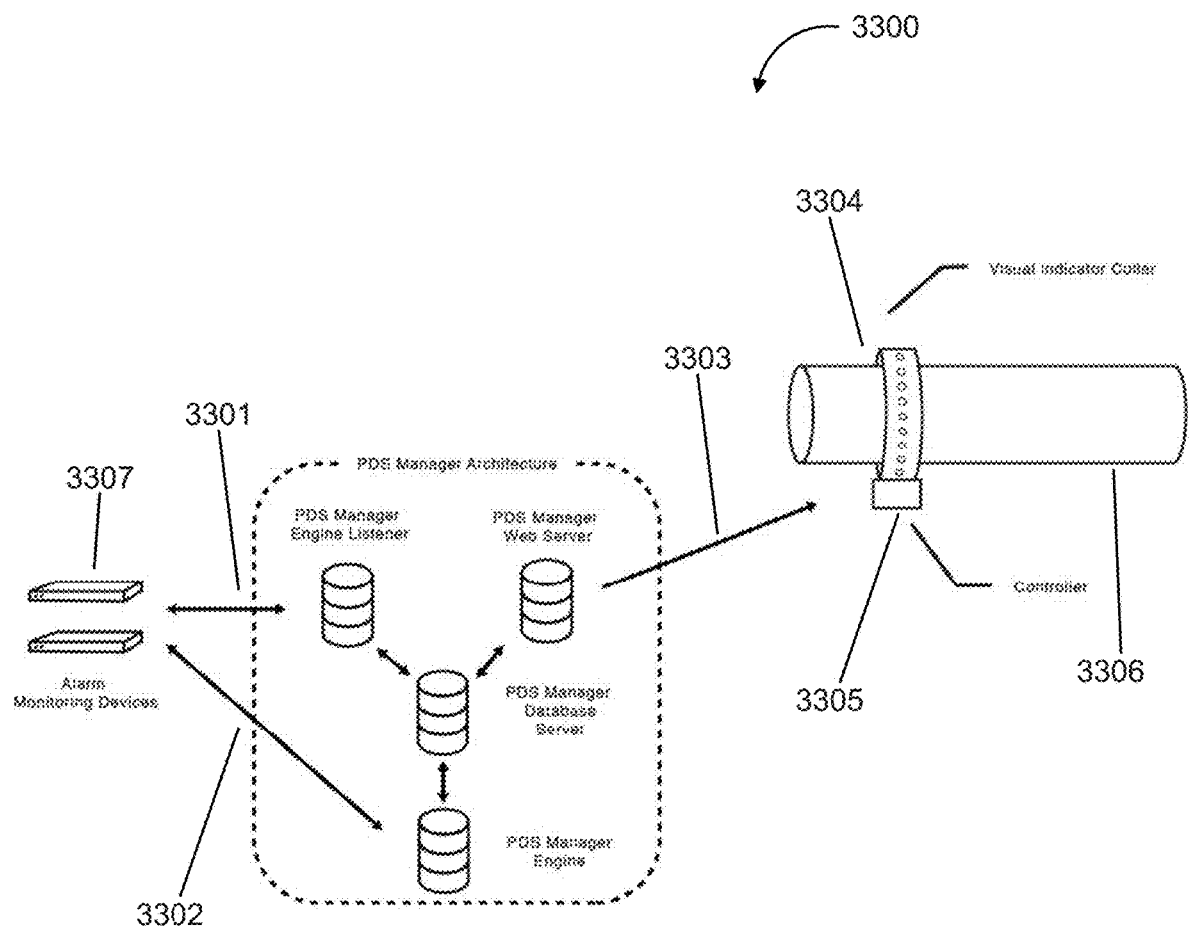
FIG. 33 illustrates an architecture and operation of a visual indication system.

FIG. 33 shows an architecture and operation of a visual indication system 3300 in conjunction with a PDS manager architecture. One or more components of the visual indication system 3300 illustrated in FIG. 33 may correspond to one or more components of the system 1500 in FIG. 15.

FIG. 33 shows alarm monitoring devices 3307 that detect disturbances to a transmission line 3306. The transmission line 3306 may be affixed with a visual indication collar 3304, which includes a series of LED lights managed and controlled by an electronic controller 3305. As the alarm monitoring devices 3307 detect disturbances on the transmission line 3306, data is sent to the PDS manager architecture (see 3301 and 3302 in FIG. 33) and this data is processed by the PDS manager system and state information (such as "no issue," "alarm," "warning," or "maintenance" conditions) may be produced.

The PDS Manager Web Server may provide real-time data feed in the form of a web service that the visual indicator system controller 3305 may request via Ethernet, WiFi or other wireless radio communication (see 3303 in FIG. 33). Sensor data status information may be processed by the visual indicator system controller 3305 and based on user configuration within the controller, visual indicators (such as LED lights) may display on the transmission line 3306. For example, "no issue" conditions may light the LEDs on the "visual indicator collar" as green, "warning" conditions as yellow, "maintenance" conditions in blue and "alarm" conditions in red. As the PDS Manager continues to update transmission line state information, the visual indication system 3300 may update visual indicators in real-time so that response personnel know current transmission line status.

Figure 34:
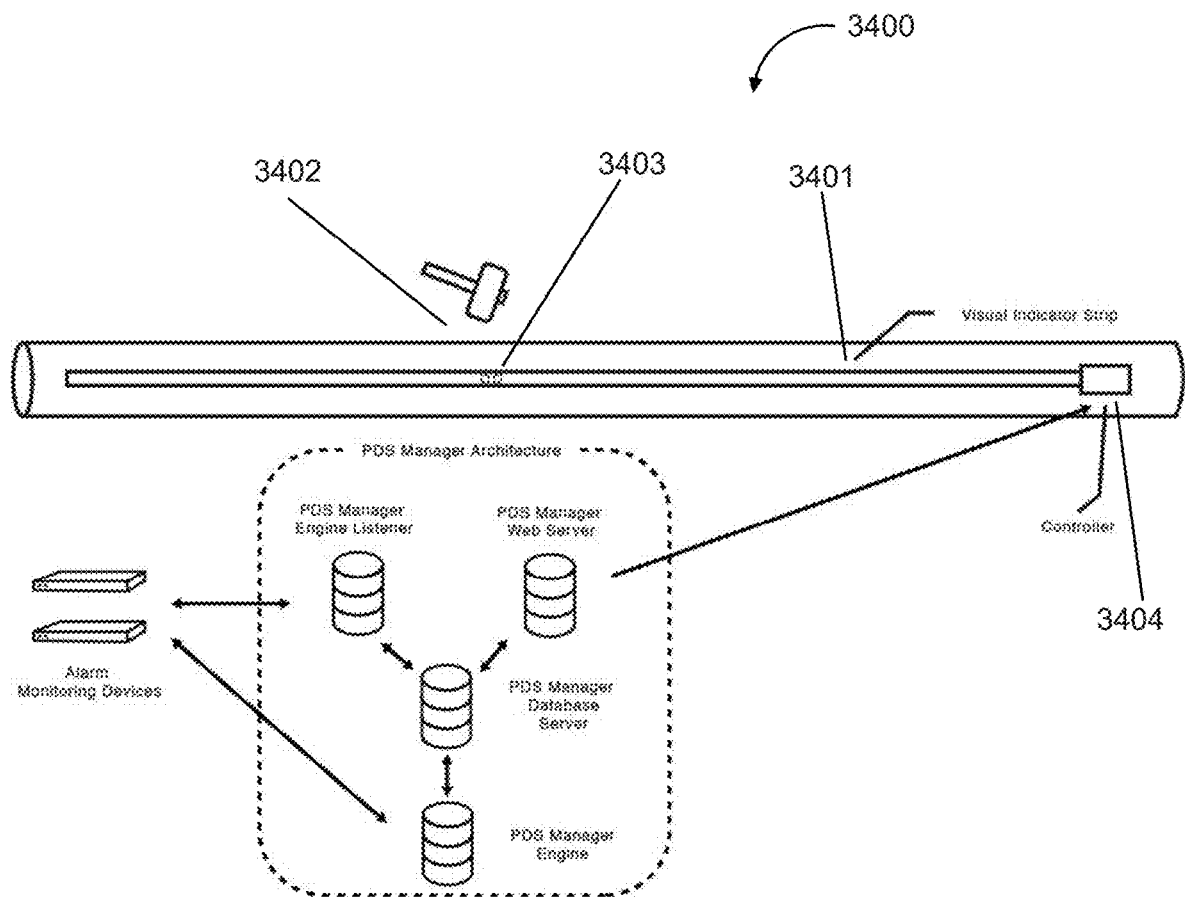
FIG. 34 illustrates an architecture and operation of a visual indication system, in accordance with one or more embodiments.

The visual indication system 3300 can utilize multiple form factors, including a "visual indicator collar" as shown in FIG. 33, a visual indicator "strip" as shown in FIG. 34 which uses a series of connected lights that affix to the transmission line or one or more indicators as a visual indicator "box" affixed to the transmission line. When the system 3400 is utilized with a "visual indicator strip" 3401, location information provided by the PDS Manager is utilized by the visual indicator system controller 3404 to visually indicate the location of the disturbance (e.g., 3403 in FIG. 34 shows a series lights illuminated after a disturbance at location 3402 is detected). This provides response personnel the ability to pinpoint the exact location of a disturbance.

In some embodiments, the various computers and subsystems illustrated in FIG. 15 may include one or more computing devices that are programmed to perform the functions described herein. The computing devices may include one or more electronic storages (e.g., database(s) 1532, which may include signature database 1534, sensor database 1536, etc., or other electric storages), one or more physical processors programmed with one or more computer program instructions, and/or other components. The computing devices may include communication lines or ports to enable the exchange of information with a network (e.g., network 1550) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 1512-1518 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 1512-1518 described herein is for illustrative purposes, and is not intended to be limiting, as any of subsystems 1512-1518 may provide more or less functionality than is described. For example, one or more of subsystems 1512-1518 may be eliminated, and some or all of its functionality may be provided by other ones of subsystems 1512-1518. As another example, additional subsystems may be programmed to perform some or all of the functionality attributed herein to one of subsystems 1512-1518.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

The present techniques will be better understood with reference to the following enumerated embodiments:

A1. A method for identifying a location of a disturbance event on a physical transmission line, the method comprising: obtaining, from a first sensor among sensors on a physical transmission line, first sensor data, the first sensor data including first measured values of the disturbance event over a length of time; obtaining, from a second sensor among the sensors on the physical transmission line, second sensor data, the second sensor data including second measured values of the disturbance event over the length of time; determining a first initial detection time of the first measured values and a second initial detection time of the second measured values; determining a time difference between the first initial detection time and the second initial detection time; approximating a first distance of the disturbance event from the first sensor based on the time difference and a known constant and a second distance of the disturbance event from the second sensor based on the time difference and the known constant; and identifying a location of the disturbance event on the physical transmission line based on the approximated first and second distances.

A2. The method of embodiment A1, wherein the location of the disturbance event on the physical transmission line is identified further based on locations of the first and second sensors on the physical transmission line.

A3. The method of any of embodiments A1-2, further comprising: obtaining, from a sensing device located on the physical transmission line, sensing data, the sensing data including information regarding timestamp values of a light beam emitted by the sensing device and reflected back to the sensing device by one of the sensors and information regarding a property of the light beam emitted by the sensing device and reflected back to the sensing device by the one of the sensors; determining, based on the sensing data, (i) a roundtrip time of the light beam emitted by the sensing device and reflected back to the sensing device by the one of the sensors and (ii) a change in the property of the light beam emitted by the sensing device and reflected back to the sensing device by the one of the sensors; and identifying the location of the disturbance event on the physical transmission line further based on (i) the roundtrip time of the light beam emitted by the sensing device and reflected back to the sensing device by the one of the sensors and (ii) the change in the property of the light beam emitted by the sensing device and reflected back to the sensing device by the one of the sensors.

A4. The method of any of embodiments A1-3, wherein the location of the disturbance event on the physical transmission line is identified further based on a location of the sensing device on the physical transmission line.

A5. The method of any of embodiments A1-4, further comprising: obtaining, from a sensing device located on the physical transmission line, sensing data, the sensing data including information regarding a property of a light beam emitted by the sensing device and reflected back to the sensing device by one of the sensors and information regarding timestamp values of another light beam emitted by the sensing device and reflected back to the sensing device by another one of the sensors; determining, based on the sensing data, (i) a change in the property of the light beam emitted by the sensing device and reflected back to the sensing device by the one of the sensors and (ii) a roundtrip time of the other light beam emitted by the sensing device and reflected back to the sensing device by the other one of the sensors; and identifying the location of the disturbance event on the physical transmission line further based on (i) the change in the property of the light beam emitted by the sensing device and reflected back to the sensing device by the one of the sensors and (ii) the roundtrip time of the other light beam emitted by the sensing device and reflected back to the sensing device by the other one of the sensors.

A6. The method of any of embodiments A1-5, wherein the known constant is at least one of speed of sound or speed of light.

A7. The method of any of embodiments A1-6, further comprising: presenting, via a user interface, the location of the disturbance event on the physical transmission line.

A8. The method of any of embodiments A1-7, further comprising: determining whether the first measured values and the second measured values correspond to a single disturbance event or multiple disturbance events based on (i) a comparison of time durations of the first and second measured values and (ii) a comparison of peak/valley magnitudes of the first and second measured values.

A9. The method of any of embodiments A1-8, wherein the property of the light beam includes at least one of wavelength or amplitude.

A10. The method of any of embodiments A1-9, wherein the light beam is emitted by the sensing device via the physical transmission line and reflected back to the sensing device via the physical transmission line.

A11. The method of any of embodiments A1-10, wherein the property of the light beam includes at least one of wavelength or amplitude.

A12. The method of any of embodiments A1-11, wherein the light beam is emitted by the sensing device via the physical transmission line and reflected back to the sensing device via the physical transmission line, and wherein the other light beam is emitted by the sensing device via the physical transmission line and reflected back to the sensing device via the physical transmission line.

A13. The method of any of embodiments A1-12, wherein the sensors include optical sensors, electrical sensors, acoustical sensors, or fiber bragg grating sensors.

A14. The method of any of embodiments A1-13, further comprising: obtaining signature files corresponding to previous disturbance events, each of the signature files including signature data including previously measured values of the previous disturbance events over the length of time; comparing the first and second sensor data with the signature data of the signature files; determining a first confidence value and a second confidence value for each of the signature files based on the comparison of the first and second sensor data with the signature data of the signature files; identifying one or more signature files whose said first confidence value or said second confidence value exceeds a predetermined confidence threshold; and identifying a type of the disturbance event on the physical transmission line based on the identified one or more signature files.

A15. The method of any of embodiments A1-14, wherein comparing the first and second sensor data with the signature data of the signature files comprises: determining, for each of the signature files, a first total number of overlapping values between the first sensor data and the signature data of the signature file, determining, for each of the signature files, a second total number of overlapping values between the second sensor data and the signature data of the signature file, determining, for each of the signature files, a first total number of continuously overlapping values between the first sensor data and the signature data of the signature file, and determining, for each of the signature files, a second total number of continuously overlapping values between the second sensor data and the signature data of the signature file, and wherein the first confidence value and the second confidence value for each of the signature files are based on the first and second total number of overlapping values and the first and second total number of continuously overlapping values.

A16. The method of any of embodiments A1-15, wherein comparing the first and second sensor data with the signature data of the signature files comprises: determining, for each of the signature files, a first total number of values of the signature data of the signature file that are within a predetermined threshold from the first sensor data, determining, for each of the signature files, a second total number of values of the signature data of the signature file that are within a predetermined threshold from the second sensor data, determining, for each of the signature files, a first total number of continuous values of the signature data of the signature file that are within the predetermined threshold from the first sensor data, and determining, for each of the signature files, a second total number of continuous values of the signature data of the signature file that are within the predetermined threshold from the second sensor data, and wherein the first confidence value and the second confidence value for each of the signature files are based on the first and second total number of values and the first and second total number of continuous values.

A17. The method of any of embodiments A1-16, wherein the first and second sensor data are compared with the signature data of the signature files when at least a portion of the first and second measured values exceeds a predetermined threshold.

A18. The method of any of embodiments A1-17, further comprising: presenting, via a user interface, the identified type of the disturbance event; requesting, via the user interface, a user to confirm accuracy of the identified type of disturbance event; retrieving, from a memory, the one or more signature files when the user confirms the accuracy of the identified type of the disturbance event; comparing the first and second sensor data with the signature data of the one or more signature files to determine differences between the first sensor data and the signature data of the one or more signature files and between the second sensor data and the signature data of the one or more signature files; and updating the signature data of the one or more signature files based on the determined differences.

A19. The method of any of embodiments A1-18, further comprising: identifying the disturbance event on the physical transmission line as an unknown event when the first confidence value and the second confidence value for each of the signature files does not exceed the predetermined confidence threshold; presenting, via a user interface, the disturbance event as the unknown event; requesting, via the user interface, information about the unknown event; and generating one or more new signature files based on the first sensor data, the second sensor data, and the information about the unknown event.

A20. The method of any of embodiments A1-19, further comprising: obtaining signature files corresponding to previous disturbance events, each of the signature files including signature data including previously measured values of the previous disturbance events over the length of time; comparing the first sensor data with the signature data of the signature files; determining a first confidence value for each of the signature files based on the comparison of the first sensor data with the signature data of the signature files; identifying one or more signature files whose said first confidence value exceeds a predetermined confidence threshold; and identifying a type of the disturbance event on the physical transmission line based on the identified one or more signature files.

A21. A method for identifying a location of a disturbance event on a physical transmission line, the method comprising: obtaining, from a sensing device located on the physical transmission line, sensing data, the sensing data including information regarding timestamp values of a light beam emitted by the sensing device and reflected back to the sensing device by a sensor located on the physical transmission line and information regarding a property of the light beam emitted by the sensing device and reflected back to the sensing device by the sensor; determining, based on the sensing data, (i) a roundtrip time of the light beam emitted by the sensing device and reflected back to the sensing device by the sensor and (ii) a change in the property of the light beam emitted by the sensing device and reflected back to the sensing device by the sensor; and identifying the location of the disturbance event on the physical transmission line based on (i) the roundtrip time of the light beam emitted by the sensing device and reflected back to the sensing device by the sensor and (ii) the change in the property of the light beam emitted by the sensing device and reflected back to the sensing device by the sensor.

A22. A system comprising: one or more processors; and memory storing instructions that when executed by the processors cause the processors to effectuate operations comprising those of any of embodiments A1-21.

A23. A tangible, non-transitory, machine-readable medium storing instructions that when executed by a data processing apparatus cause the data processing apparatus to perform operations comprising those of any of embodiments A1-21.

B1. A cable assembly comprising: an outer jacket; a printed circuit board including light emitting diodes; and a cable configured to transmit information, wherein the outer jacket includes a channel opening, and the printed circuit board is configured to be positioned within the channel opening and between the cable and the outer jacket.

B2. The cable assembly of embodiment B1, further comprising: an inner jacket, wherein the inner jacket surrounds the cable and the outer jacket surrounds the inner jacket.

B3. The cable assembly of any of embodiments B1-2, wherein a first thickness between an outer layer and an inner layer of the outer jacket in a section of the outer jacket that includes the channel opening is less than a second thickness between the outer layer and the inner layer of the outer jacket in another section of the outer jacket that does not include the channel opening.

B4. The cable assembly of any of embodiments B1-3, wherein a shape of the channel opening is rectangular, square, circular, or trapezoidal.

B5. The cable assembly of any of embodiments B1-4, wherein the outer jacket includes a plurality of channel openings and wherein a plurality of printed circuit boards are configured to be positioned within the plurality of channel openings between the cable and the outer jacket.

B6. The cable assembly of any of embodiments B1-5, wherein a depth of the channel opening is consistent throughout a length of the outer jacket.

B7. The cable assembly of any of embodiments B1-6, wherein a depth of the channel opening varies along a length of the outer jacket.

B8. The cable assembly of any of embodiments B1-7, wherein the depth of the channel opening corresponds to a difference between a first thickness and a second thickness between an outer layer and an inner layer of the outer jacket, the first thickness is measured between the outer layer and the inner layer of the outer jacket in a section of the outer jacket that includes the channel opening, and the second thickness is measured between the outer layer and the inner layer of the outer jacket in another section of the outer jacket that does not include the channel opening.

B9. The cable assembly of any of embodiments B1-8, wherein the printed circuit board is configured to be positioned within the channel opening between the inner jacket and the outer jacket.

B10. The cable assembly of any of embodiments B1-9, wherein the depth of the channel opening varies along the length of the outer jacket based on a size of the light emitting diodes.

B11. The cable assembly of any of embodiments B1-10, wherein the outer jacket is translucent.

B12. A cable assembly comprising: an inner jacket; an outer jacket; a printed circuit board including light emitting diodes; and a cable configured to transmit information, wherein the inner jacket includes a channel opening, and the printed circuit board is configured to be positioned within the channel opening and between the inner jacket and the outer jacket.

B13. The cable assembly of embodiment B12, wherein the inner jacket surrounds the cable and the outer jacket surrounds the inner jacket.

B14. The cable assembly of any of embodiments B12-13, wherein a first thickness between an outer layer and an inner layer of the inner jacket in a section of the inner jacket that includes the channel opening is less than a second thickness between the outer layer and the inner layer of the inner jacket in another section of the inner jacket that does not include the channel opening.

B15. The cable assembly of any of embodiments B12-14, wherein the inner jacket includes a plurality of channel openings and wherein a plurality of printed circuit boards are configured to be positioned within the plurality of channel openings between the inner jacket and the outer jacket.

B16. The cable assembly of any of embodiments B12-15, wherein a depth of the channel opening is consistent throughout a length of the outer jacket.

B17. The cable assembly of any of embodiments B12-16, wherein the depth of the channel opening corresponds to a difference between a first thickness and a second thickness between an outer layer and an inner layer of the inner jacket, the first thickness is measured between the outer layer and the inner layer of the inner jacket in a section of the inner jacket that includes the channel opening, and the second thickness is measured between the outer layer and the inner layer of the inner jacket in another section of the inner jacket that does not include the channel opening.

B18. The cable assembly of any of embodiments B12-17, wherein the outer jacket is translucent.

B19. An outer jacket for a cable that transmits information, the outer jacket comprising: an outer layer; and an inner layer, wherein the inner layer comprises a channel opening to allow a plurality of light emitting diodes to be housed within the channel opening.

B20. An inner jacket for a cable that transmits information, the inner jacket comprising: an inner layer; and an outer layer, wherein the outer layer comprises a channel opening to allow a plurality of light emitting diodes to be housed within the channel opening.

What is claimed is:

1. A method for using a LED-embedded cable assembly to indicate a disturbance event, the method comprising:
   providing one or more cable assemblies as part of a physical transmission line, wherein the one or more cable assemblies comprises a cable assembly having an outer jacket, light emitting diodes, and a core, wherein the outer jacket includes a channel opening, and the light emitting diode is positioned within the channel opening and between the core and the outer jacket;
   obtaining, from multiple sensors distributed across the physical transmission line, sensor data related to a mechanical disturbance event on the physical transmission line;
   determining a type of the mechanical disturbance event on the physical transmission line based on one or more mechanical disturbance event signatures, the one or more mechanical disturbance event signatures being derived from one or more prior mechanical disturbance events, wherein the mechanical disturbance event is determined to be (i) a first event type in response to the sensor data being similar to a first signature and (ii) a second event type in response to the sensor data being similar to a second signature; and
   causing an action to be performed via the light emitting diodes of the cable assembly such that (ii) the action is a first visual display in response to the mechanical disturbance event being the first event type and (ii) the action is a second visual display in response to the mechanical disturbance event being the second event type.

2. The method of claim 1, wherein the cable assembly comprises circuitry configured to control the light emitting diodes, and wherein causing the action comprises providing signals to the circuitry to control the light emitting diodes to produce the first or second visual display.

3. The method of claim 2, wherein the circuitry is positioned between the core and the outer jacket.

4. The method of claim 1, wherein the core is a cable configured to transmit information.

5. The method of claim 1, wherein the outer jacket is translucent.

6. A method comprising:
   providing one or more cable assemblies as part of a physical transmission line, wherein the one or more cable assemblies comprises a cable assembly having an outer jacket, one or more light emitting diodes, and a core;

obtaining, from multiple sensors associated with the physical transmission line, sensor data related to a mechanical disturbance event on the physical transmission line;

determining a type of the mechanical disturbance event on the physical transmission line based on one or more mechanical disturbance event signatures, the one or more mechanical disturbance event signatures being derived from one or more prior mechanical disturbance events, wherein the mechanical disturbance event is determined to be (i) a first event type in response to the first and second sensor data being similar to a first signature and (ii) a second event type in response to the first and second sensor data being similar to a second signature; and causing an action to be performed via the one or more light emitting diodes of the cable assembly such that (ii) the action is a first action in response to the mechanical disturbance event being the first event type and (ii) the action is a second action in response to the mechanical disturbance event being the second event type.

7. The method of claim 6, wherein the cable assembly comprises circuitry configured to control the one or more light emitting diodes, and wherein causing the action comprises providing signals to the circuitry to control the one or more light emitting diodes to produce a visual indication corresponding to the first or second action.

8. The method of claim 7, wherein the circuitry is positioned between the core and the outer jacket.

9. The method of claim 6, wherein the core is a cable configured to transmit information.

10. The method of claim 6, wherein the outer jacket is translucent.

11. The method of claim 6, wherein causing the action to be performed comprises causing the action to be performed via the one or more light emitting diodes such that (ii) the action is a first visual display in response to the mechanical disturbance event being the first event type and (ii) the action is a second visual display in response to the mechanical disturbance event being the second event type, the second visual display being different from the first visual display.

12. The method of claim 6, further comprising:
determining a set of light emitting diodes corresponding to a detected location of the mechanical disturbance event on the physical transmission line,
wherein causing the action to be performed comprises causing the action to be performed via the set of light emitting diodes corresponding to the detected location such that (ii) the action is a first visual display using the set of light emitting diodes in response to the mechanical disturbance event being the first event type and (ii) the action is a second visual display using the set of light emitting diodes in response to the mechanical disturbance event being the second event type, the second visual display being different from the first visual display.

13. The method of claim 12, further comprising:
causing, via a user interface, display of a disturbance type indication corresponding to the type of the mechanical disturbance event at an interface location corresponding to the detected location of the of the mechanical disturbance event on the physical transmission line.

14. One or more non-transitory computer-readable media storing instructions that, when executed by one or more processors, cause operations comprising:

obtaining, from multiple sensors associated with a physical transmission line, sensor data related to a mechanical disturbance event on the physical transmission line, wherein the physical transmission line comprises one or more cable assemblies, the one or more cable assemblies comprising a cable assembly having an outer jacket and a core;

determining a type of the mechanical disturbance event on the physical transmission line based on one or more mechanical disturbance event signatures, the one or more mechanical disturbance event signatures being derived from one or more prior mechanical disturbance events, wherein the mechanical disturbance event is determined to be (i) a first event type in response to the first and second sensor data being similar to a first signature and (ii) a second event type in response to the first and second sensor data being similar to a second signature; and causing an action to be performed such that (ii) the action is a first action in response to the mechanical disturbance event being the first event type and (ii) the action is a second action in response to the mechanical disturbance event being the second event type.

15. The media of claim 14, wherein causing the action to be performed comprises causing the action to be performed via one or more light emitting diodes of the cable assembly such that (ii) the action is a first action related to the one or more light emitting diodes of the cable assembly in response to the mechanical disturbance event being the first event type and (ii) the action is a second action related to the one or more light emitting diodes of the cable assembly in response to the mechanical disturbance event being the second event type, the second action being different from the first action.

16. The media of claim 14, the operations further comprising:
determining a set of light emitting diodes corresponding to a detected location of the mechanical disturbance event on the physical transmission line,
wherein causing the action to be performed comprises causing the action to be performed via the set of light emitting diodes corresponding to the detected location such that (ii) the action is a first visual display using the set of light emitting diodes in response to the mechanical disturbance event being the first event type and (ii) the action is a second visual display using the set of light emitting diodes in response to the mechanical disturbance event being the second event type, the second visual display being different from the first visual display.

17. The media of claim 14, the operations further comprising:
causing, via a user interface, display of a disturbance type indication corresponding to the type of the mechanical disturbance event at an interface location corresponding to the detected location of the of the mechanical disturbance event on the physical transmission line.

18. The media of claim 14, wherein the cable assembly comprises circuitry configured to control one or more light emitting diodes, and wherein causing the action comprises providing signals to the circuitry to control the one or more light emitting diodes to produce a visual indication corresponding to the first or second action.

19. The media of claim 18, wherein the circuitry is positioned between the core and the outer jacket.

20. The media of claim 14, wherein the outer jacket is translucent.

* * * * *